(12) United States Patent
Tsapovski

(10) Patent No.: US 12,253,068 B2
(45) Date of Patent: Mar. 18, 2025

(54) ENERGY CAPTURE FROM OSCILLATING OBJECT

(71) Applicant: Yaroslav Tsapovski, Etobicoke (CA)

(72) Inventor: Yaroslav Tsapovski, Ontario (CA)

( * ) Notice: Subject to any disclaimer, the term of this patent is extended or adjusted under 35 U.S.C. 154(b) by 137 days.

(21) Appl. No.: 17/999,620

(22) PCT Filed: May 26, 2021

(86) PCT No.: PCT/CA2021/050712
§ 371 (c)(1),
(2) Date: Nov. 22, 2022

(87) PCT Pub. No.: WO2021/237353
PCT Pub. Date: Dec. 2, 2021

(65) Prior Publication Data
US 2023/0235728 A1 Jul. 27, 2023

Related U.S. Application Data

(60) Provisional application No. 63/030,497, filed on May 27, 2020.

(51) Int. Cl.
*F03G 7/00* (2006.01)
*F03G 3/06* (2006.01)
*F03G 7/08* (2006.01)

(52) U.S. Cl.
CPC ...... *F03G 7/08* (2013.01); *F03G 3/06* (2013.01)

(58) Field of Classification Search
CPC ...... F03G 7/08; F03G 3/06; B63J 3/04; B63B 2035/4466; F05B 2250/44; F03B 13/20; Y02E 10/30
See application file for complete search history.

(56) References Cited

U.S. PATENT DOCUMENTS

| 4,266,143 A | * | 5/1981 | Ng | F03B 13/20 |
| | | | | 60/505 |
| 8,710,684 B2 | | 4/2014 | Chiu | |

(Continued)

FOREIGN PATENT DOCUMENTS

FR 2991397 A1 12/2013
GB 2501737 A 11/2013
(Continued)

OTHER PUBLICATIONS

International Application No. PCT/CA2021/050712 Filed May 26, 2021; PCT International Search Report; Aug. 10, 2021; 2 pgs.

(Continued)

*Primary Examiner* — Julio C. Gonzalez
(74) *Attorney, Agent, or Firm* — Tarolli, Sundheim, Covell & Tummino LLP

(57) ABSTRACT

A method for capturing energy from an oscillating object, in which at least one unbalanced rotor is oscillated to rotate the rotor(s) while reciprocally pivoting each of the rotor(s) about a respective counter-oscillation axis that is substantially perpendicular to both a rotation axis of the rotor and the oscillation axis for the oscillating object. Reciprocally pivoting the rotor(s) about the respective counter-oscillation axis urges the rotor to rotate continuously instead of reciprocally, and energy from rotation of the rotor can be captured, for example mechanically or electrically. Optionally, the counter-oscillation axis may be moved to maintain the counter-oscillation axis perpendicular to the oscillation axis for the oscillating object.

11 Claims, 43 Drawing Sheets

(56) References Cited

U.S. PATENT DOCUMENTS

| | | | |
|---|---|---|---|
| 8,915,077 B2 * | 12/2014 | Paakkinen | F03B 13/20 60/501 |
| 9,735,651 B2 | 8/2017 | Wickett | |
| 2008/0115603 A1 * | 5/2008 | Yeh | F03G 1/029 74/25 |
| 2010/0127500 A1 * | 5/2010 | Yang | F03G 7/08 290/53 |
| 2015/0167629 A1 * | 6/2015 | Wigant | F03B 13/187 60/499 |
| 2020/0109694 A1 | 4/2020 | Vamvas | |

FOREIGN PATENT DOCUMENTS

| | | |
|---|---|---|
| KR | 10-2013-0067016 A | 6/2013 |
| WO | 2016/163631 A1 | 10/2016 |

OTHER PUBLICATIONS

Applicant: Yaroslav Tsapovski; "Energy Capture from Oscillating Object"; European Patent Application No. 21813641; Extended European Search Report dated May 22, 2024; 7 pgs.
Applicant: Yaroslav Tsapovski; "Energy Capture from Oscillating Object"; European Patent Application No. 21813641; Supplementary European Search Report dated Jun. 11, 2024; 1 pg.
Applicant: Yaroslav Tsapovski; "Energy Capture from Oscillating Object"; Canadian Patent Application No. 3,176,747; Office Action dated Feb. 3, 2023; 4 pgs.

* cited by examiner

ENERGY CAPTURE FROM OSCILLATING OBJECT

CROSS-REFERENCE TO RELATED APPLICATION

This application is a U.S. National Stage Application filed under 35 U.S.C. § 371 of PCT/CA2021/050712, filed May 26, 2021, and entitled ENERGY CAPTURE FORM OSCILLATING OBJECT, which International Application claims the benefit of priority from U.S. Provisional Patent Application No. 63/030,497, filed on May 27, 2020. The entire contents of each of the above-identified patent applications are incorporated herein by reference.

TECHNICAL FIELD

The present disclosure relates to power generation, and more particularly to capturing energy from an oscillating object.

BACKGROUND

Since at least the early 1900s, there has been an interest in extracting energy from oscillating objects. For example, ships or other floating objects will tend to oscillate in the waves, and it would be advantageous to be able to extract energy from this oscillatory motion. Many devices for extracting this energy have been proposed over the years.

One recent example of such a device is Korean Patent Publication No. 20130067016A, which describes a device comprising housing fixed to the bottom of a ship, with a rotating shaft rotatable inside the housing, a fixing plate fixed to an inner surface of the housing through a central portion thereof so as to communicate with the rotating shaft, and a weight member fixed to the rotating shaft to rotate on the upper surface of the fixed plate as the ship moves (by waves or wind) to transmit the rotating force to the rotating shaft. A generator is driven by the rotational force of the rotational shaft and connected to an upper end of the rotational shaft to produce electric power. When the ship is moved from side to side by the waves, the weight is rotated while reciprocating according to the direction of movement. Although this reciprocal movement can generate electricity, it is less efficacious than continuous rotation. However, continuous rotation is difficult to achieve because of the oscillatory nature of the motion.

SUMMARY

The present disclosure describes methods and apparatus for using oscillatory motion to drive continuous rotation of a rotor so as to extract energy.

In one aspect, a device for capturing energy from an oscillating object on or within which the device is disposed comprises a frame and at least one rotor assembly. Each rotor assembly comprises a cradle and a rotor rotatably carried by the cradle so as to be rotatable about a rotation axis relative to the cradle. The rotor comprises an unbalancing weight to unbalance rotation of the rotor relative to the cradle. The cradle is pivotably carried by the frame so as to pivotally reciprocate within a limited range of reciprocal motion within the frame about a cradle pivot axis that intersects and is substantially perpendicular to the rotation axis. At least one power take-off is coupled to the rotor(s).

The device may further comprise a return actuator carried by the frame and mechanically coupled to the cradle(s) to urge the cradle(s) to reverse within the range of reciprocal motion.

In some embodiments, the return actuator comprises at least one counterweight movably carried by the frame, with the counterweight(s) being mechanically coupled to the rotor assembly (or assemblies) whereby motion of the counterweight(s) relative to the frame pivots the cradle(s) of the at least one rotor assembly (or assemblies) about the cradle pivot axis. In one particular embodiment, the counterweight(s) may be pivotably carried by the frame so as to be pivotable about a counterweight pivot axis that is substantially perpendicular to each cradle pivot axis, with the counterweight(s) being mechanically coupled to the rotor assembly (or assemblies) whereby pivotal motion of the counterweight(s) relative to the frame pivots the cradle(s) of the rotor assembly (or assemblies) about the cradle pivot axis. In another particular embodiment, the counterweight(s) may be slidably carried by the frame so as to be slidable relative to the frame, substantially parallel to each cradle pivot axis, with the counterweight(s) being mechanically coupled to the rotor assembly (or assemblies) whereby sliding motion of the counterweight(s) relative to the frame pivots the cradle of the rotor assembly (or assemblies) about the cradle pivot axis. In some implementations, the counterweight(s) may be mechanically coupled to the rotor assembly (or assemblies) by cables. In certain particular examples of such implementations, there may be two rotor assemblies whose respective pivot axes are at least substantially parallel and two opposed substantially equal counterweights, and the cables may comprise a first coupling extending between the two rotor assemblies wherein a first one of the counterweights is fixed to the cables of the first coupling and a second coupling extending between the two rotor assemblies wherein a second one of the counterweights is fixed to the cables of the second coupling, wherein the second coupling comprises a cable reverser circuit that includes the second one of the counterweights, wherein sliding movement of the counterweights acts through the first coupling and the second coupling to pivot the cradles in opposite directions.

In other embodiments, the return actuator may comprise at least one biasing member, which may act between the frame and the cradle of each rotor assembly. In particular embodiments, there is a plurality of rotor assemblies, and a plurality of biasing members may act between the respective rotor assemblies.

In some embodiments, the power take-off is a mechanical power take-off, for example a shaft rotated by the rotor(s). In other embodiments, the power take-off comprises an electrical power take-off. For example, in particular embodiments, the cradle may carry stator components of an electrical generator and the rotor may carry rotor components of an electrical generator, whereby the rotor and the cradle combine so that the rotor assembly is an electrical generator.

In some embodiments, the frame may be carried on a turntable.

In another aspect, a method for capturing energy from an oscillating object comprises oscillating at least one unbalanced rotor on or within the oscillating object to rotate the rotor(s) while reciprocally pivoting each rotor about a respective counter-oscillation axis that is substantially perpendicular to both a rotation axis of the at least one rotor and an oscillation axis for the oscillating object. Reciprocally pivoting the rotor(s) about the counter-oscillation axis urges the rotor(s) to rotate continuously instead of reciprocally. The method further comprises capturing energy from rotation of the rotor(s).

In some implementations, energy from rotation of the rotor is captured mechanically. In other implementations, energy from rotation of the rotor is captured electrically.

The method may further comprise moving the counter-oscillation axis to maintain the counter-oscillation axis perpendicular to the oscillation axis for the oscillating object.

BRIEF DESCRIPTION OF THE DRAWINGS

These and other features will become more apparent from the following description in which reference is made to the appended drawings wherein.

DETAILED DESCRIPTION

Figure 1:
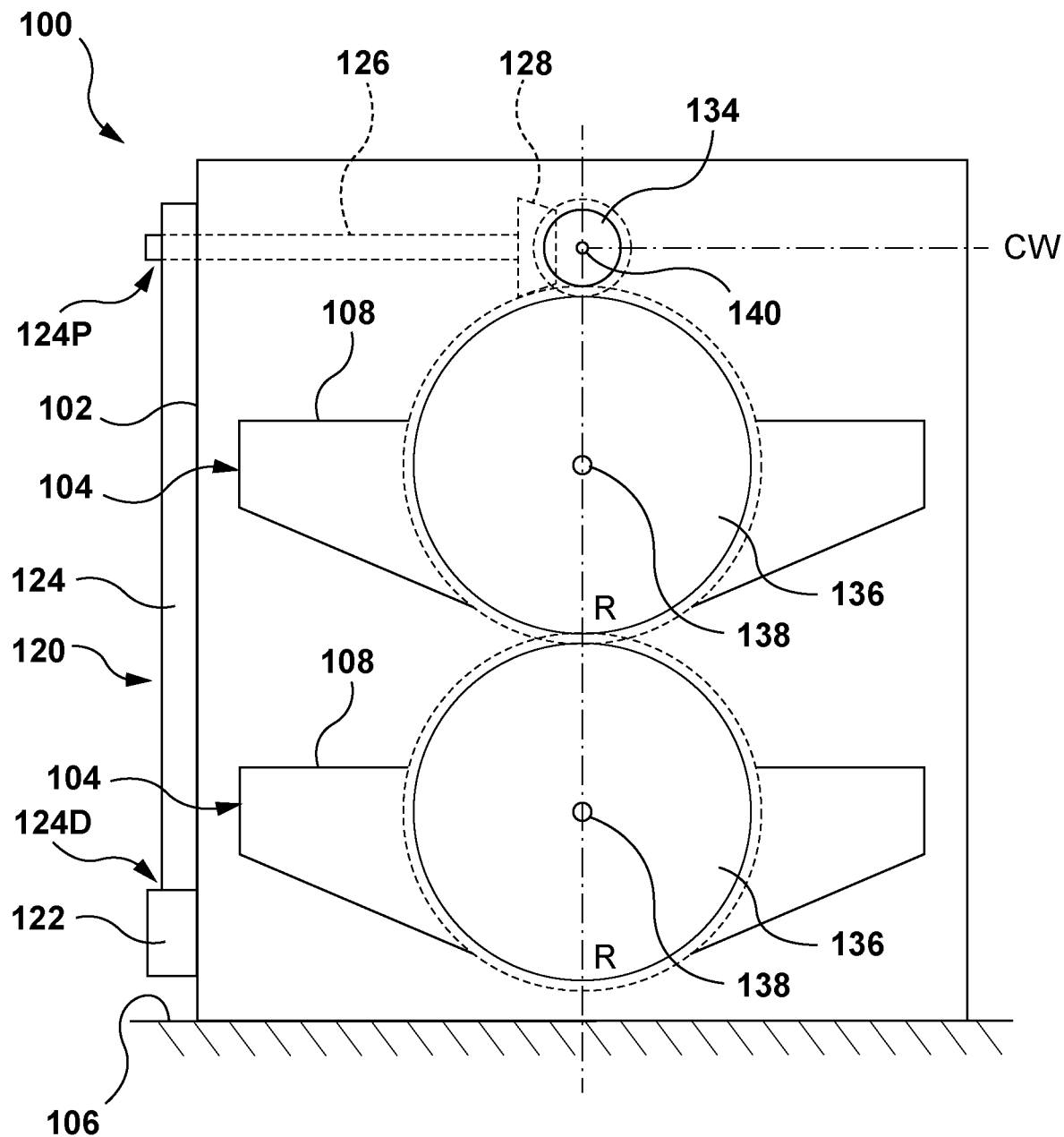
FIG. 1 is a simplified schematic side elevation view of a first illustrative energy capture device according to an aspect of the present disclosure.

Reference is now made to FIGS. 1 through 5, which are simplified schematic views of a first illustrative embodiment of an energy capture device, denoted generally by reference 100, for capturing energy from an oscillating object 106 on or within which the device 100 is disposed. The oscillating object may be, for example, a ship or floating platform which oscillates as a result of waves, or a platform of a dirigible subject to oscillation from wind turbulence, although these are merely examples and are not intended to be limiting. The generalized structure of the illustrative energy capture device will be described first, followed by a description of its method of operation, followed by a description of one non-limiting illustrative physical implementation.

The energy capture device 100 comprises a frame 102 and at least one rotor assembly 104. In the illustrated embodiment there are two rotor assemblies 104; arrangements having only a single rotor assembly are also contemplated, as are arrangements having more than two rotor assembles. The frame 102 is carried on the oscillating object 106 so that the frame 102 oscillates with the oscillating object 106.

Figure 4:
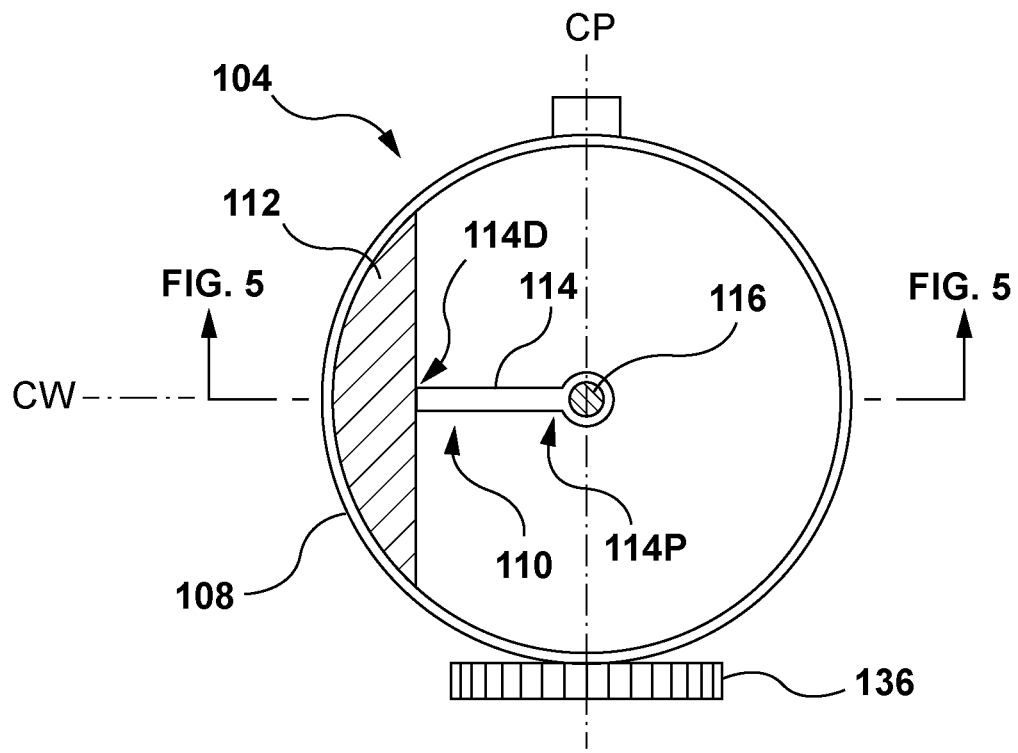
FIG. 4 is a simplified schematic top cross-sectional plan view showing the interior of a rotor assembly of the energy capture device of FIG. 1.
Figure 5:
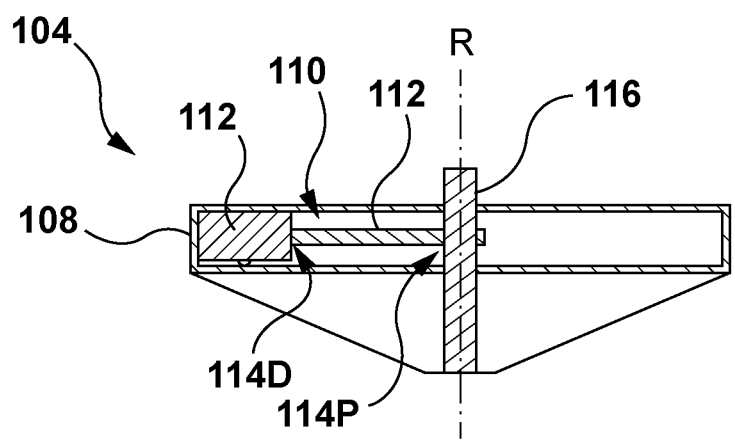
FIG. 5 is a cross-sectional view of the rotor assembly of FIG. 4, taken along the line 5-5 in FIG. 4.

In the illustrated embodiment, each rotor assembly 104 comprises a cradle 108 and, as shown in FIGS. 4 and 5, further comprises a rotor 110 and an unbalancing weight 112. In each rotor assembly 104, the rotor 110 is rotatably carried by the cradle 108 so that the rotor 110 is rotatable about a rotation axis R (FIGS. 1 and 5) relative to the cradle 108. The rotor also carries the unbalancing weight 112. The rotor 110 carries the unbalancing weight 112 in a position in which the unbalancing weight 112 will, as its name implies, unbalance rotation of the rotor 110 relative to the cradle 108.

In the illustrated embodiment, the rotor 110 is generally hammer-shaped and comprises a rotor arm 114 whose proximal end 114P is coupled to a central shaft 116 and whose distal end 114D carries the unbalancing weight 112. Depending on the configuration, the proximal end 114P of the rotor arm 114 may be fixedly coupled to the central shaft 116 so that rotation of the rotor 110 also rotates the central shaft, or may be rotatably coupled to the central shaft 116 so that the rotor 110 rotates about a relatively fixed central shaft 116. Although omitted from the schematic illustration for simplicity of illustration, at least one power take-off is coupled to the rotors 110. The power take-off may be, for example, a mechanical power take-off or an electrical power take-off, as described further below.

For each rotor assembly 104, the cradle 108 is pivotably carried by the frame 102 so as to pivotally reciprocate within a limited range of reciprocal motion within the frame 102 about a respective cradle pivot axis CP (FIGS. 3 and 4) that intersects and is substantially perpendicular to the rotation axis R. The limited range of reciprocal motion is shown in FIGS. 8A and 8B and 10A and 10B).

Figure 2:
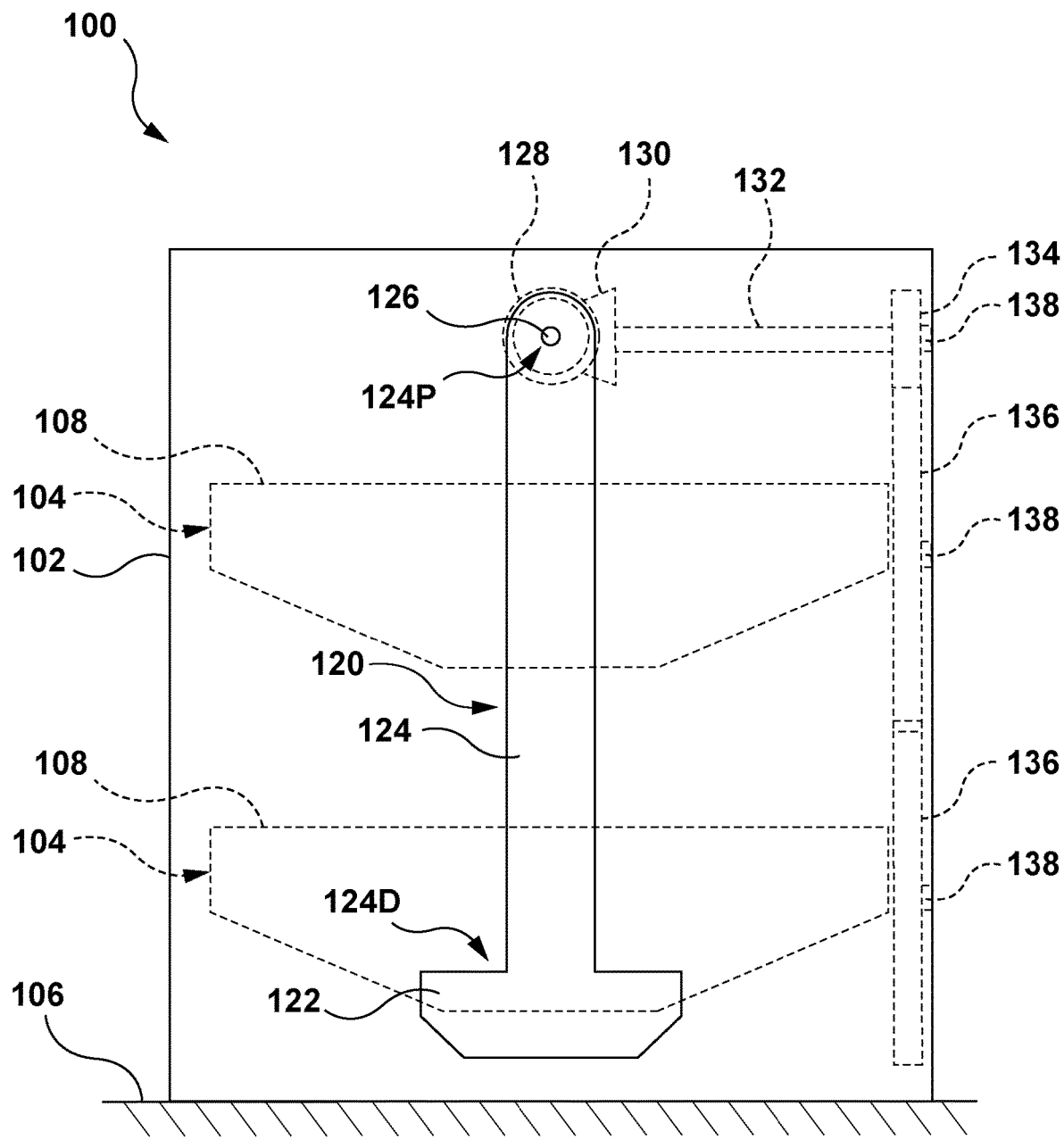
FIG. 2 is a simplified schematic rear elevation view of the energy capture device of FIG. 1.
Figure 3:
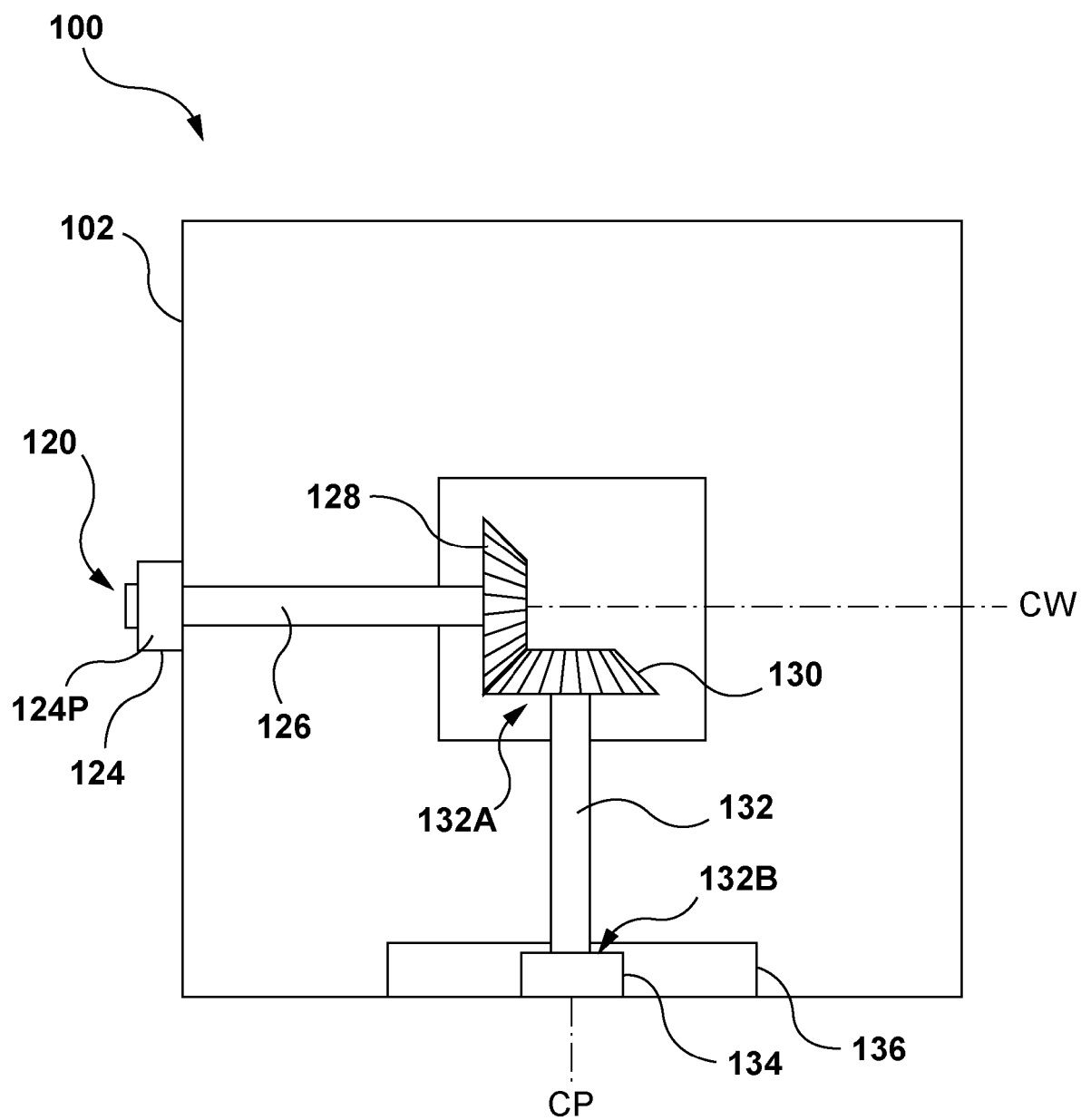
FIG. 3 is a simplified schematic top plan view of the energy capture device of FIG. 1.

The energy capture device 100 further comprises a return actuator 120 (see FIG. 2). The return actuator 120 is carried by the frame 102 and is mechanically coupled to the cradles 108 to urge each cradle 108 to reverse within its range of reciprocal motion. In the illustrated embodiment shown in FIGS. 1 to 5, the return actuator 120 comprises a counterweight 122 that is pivotably carried by the frame 102 so as to be pivotable about a counterweight pivot axis CW (see FIGS. 1 and 3) that is substantially perpendicular to each cradle pivot axis CP. The counterweight 122 is mechanically coupled to the rotor assemblies 104 whereby pivotal motion of the counterweight 122 relative to the frame 102 pivots the cradles 108 of the rotor assemblies 104 about the cradle pivot axis CP. The frame 102 is preferably positioned on the oscillating object 106 such that the counterweight pivot axis CW is substantially parallel to the oscillation axis of the oscillating object 106 so that the oscillations of the oscillating object 106 will cause pivotal movement of the counterweight 122 relative to the frame 102.

In the illustrated embodiment shown in FIGS. 1 through 5, the return actuator 120 comprises a pendulum arm 124 having a distal end 124D that carries the counterweight 122 and a proximal end 124P fixed to a counterweight driveshaft 126 that extends rotatably through the frame 102 and terminates with a pendulum bevel gear 128 inside the frame 102. The pendulum bevel gear 128 meshes with a rotor assembly return bevel gear 130 at the first end 132A of a rotor assembly return driveshaft 132. The second end 132B of the rotor assembly return driveshaft 132 carries a coupling gear 134 that is pivotably coupled to the frame 102 at a pivot point 140 and meshes with an uppermost cradle gear 136 which in turn meshes with a lowermost cradle gear 136. The cradle gears 136 are each fixed to a respective cradle 108 and are pivotally coupled to the frame 102 at pivot points 138, whereby each cradle 108 is pivotably carried by the frame 102. Thus, in the illustrated embodiment, the counterweight 122 is mechanically coupled to the rotor assemblies 104 through the pendulum arm 124, counterweight driveshaft 126, pendulum bevel gear 128, rotor assembly return bevel gear 130, rotor assembly return driveshaft 132, coupling gear 134 and the cradle gears 136 fixed to the respective cradles 108. This is merely an illustrative mechanical coupling and is not intended to be limiting; other mechanical coupling arrangements are also contemplated. Additionally, while only a single pendulum arm 124 shown, other embodiments may have two pendulum arms, for example on opposite sides of the frame.

Operation of the illustrative energy capture device 100 will now be described. As explained above, each rotor assembly 104 comprises a rotor 110 with an unbalancing weight 112. Thus, the rotors 110 are unbalanced. As the object 106 on which the frame 102 is carried oscillates, the frame 102 also oscillates, which in turn oscillates the cradles 108 carried by the frame 102 such that the oscillation, in cooperation with gravity, rotates the rotors 110 about their respective rotation axes R. At the same time, the pivotal mounting of the cradles 108 with respect to the frame 102, in cooperation with the return actuator 120 mechanically coupled to the cradles 108, causes each cradle 108 to reverse within its range of reciprocal motion and thereby reciprocally pivot each of the rotors 110 about a respective counter-oscillation axis, in this case the respective cradle pivot axes CP that are substantially perpendicular to both the rotation axis of the rotor and the counterweight axis CW, which is parallel to the oscillation axis. The cradle pivot axes CP will therefore be perpendicular to the oscillation axis, and therefore serve as counter-oscillation axes. Reciprocally pivoting the rotors 110 about the cradle pivot axes CP urges the rotors 110 to rotate continuously instead of reciprocally, which facilitates capture of energy from rotation of the rotors 110. Preferably, the return actuator 120 is mechanically coupled to the cradles 108 to urge each cradle 108 to pivot in the opposite direction from that of the next adjacent cradle 108 within its respective range of reciprocal motion, so that the unbalanced rotors will counter-rotate within the frame. Moreover, there is preferably an even number of cradles, whereby the counter-rotation will improve overall stability of the device 100. Optionally, the frame 102 is carried on a turntable which may be used to rotate the frame to maintain the counterweight axis CW substantially parallel to the oscillation axis and thereby maintain the cradle pivot axes CP perpendicular to the oscillation axis in cases where the oscillation axis may rotate, such as on a ship.

Figure 6A:
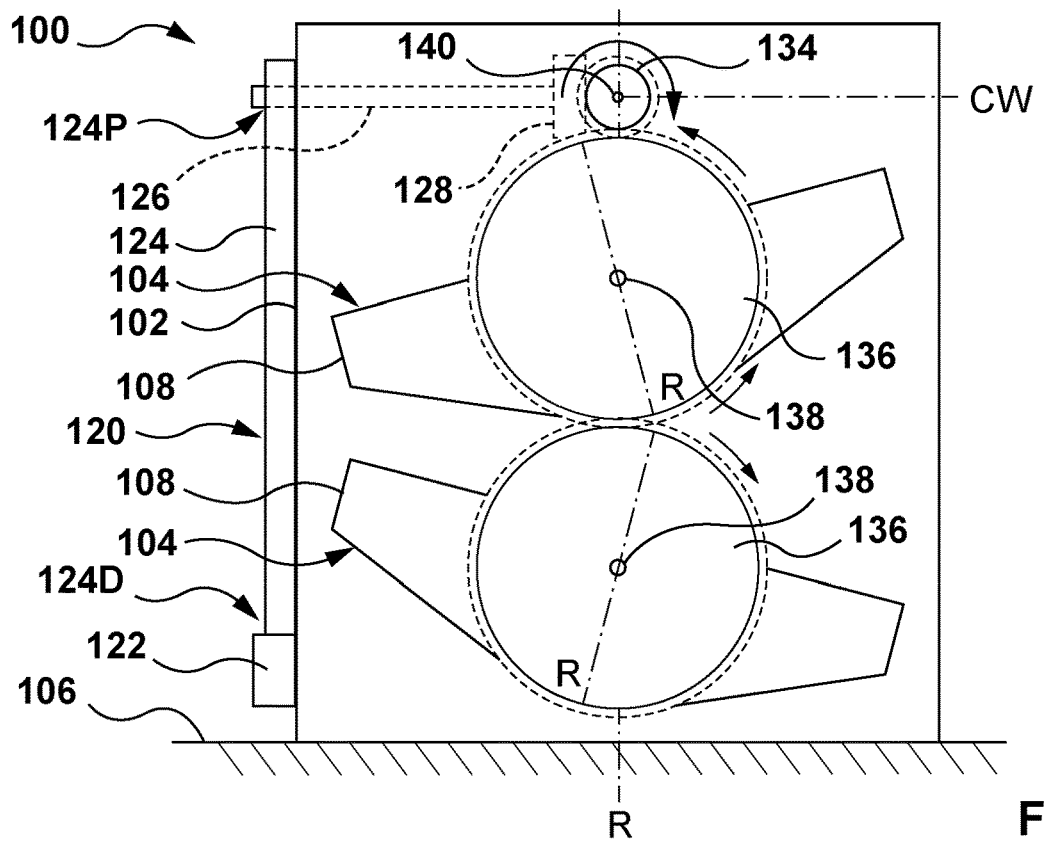
FIG. 6A is a simplified schematic side elevation view of the energy capture device of FIG. 1 during a first stage of oscillation.
Figure 6B:
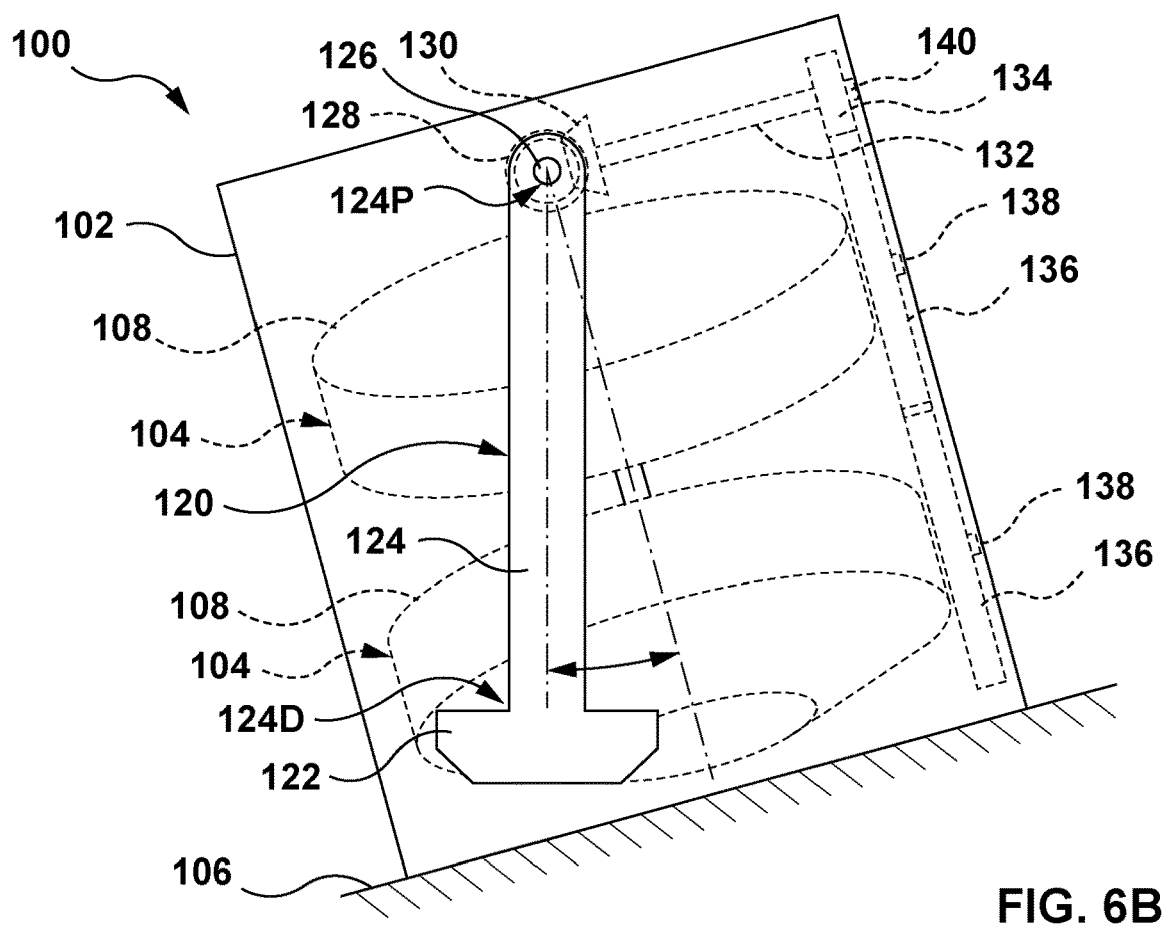
FIG. 6B is a simplified schematic rear elevation view of the energy capture device of FIG. 1 during the first stage of oscillation.
Figure 6C:
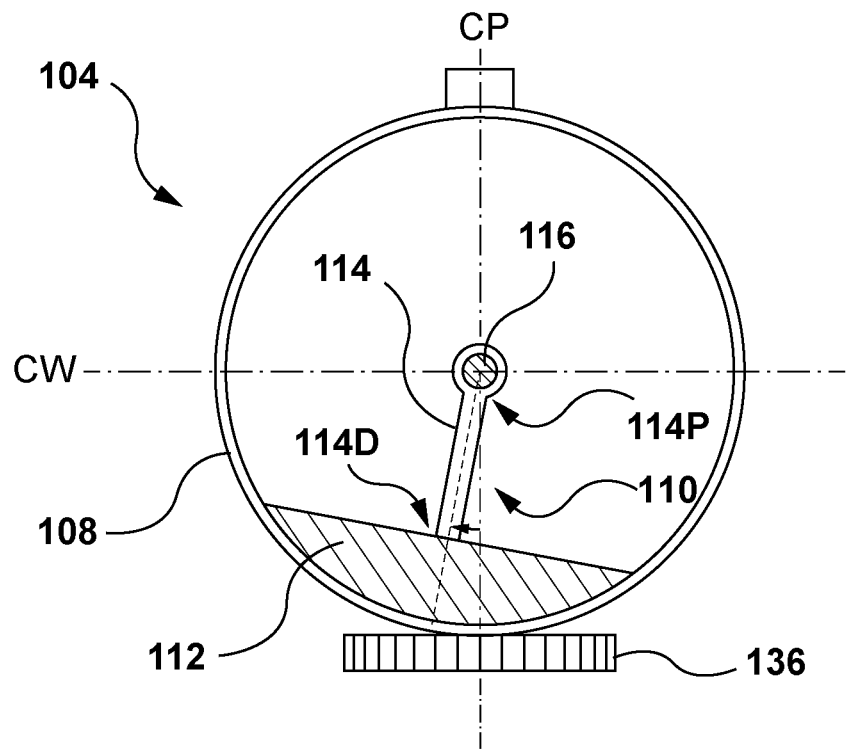
FIG. 6C is a simplified schematic top cross-sectional plan view showing the upper rotor assembly of the energy capture device of FIG. 1 during the first stage of oscillation.
Figure 6D:
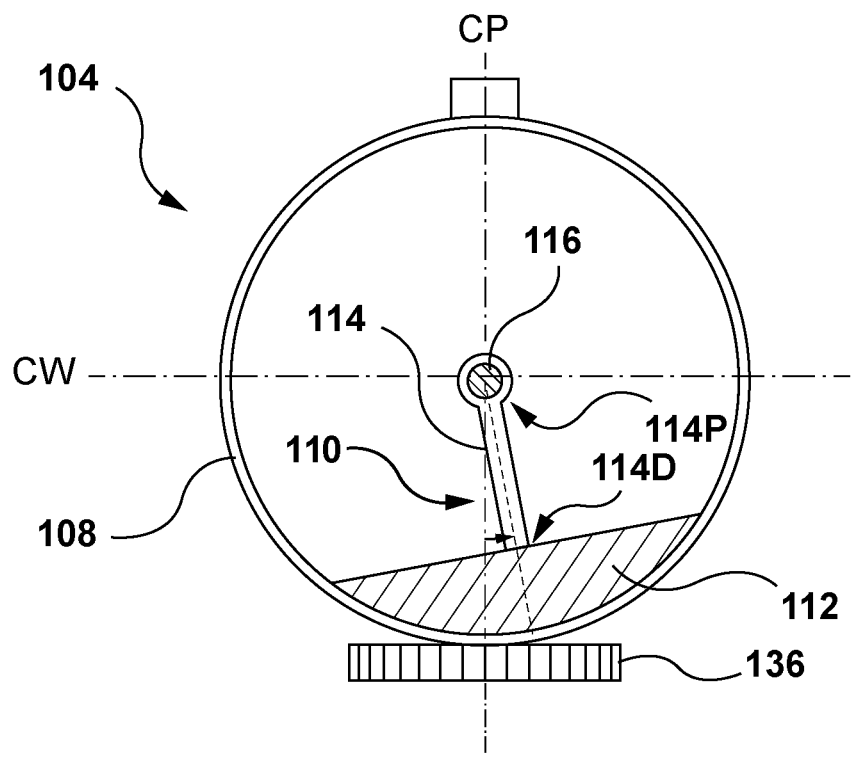
FIG. 6D is a simplified schematic top cross-sectional plan view showing the upper rotor assembly of the energy capture device of FIG. 1 during the first stage of oscillation.
Figure 7A:
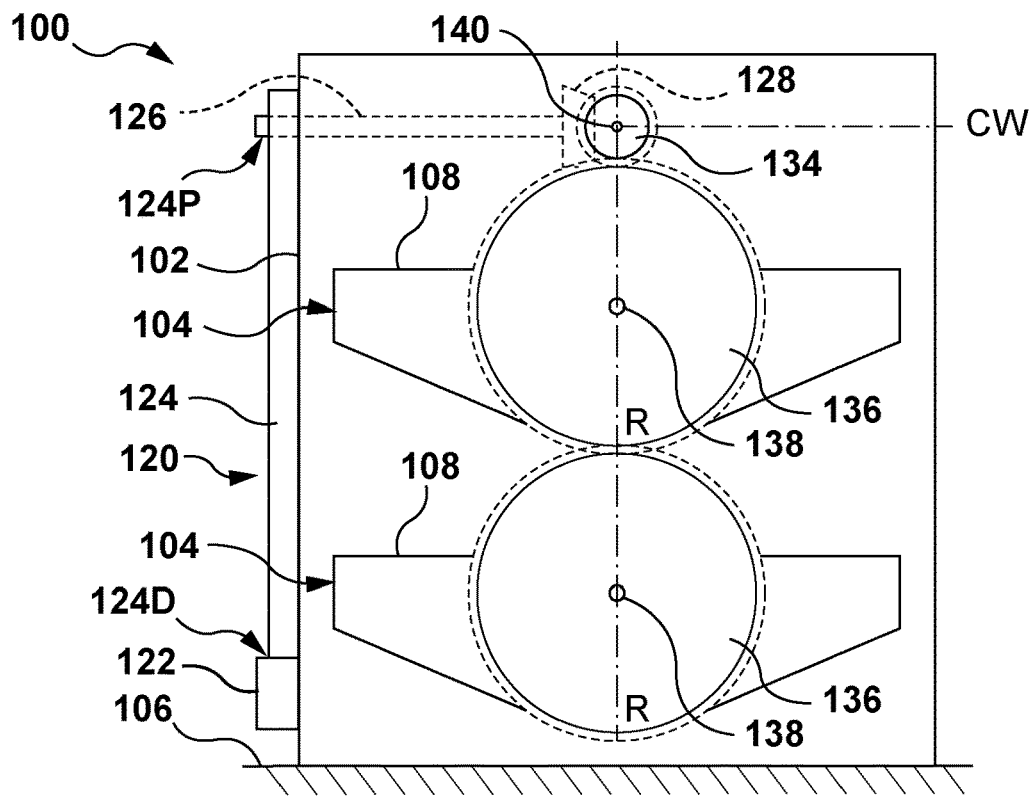
FIG. 7A is a simplified schematic side elevation view of the energy capture device of FIG. 1 during a second stage of oscillation.
Figure 7B:
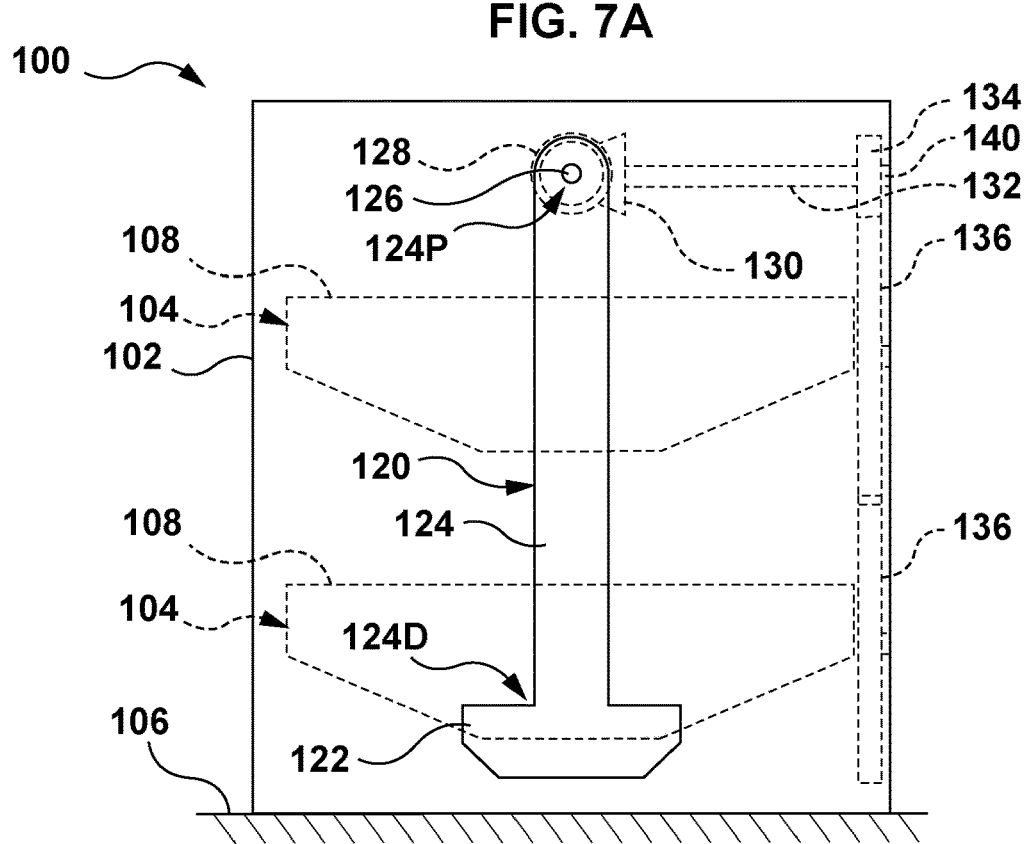
FIG. 7B is a simplified schematic rear elevation view of the energy capture device of FIG. 1 during the second stage of oscillation.
Figure 7C:
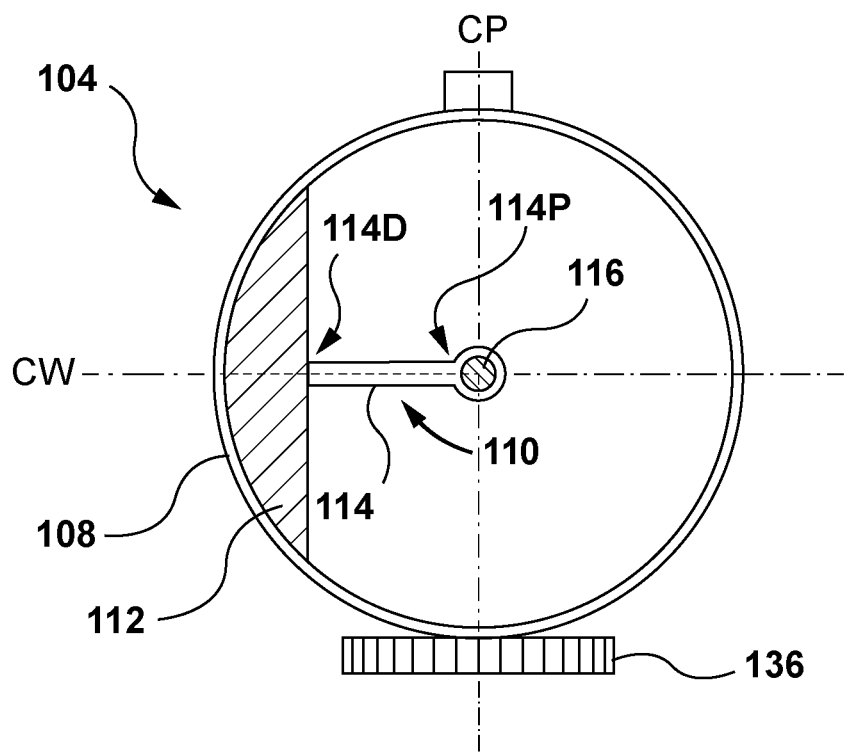
FIG. 7C is a simplified schematic top cross-sectional plan view showing the upper rotor assembly of the energy capture device of FIG. 1 during the second stage of oscillation.
Figure 7D:
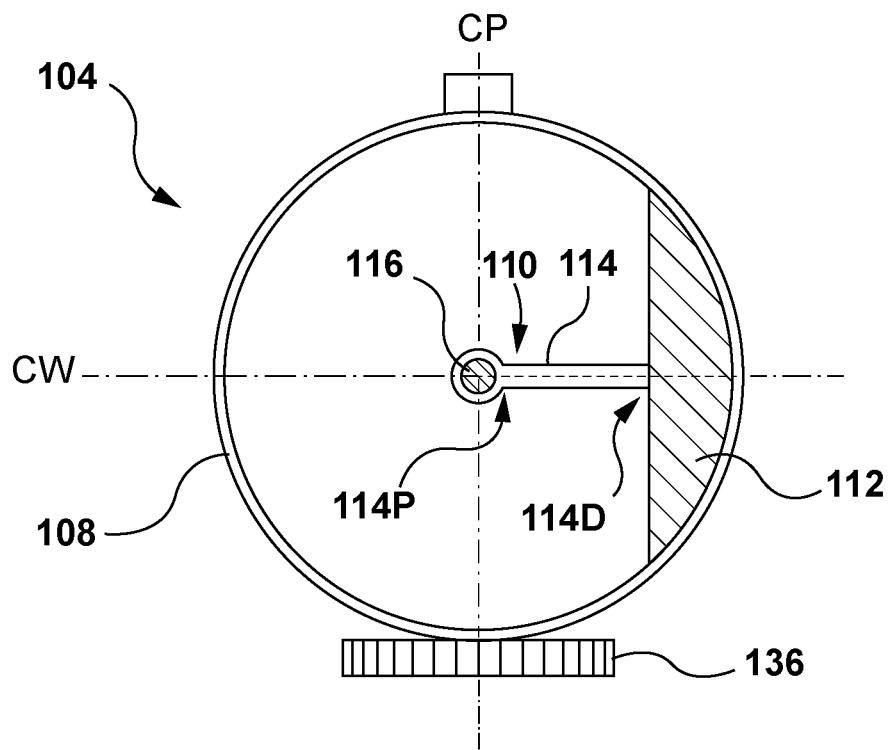
FIG. 7D is a simplified schematic top cross-sectional plan view showing the upper rotor assembly of the energy capture device of FIG. 1 during the second stage of oscillation.

FIGS. 6A through 6D show a first stage of oscillation. As the frame 102 dips relative to the direction of gravity, with the oscillation axis perpendicular to the drawing page, the pendulum arm 124 remains vertical relative to gravity, and therefore pivots relative to the frame 102. Pivoting of the pendulum arm 124 causes the cradles 108 to pivot about their respective pivot axes CP in opposite directions, so that the sides of the cradles 108 proximal to the pendulum arm 124 are closer together than the sides of the cradles 108 distal from the pendulum arm 124, as shown in FIGS. 6A and 6B. With the cradles 108 so inclined, gravity acts on the unbalancing weights 112, which causes the rotors 110 to rotate in opposite directions about the respective rotation axes R, as shown in FIGS. 6C and 6D.

FIGS. 7A through 7D show a second stage of oscillation, as the frame 102 returns from the position shown in FIGS. 6A through 6D to an upright position relative to gravity. The pendulum arm 124 remains vertical relative to gravity, and therefore pivots relative to the frame 102, back from the extreme position shown in FIG. 6B. This in turn causes the cradles 108 to pivot about their respective pivot axes CP, again in opposite directions, to a position in which the cradles 108 are approximately level such that the sides of the cradles 108 are approximately equidistant from one another, while the rotors 110, which continue to rotate, have moved to the positions shown in FIGS. 7C and 7D, with the rotor arms 114 approximately parallel to the counterweight pivot axis CW.

Figure 8A:
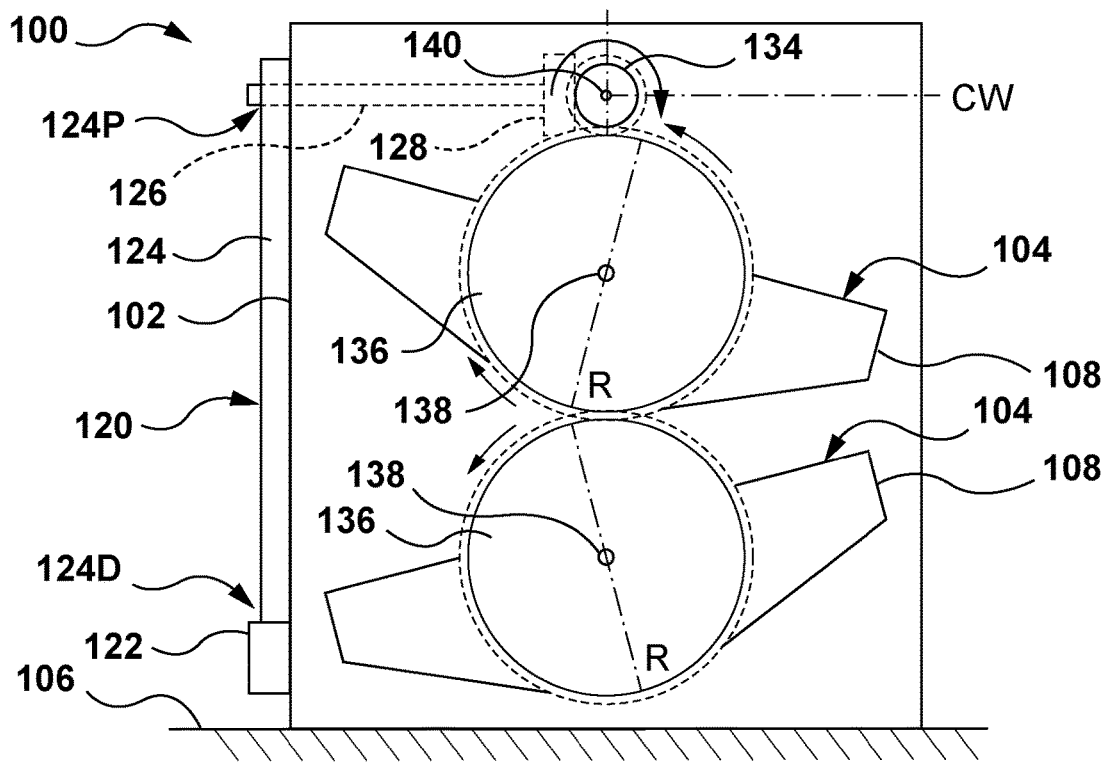
FIG. 8A is a simplified schematic side elevation view of the energy capture device of FIG. 1 during a third stage of oscillation.
Figure 8B:
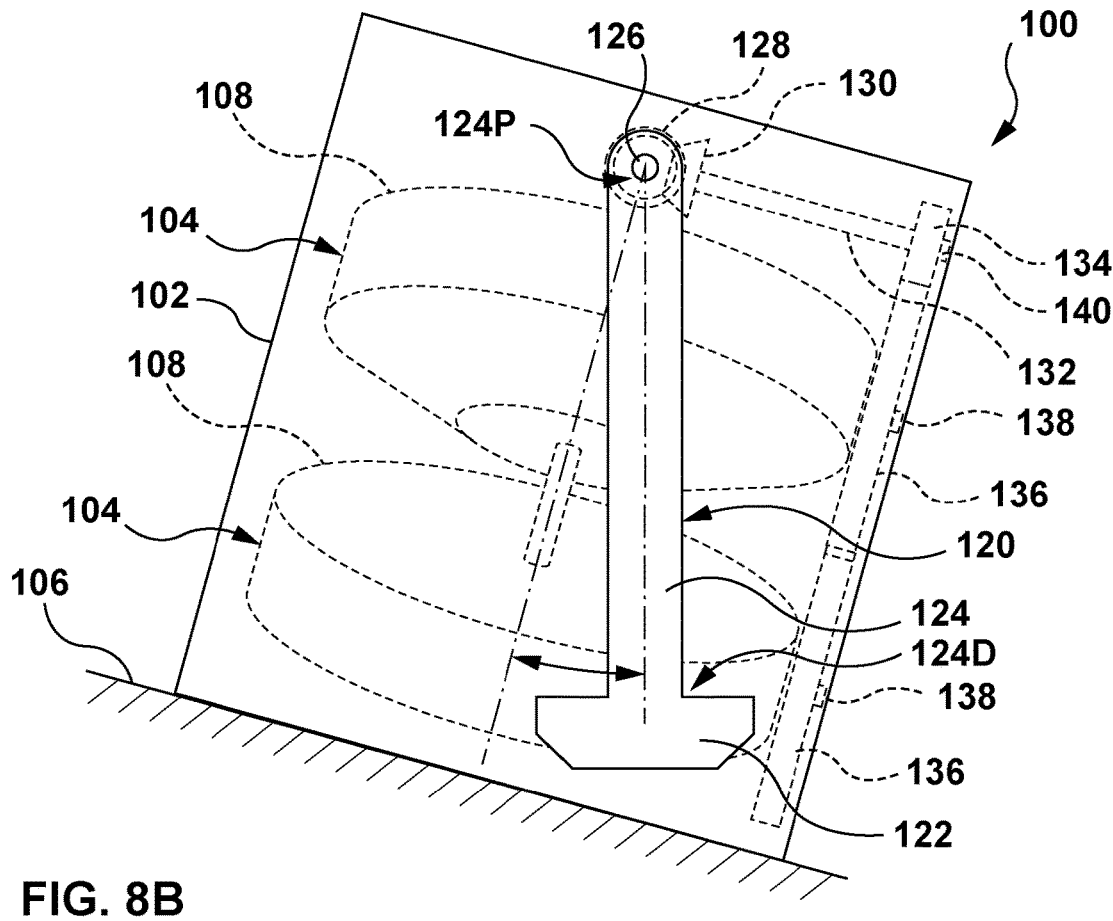
FIG. 8B is a simplified schematic rear elevation view of the energy capture device of FIG. 1 during the third stage of oscillation.
Figure 8C:
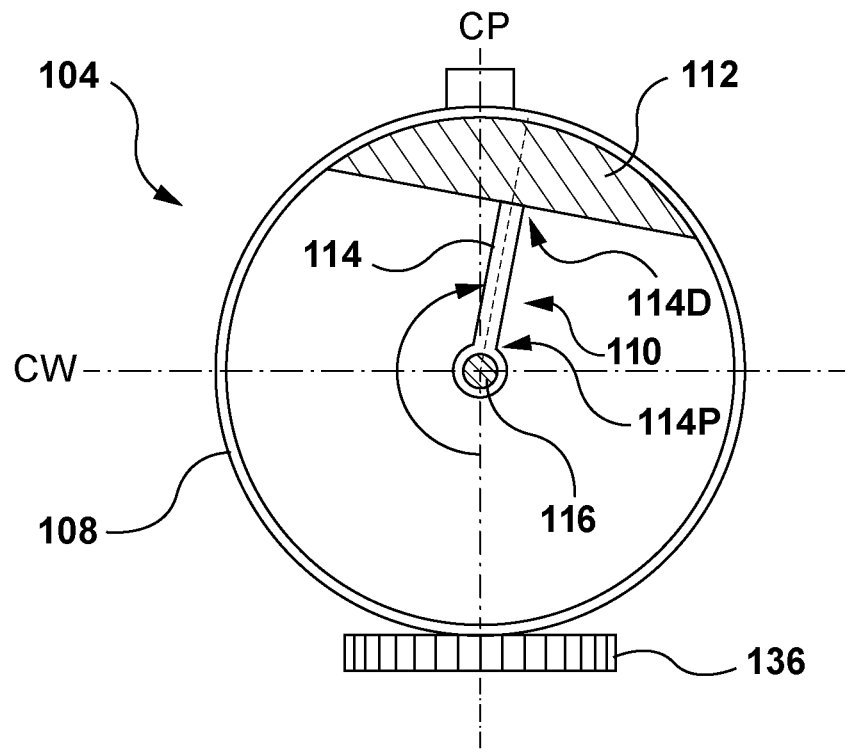
FIG. 8C is a simplified schematic top cross-sectional plan view showing the upper rotor assembly of the energy capture device of FIG. 1 during the third stage of oscillation.
Figure 8D:
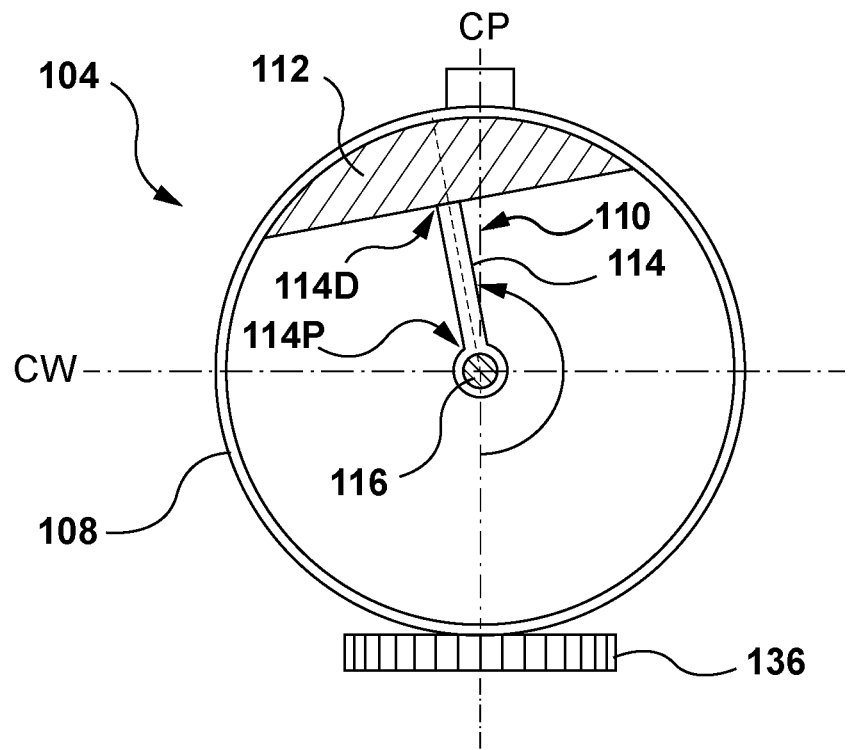
FIG. 8D is a simplified schematic top cross-sectional plan view showing the upper rotor assembly of the energy capture device of FIG. 1 during the third stage of oscillation.
Figure 9A:
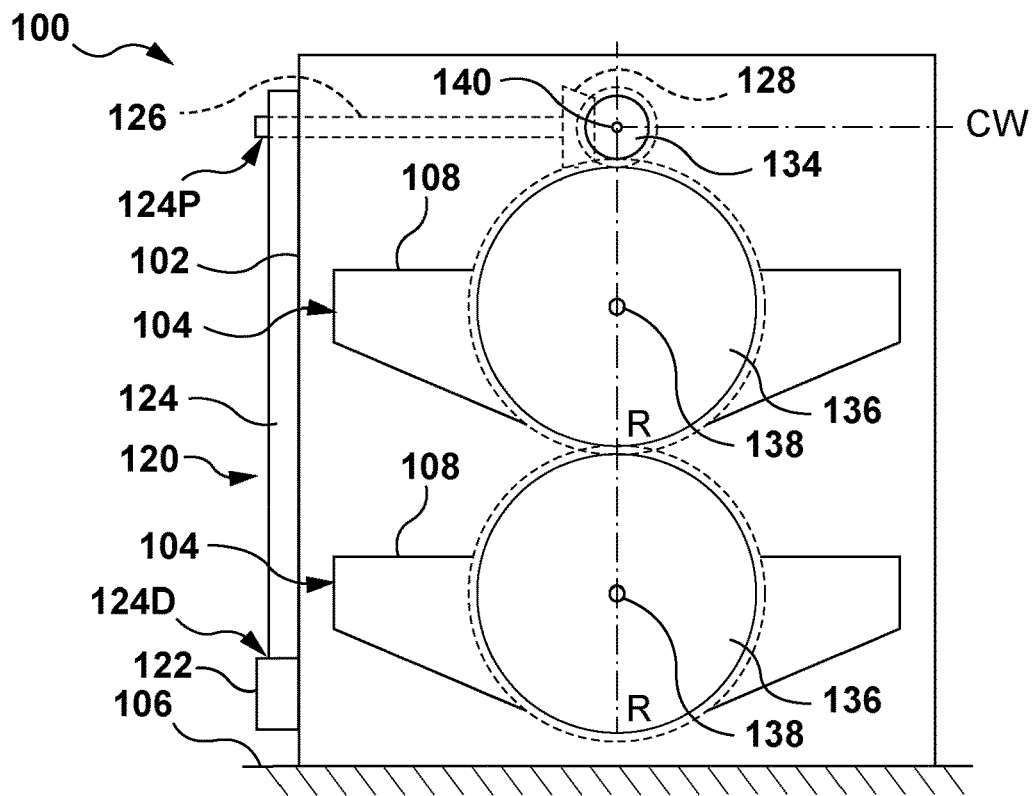
FIG. 9A is a simplified schematic side elevation view of the energy capture device of FIG. 1 during a fourth stage of oscillation.
Figure 9B:
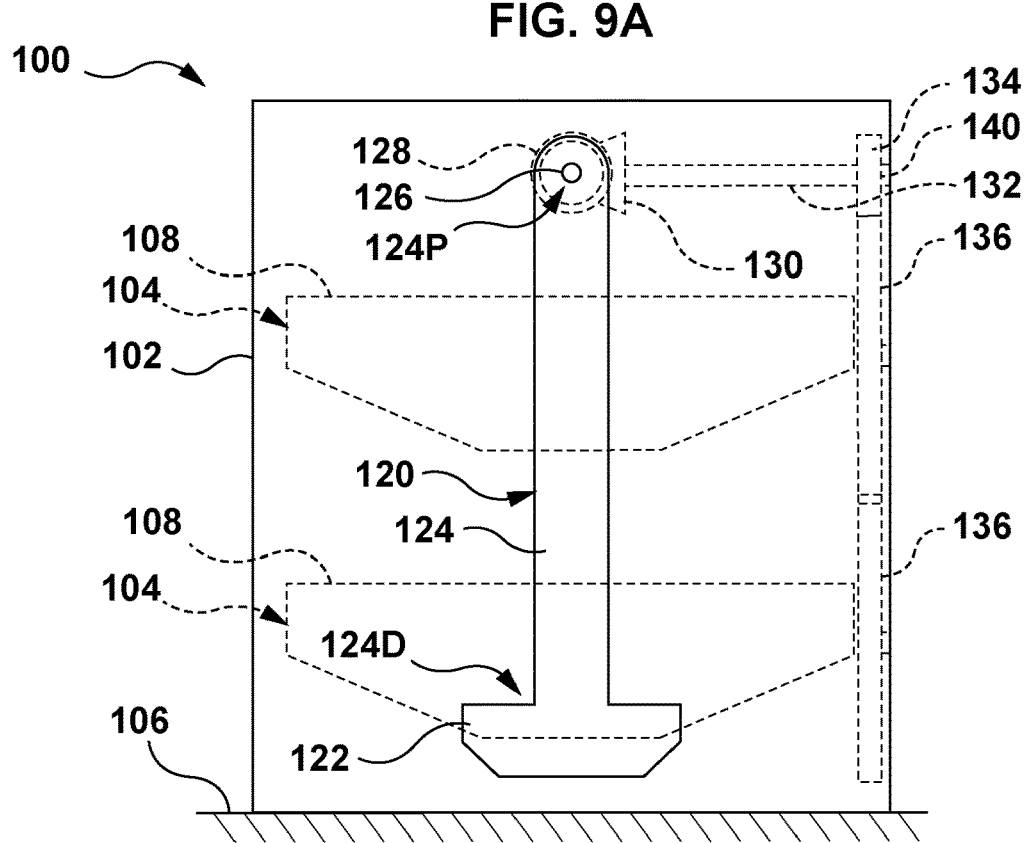
FIG. 9B is a simplified schematic rear elevation view of the energy capture device of FIG. 1 during the fourth stage of oscillation.
Figure 9C:
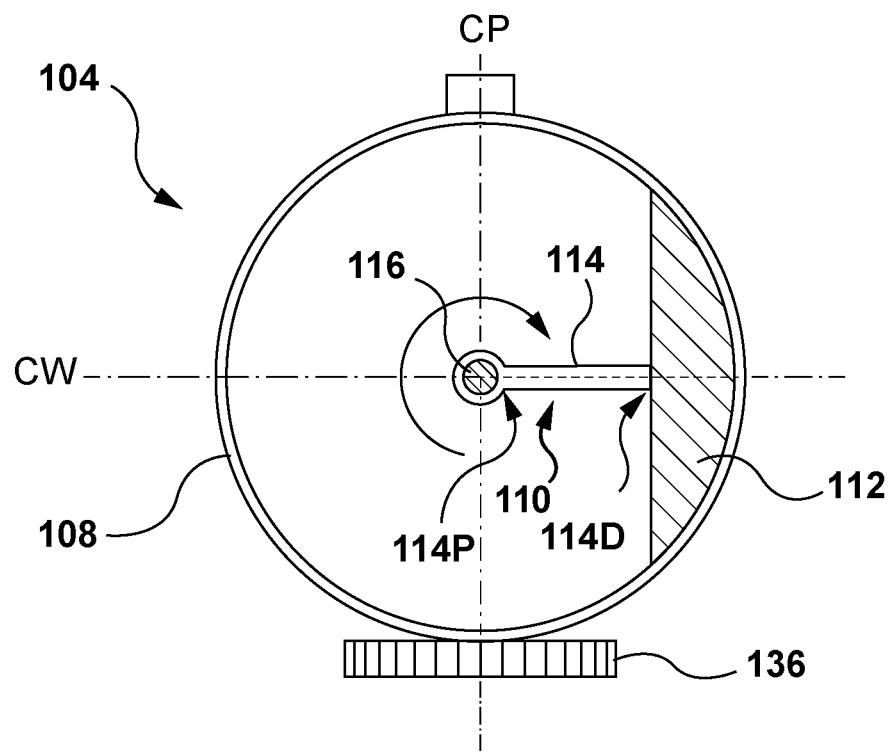
FIG. 9C is a simplified schematic top cross-sectional plan view showing the upper rotor assembly of the energy capture device of FIG. 1 during the fourth stage of oscillation.
Figure 9D:
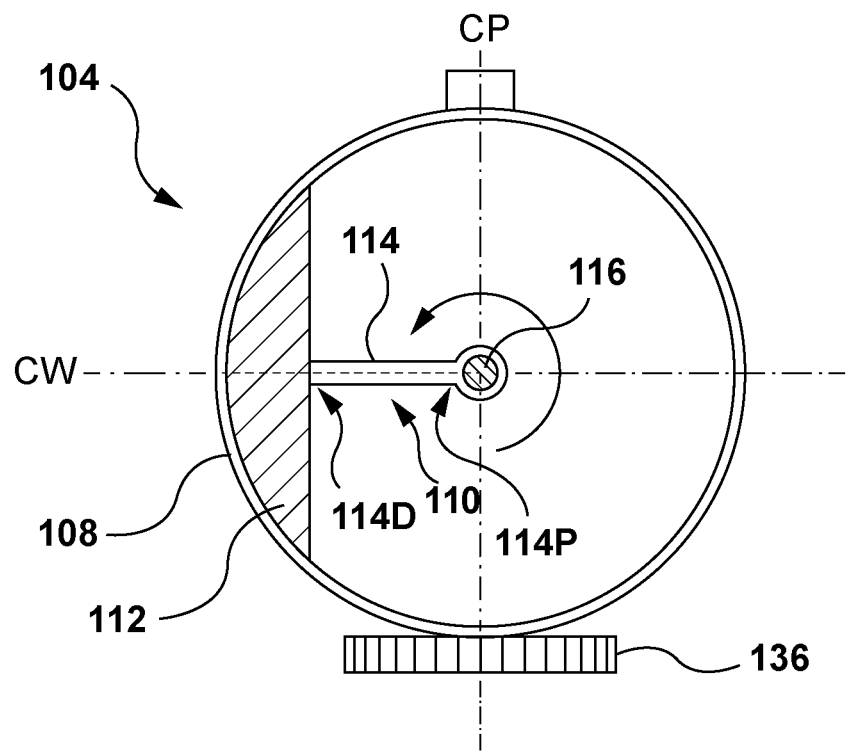
FIG. 9D is a simplified schematic top cross-sectional plan view showing the upper rotor assembly of the energy capture device of FIG. 1 during the fourth stage of oscillation.

Oscillation continues through a third stage, shown in FIGS. 8A through 8D, where the frame dips relative to gravity in the direction opposite that shown in FIGS. 6A through 6D. Again, the pendulum arm 124 remains vertical relative to gravity, and therefore pivots relative to the frame 102 into the position shown in FIG. 8B. This pivoting of the pendulum arm 124 causes the cradles 108 to pivot about their respective pivot axes CP in opposite directions, so that the sides of the cradles 108 distal from the pendulum arm 124 are closer together than the sides of the cradles 108 proximal to the pendulum arm 124, as shown in FIGS. 8A and 8B. The cradles 108 are now inclined in the opposite direction, and gravity continues to act on the unbalancing weights 112, maintaining rotation of the rotors 110 in opposite directions about the respective rotation axes R, as shown in FIGS. 8C and 8D.

In a fourth stage of oscillation, shown in FIGS. 9A to 9D, the frame 102 returns from the position shown in FIGS. 8A to 8D to an upright position, relative to gravity. Since the pendulum arm 124 remains vertical relative to gravity, it pivots relative to the frame 102, returning from the extreme position shown in FIG. 8B. This relative pivoting of the pendulum arm 124 pivots the cradles 108 back to an approximately level position wherein the sides of the cradles 108 are approximately equidistant from one another. Meanwhile, the rotors 110 continue to rotate, moving to the positions shown in FIGS. 9C and 9D, with the rotor arms 114 again approximately parallel to the counterweight pivot axis CW but each pointing in opposite direction from that shown in FIGS. 7C and 7D.

Figure 10A:
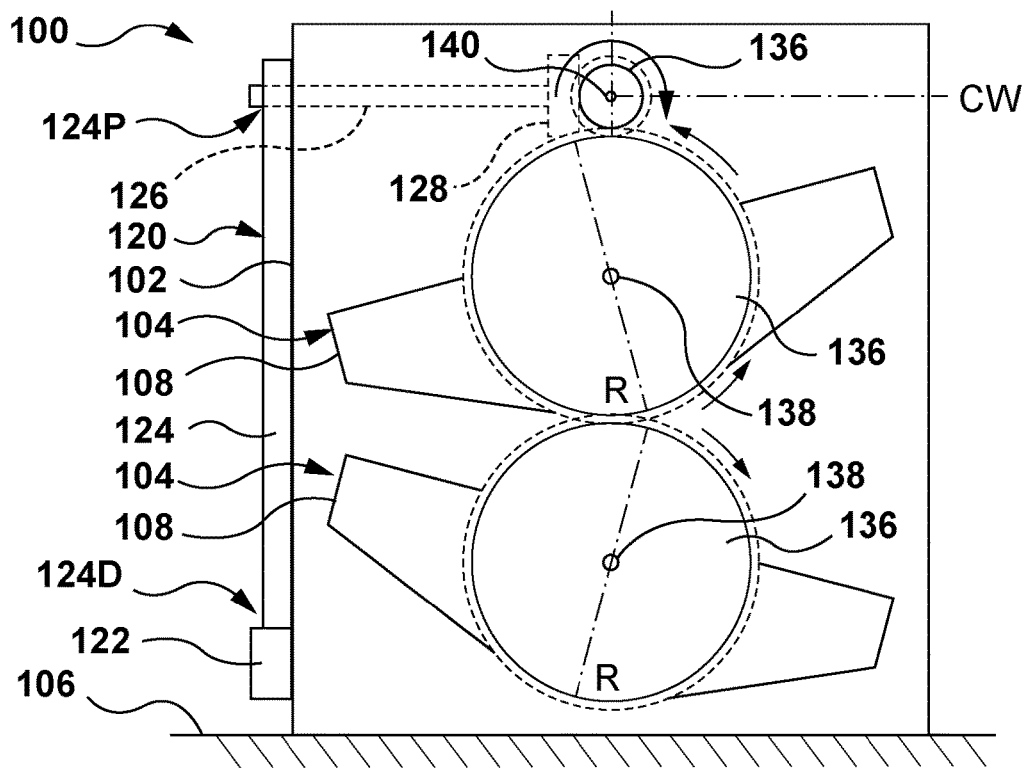
FIG. 10A is a simplified schematic side elevation view of the energy capture device of FIG. 1 completing an oscillation cycle.
Figure 10B:
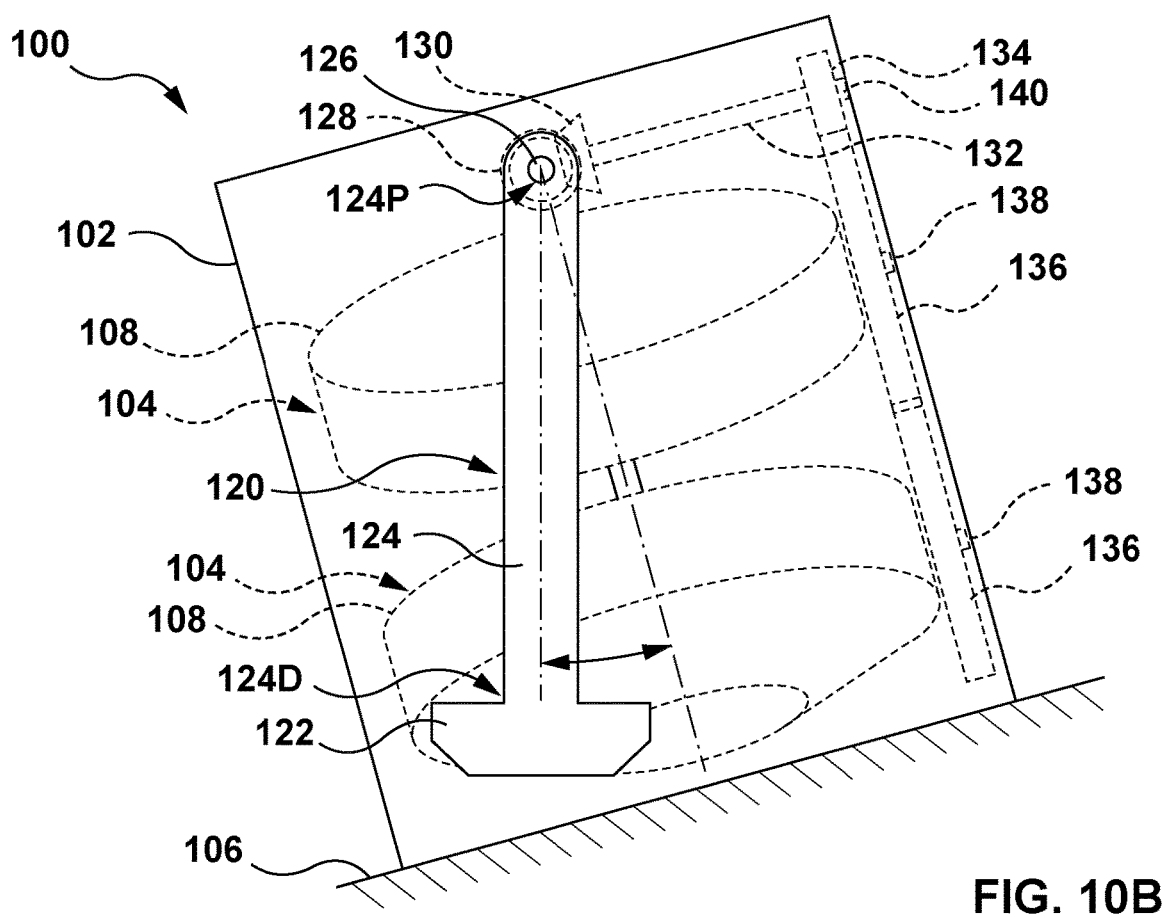
FIG. 10B is a simplified schematic rear elevation view of the energy capture device of FIG. 1 completing the oscillation cycle.
Figure 10C:
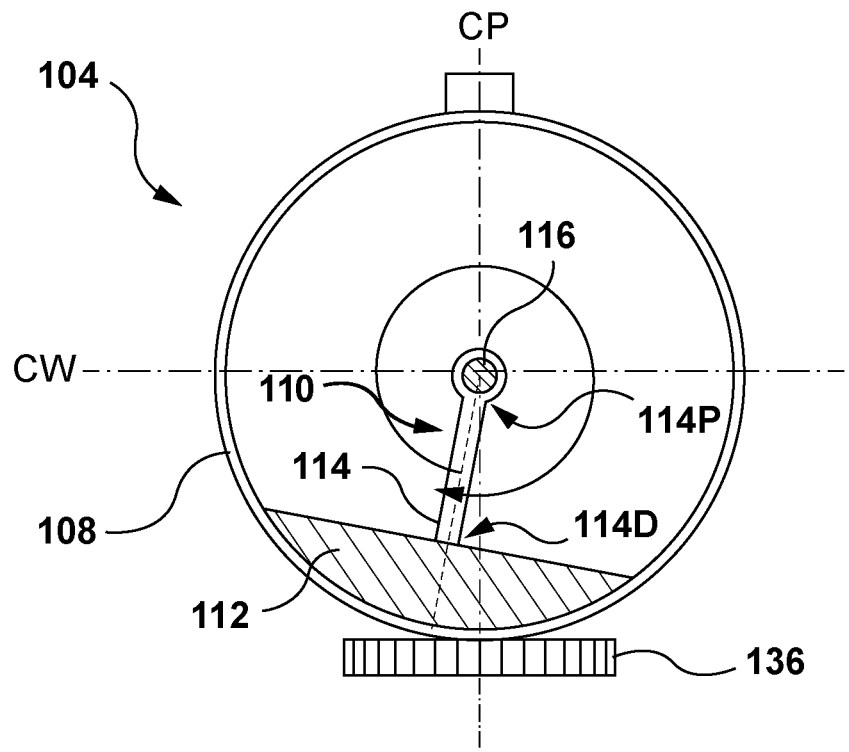
FIG. 10C is a simplified schematic top cross-sectional plan view showing the upper rotor assembly of the energy capture device of FIG. 1 completing the oscillation cycle.
Figure 10D:
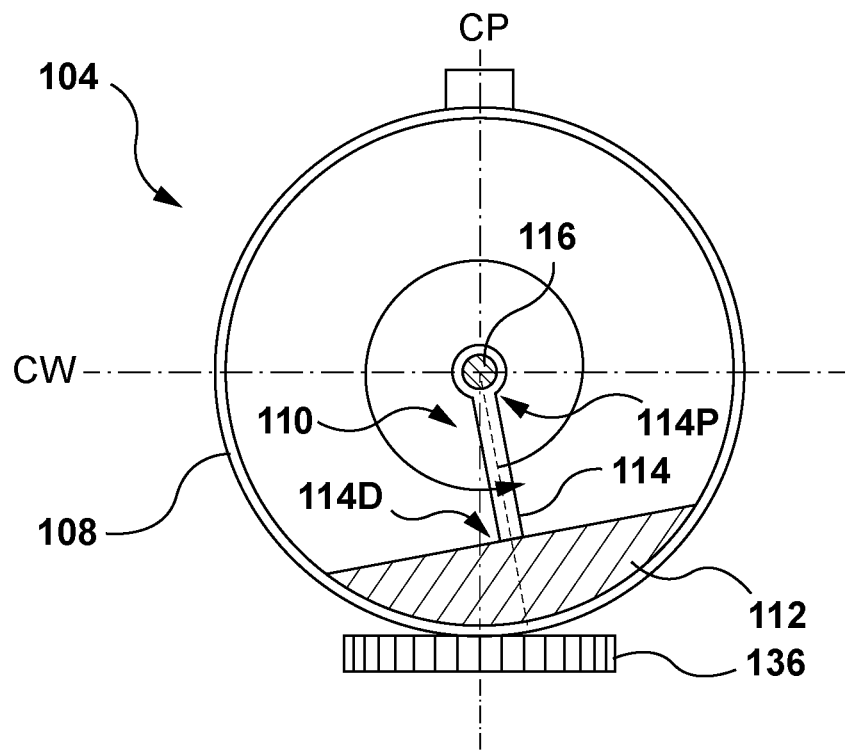
FIG. 10D is a simplified schematic top cross-sectional plan view showing the upper rotor assembly of the energy capture device of FIG. 1 completing the oscillation cycle.

As oscillation continues, the frame 102 again dips relative to the direction of gravity, with the pendulum arm 124 remaining vertical relative to gravity, and therefore pivoting the cradles 108 in opposite directions about their respective pivot axes CP, so that the sides of the cradles 108 proximal to the pendulum arm 124 are closer together than the sides of the cradles 108 distal from the pendulum arm 124, as shown in FIGS. 10A and 10B. This inclination of the cradles allows gravitation action on the unbalancing weights 112 to continue rotation of the rotors 110 in opposite directions about the respective rotation axes R, as shown in FIGS. 10C and 10D. This completes one oscillation cycle, and the rotors 110 have each made one complete revolution. Thus, it will be noted that completion of the oscillation cycle shown in FIGS. 10A to 10D is identical to initiation of the oscillation cycle as shown in FIGS. 6A to 6D. As the frame 102 continues to oscillate, the rotors will continue to rotate about the respective rotation axes R. Energy can be captured from rotation of the rotors 110 in a number of ways, including electrical and mechanical, as will be described further below.

Thus, FIGS. 6A to 10D show a method for capturing energy from an oscillating object, in which an unbalanced rotor is oscillated on or within the oscillating object to rotate the rotor while reciprocally pivoting the rotor about a counter-oscillation axis that is substantially perpendicular to both a rotation axis of the rotor and the oscillation axis for the oscillating object. Reciprocally pivoting the rotor about the counter-oscillation axis urges the rotor to rotate continuously instead of reciprocally, and energy from rotation of the rotor can be captured, for example mechanically or electrically. Optionally, the counter-oscillation axis may be moved to maintain the counter-oscillation axis substantially perpendicular to the oscillation axis for the oscillating object, for example using a turntable.

In the illustrative embodiment shown in FIGS. 1 to 10D, the central shaft 116 in each of the cradles 108 is isolated from the other central shaft 116, so that each of the rotors 110 rotate independently. This configuration is well-suited to an electrical power take-off. For example, the proximal end 114P of each rotor arm 114 may be fixedly coupled to the central shaft 116 so that rotation of the rotor 110 also rotates the central shaft 116. The central shaft 116 may thus form part of the rotor 110, and rotate within a stator, with suitable rotor and stator components such as magnets and windings, so as to induce an electrical current. Alternatively, the cradle 108 may carry stator components of an electrical generator and the rotor 110 may carry rotor components of an electrical generator, whereby the rotor 110 and the cradle 108 combine so that the rotor assembly 104 is an electrical generator. For example, one of the rotor and the cradle may carry electrical windings and the other of the rotor and the cradle may carry magnets, whereby the rotor and the cradle combine to form an electrical generator to induce an electrical current by rotation of the rotor 110 within the cradle 108. In such embodiments, the rotor 110 may be generally circular (while retaining the unbalancing weight 112). Other configurations for electrical power take-off are also contemplated.

In other embodiments, the power take-off is a mechanical power take-off. For example, the mechanical power take-off may comprise one or more shafts rotated by the rotor(s), which may drive another mechanical device, such as a pump which can convert the rotation of the rotor(s) into hydraulic or pneumatic power.

Reference is now made to FIGS. 11 to 21, which show a non-limiting illustrative physical embodiment of an energy capture device of the type shown in FIGS. 1 to 10D, with like reference numerals denoting like features, but with the prefix "11" instead of "1".

Figure 11:
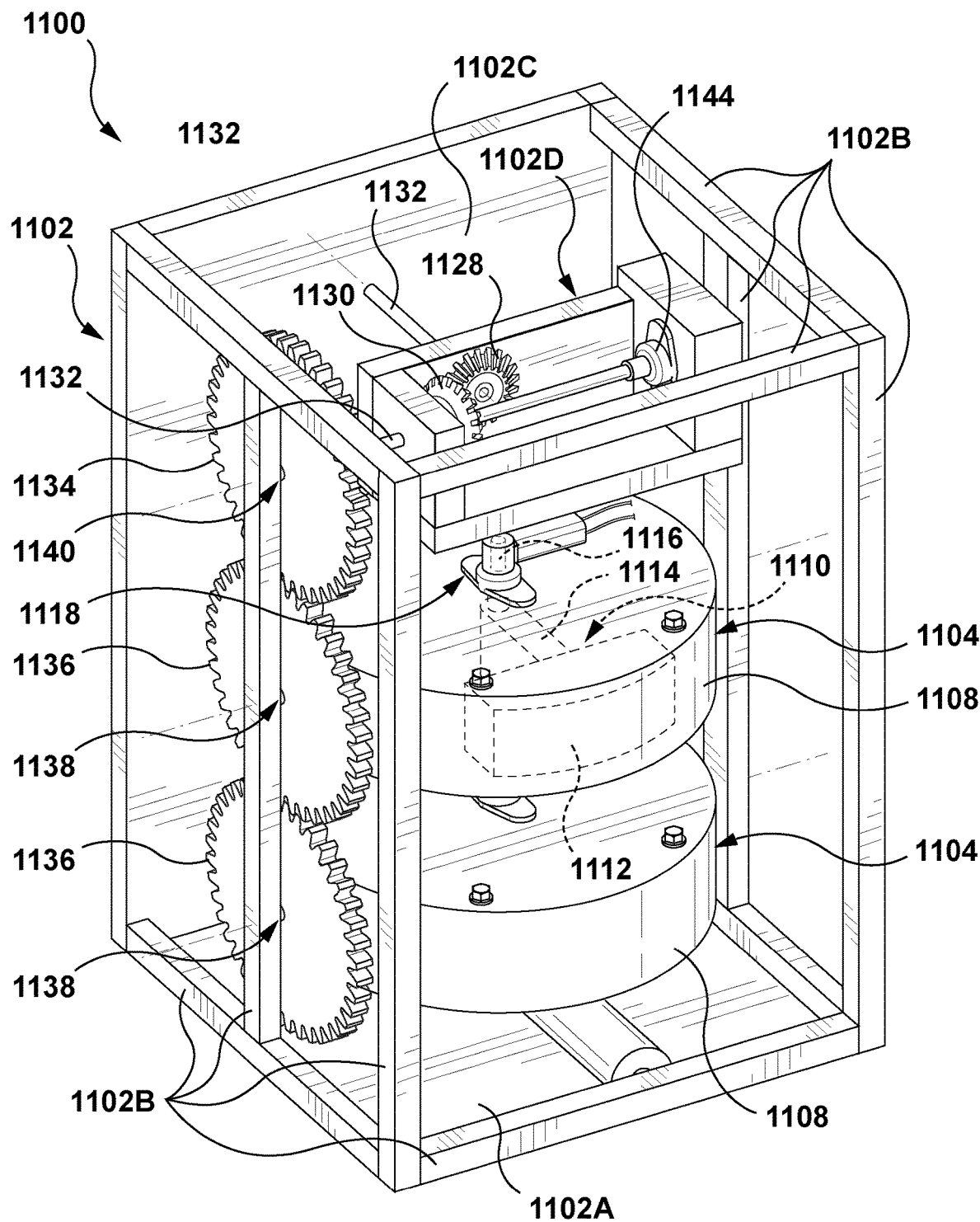
FIG. 11 is a top front perspective view of an illustrative physical implementation of an energy capture device of the type shown in FIG. 1.
Figure 12:
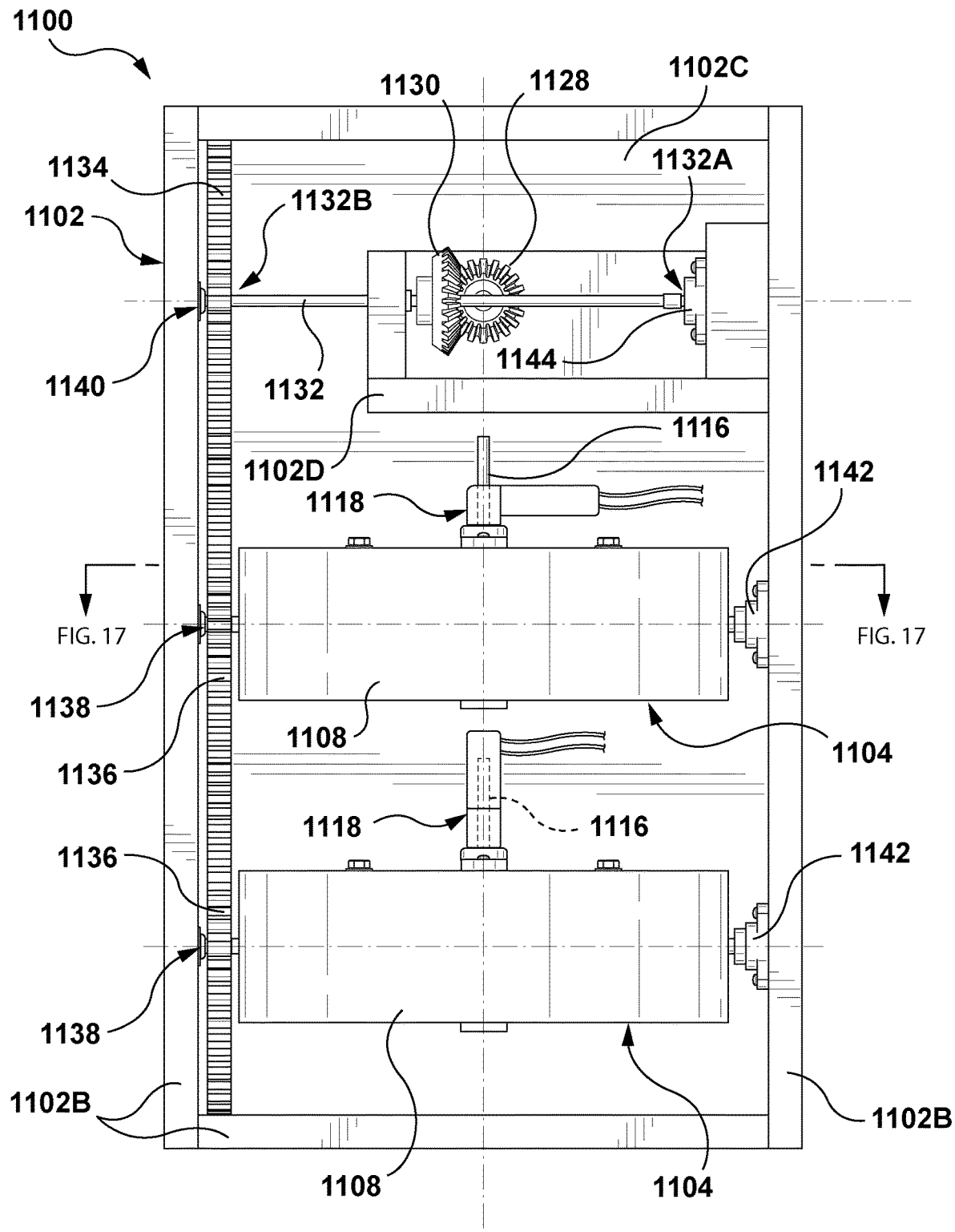
FIG. 12 is a front elevation view of the energy capture device of FIG. 11.
Figure 13:
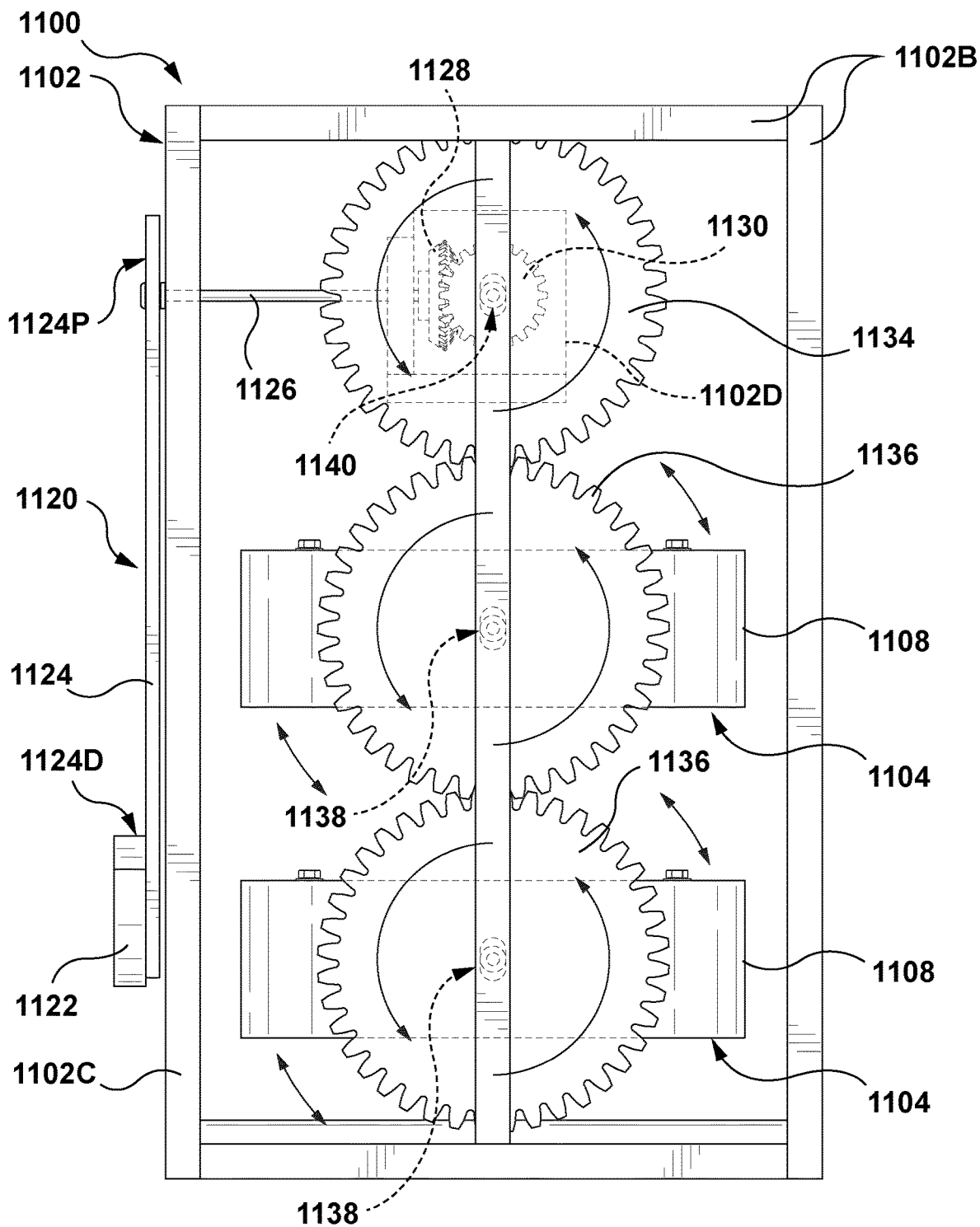
FIG. 13 is a first side elevation view of the energy capture device of FIG. 11.
Figure 14:
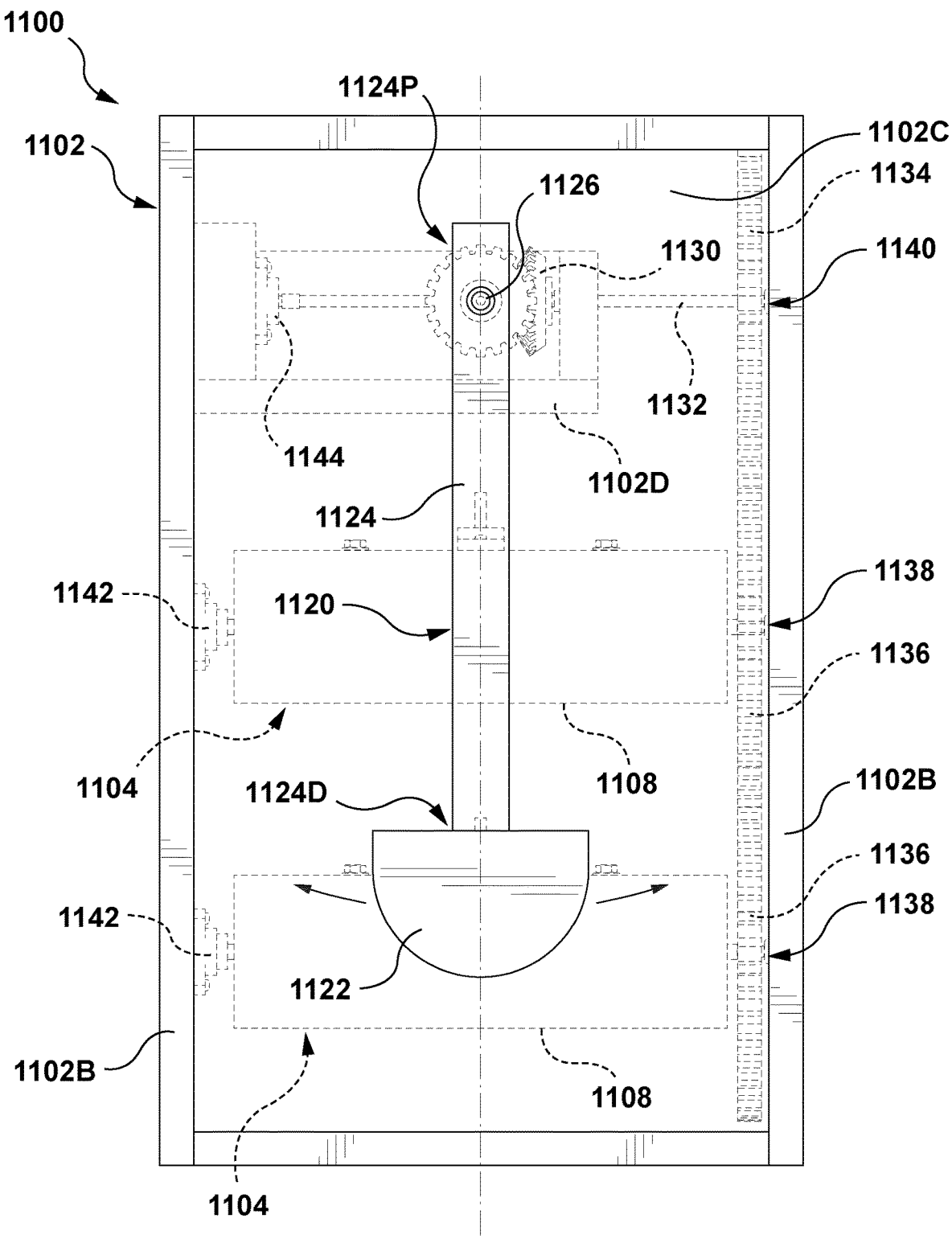
FIG. 14 is a rear elevation view of the energy capture device of FIG. 11.
Figure 15:
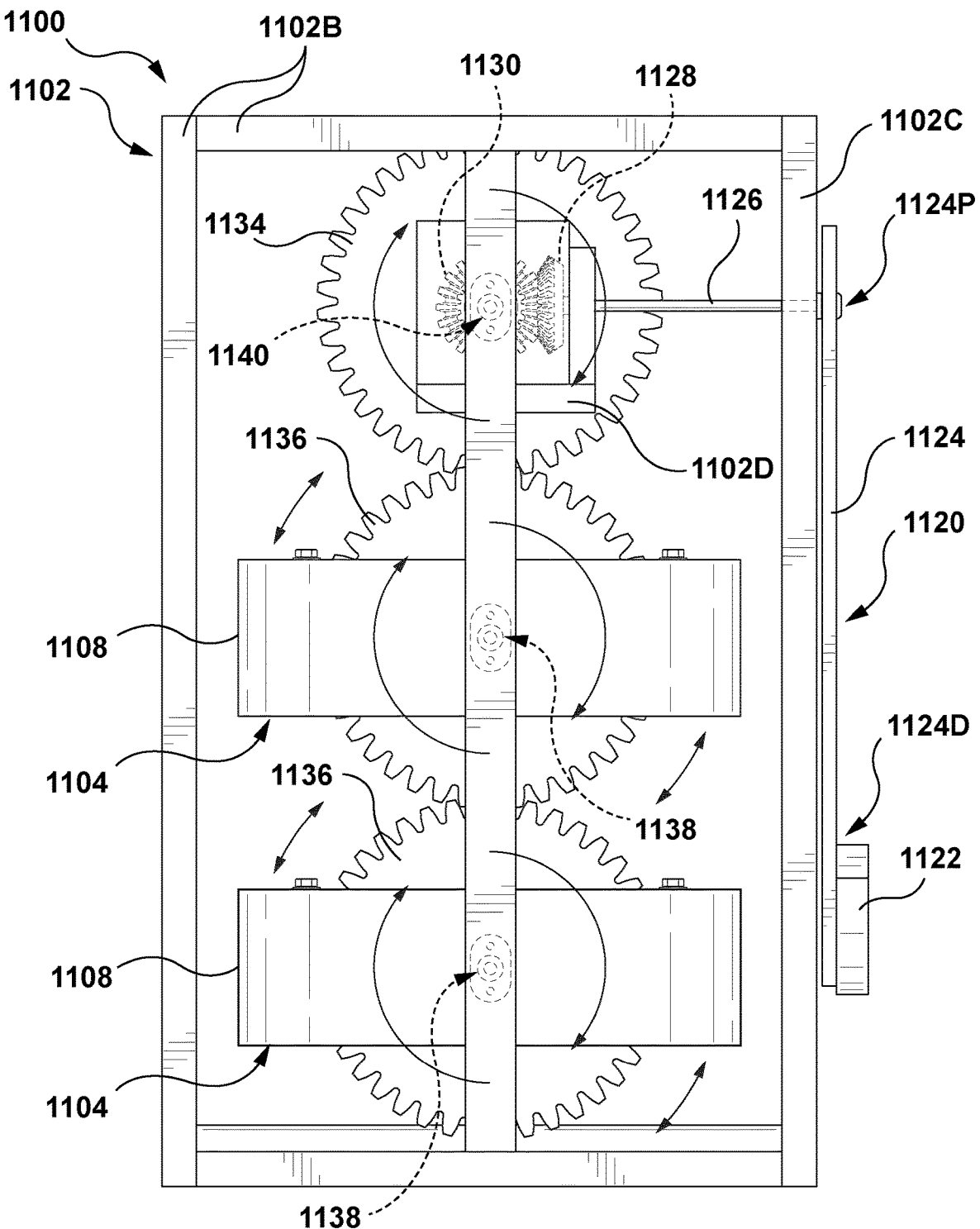
FIG. 15 is a second side elevation view of the energy capture device of FIG. 11.
Figure 16:
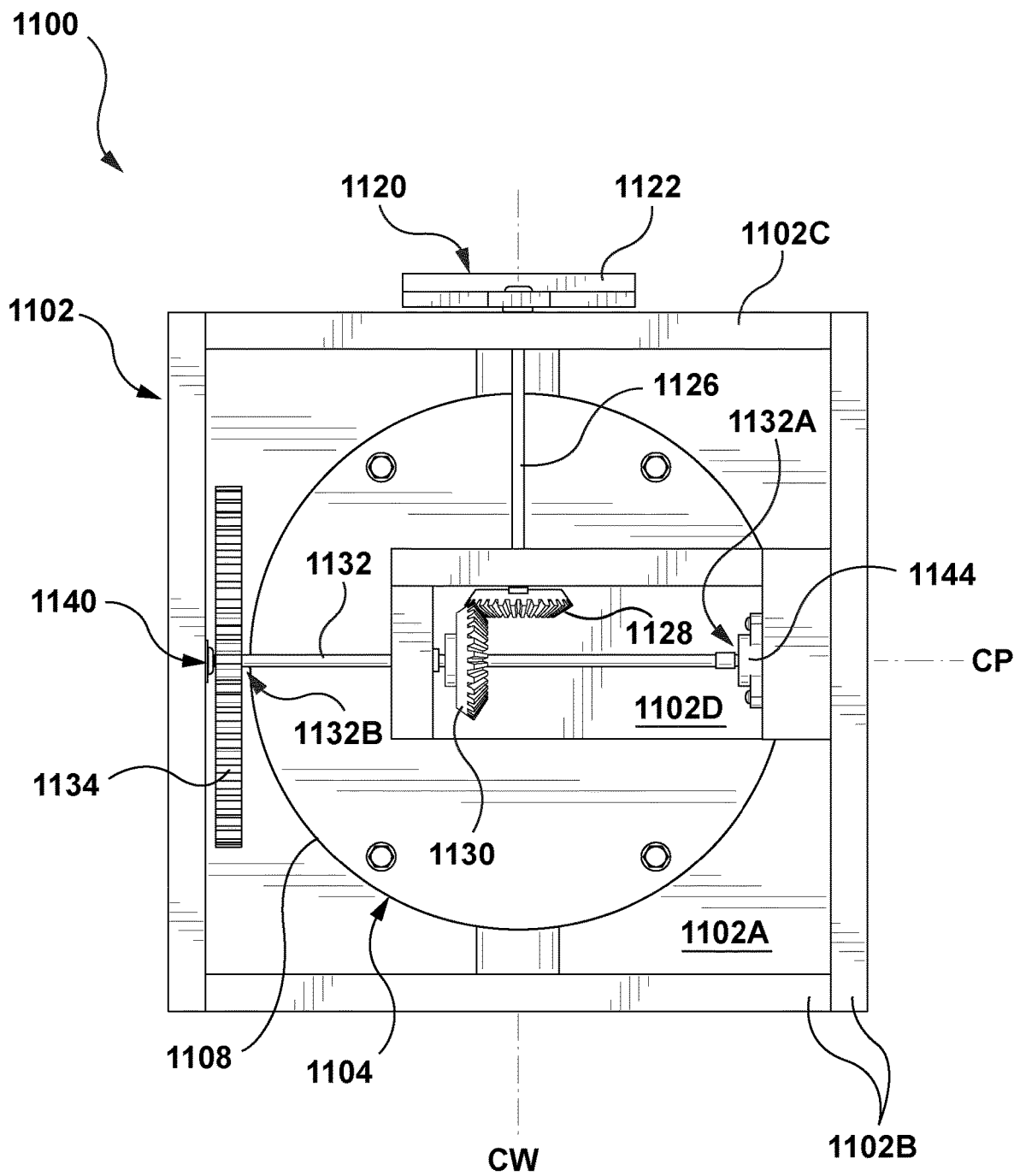
FIG. 16 is a top plan view of the energy capture device of FIG. 11.
Figure 17:
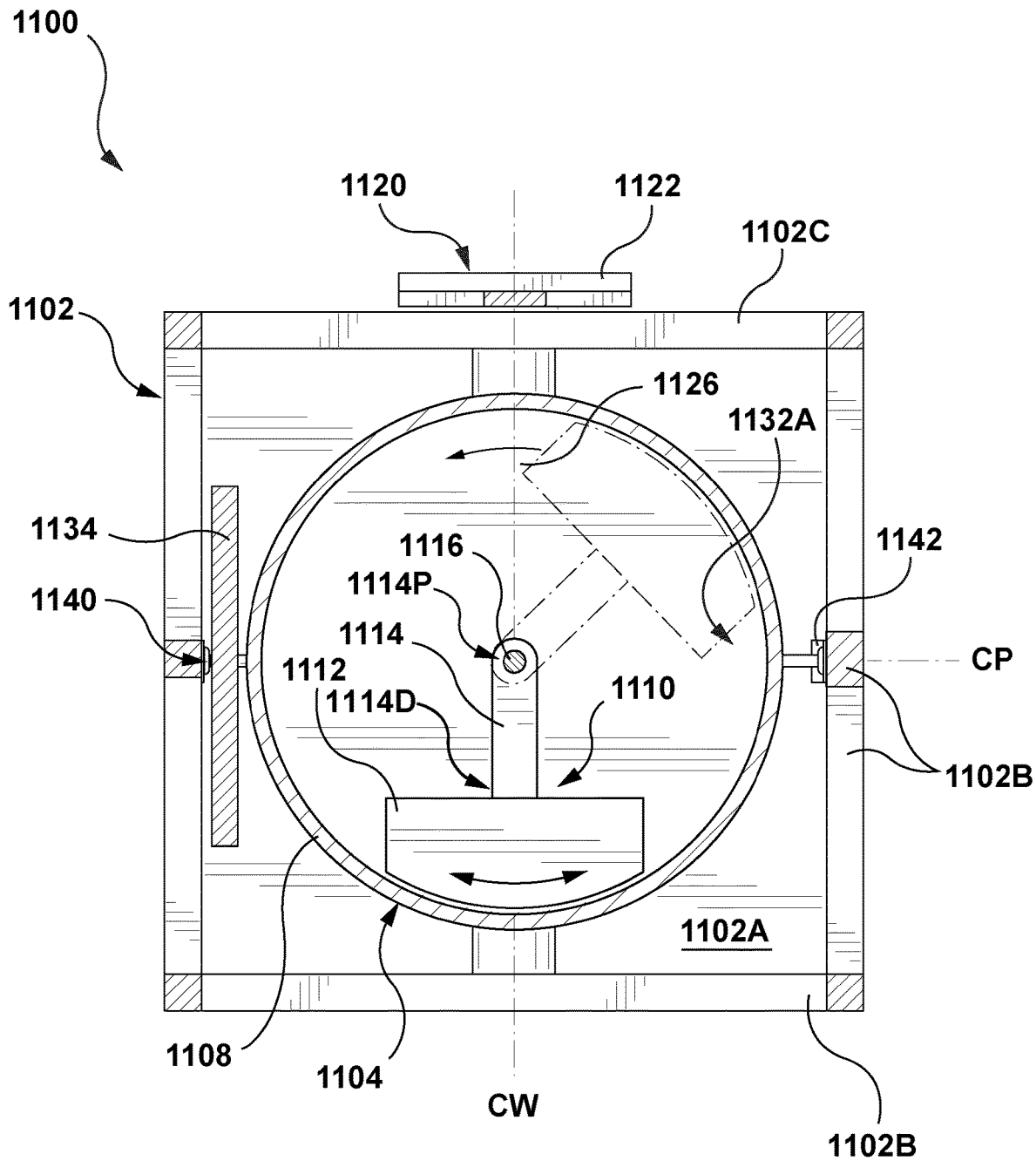
FIG. 17 is a cross-sectional view of the energy capture device of FIG. 11, taken along the line 17-17 in FIG. 12.
Figure 18:
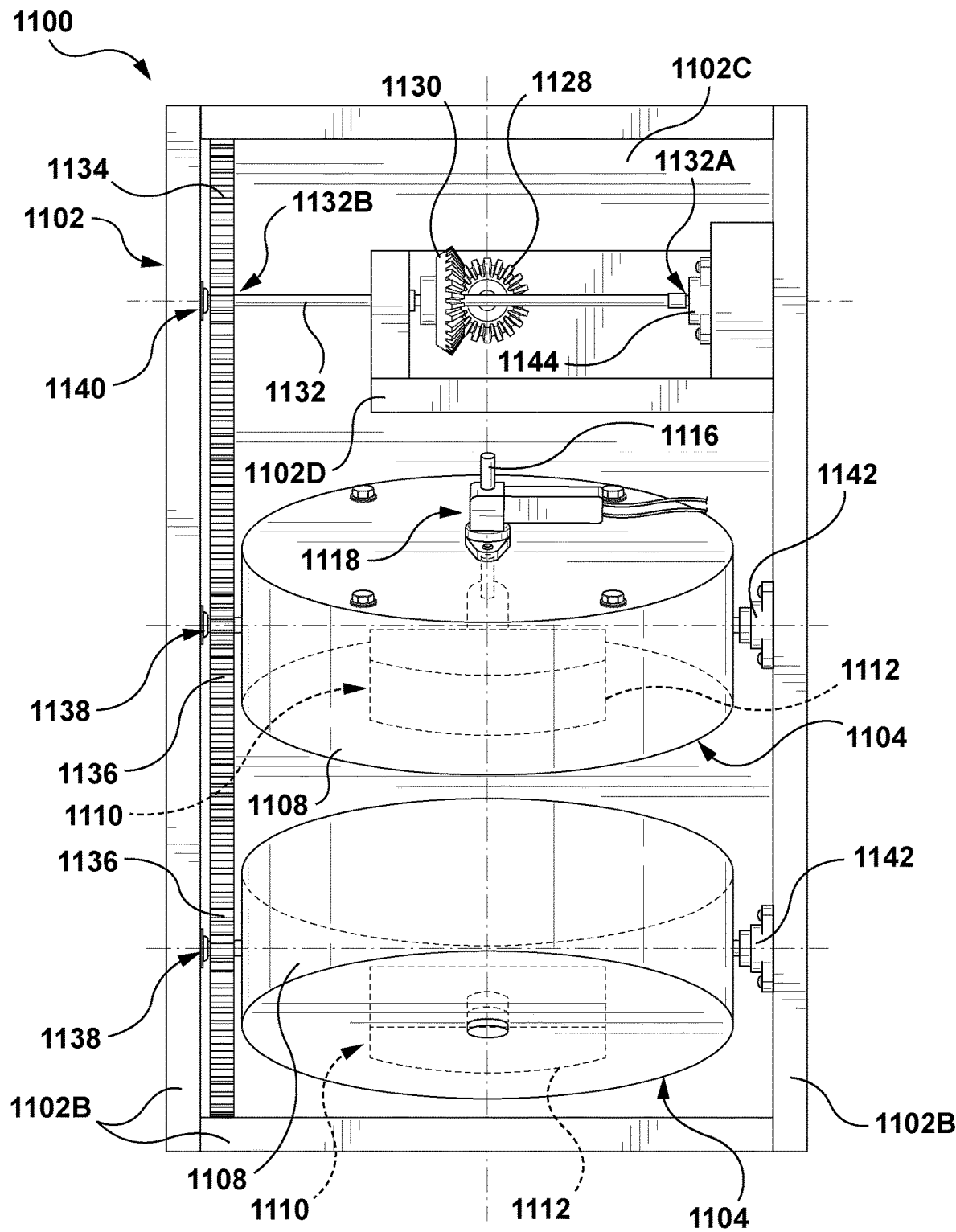
FIG. 18 is a front elevation view of the energy capture device of FIG. 11 showing a reciprocal range of motion of rotor assemblies thereof.
Figure 19:
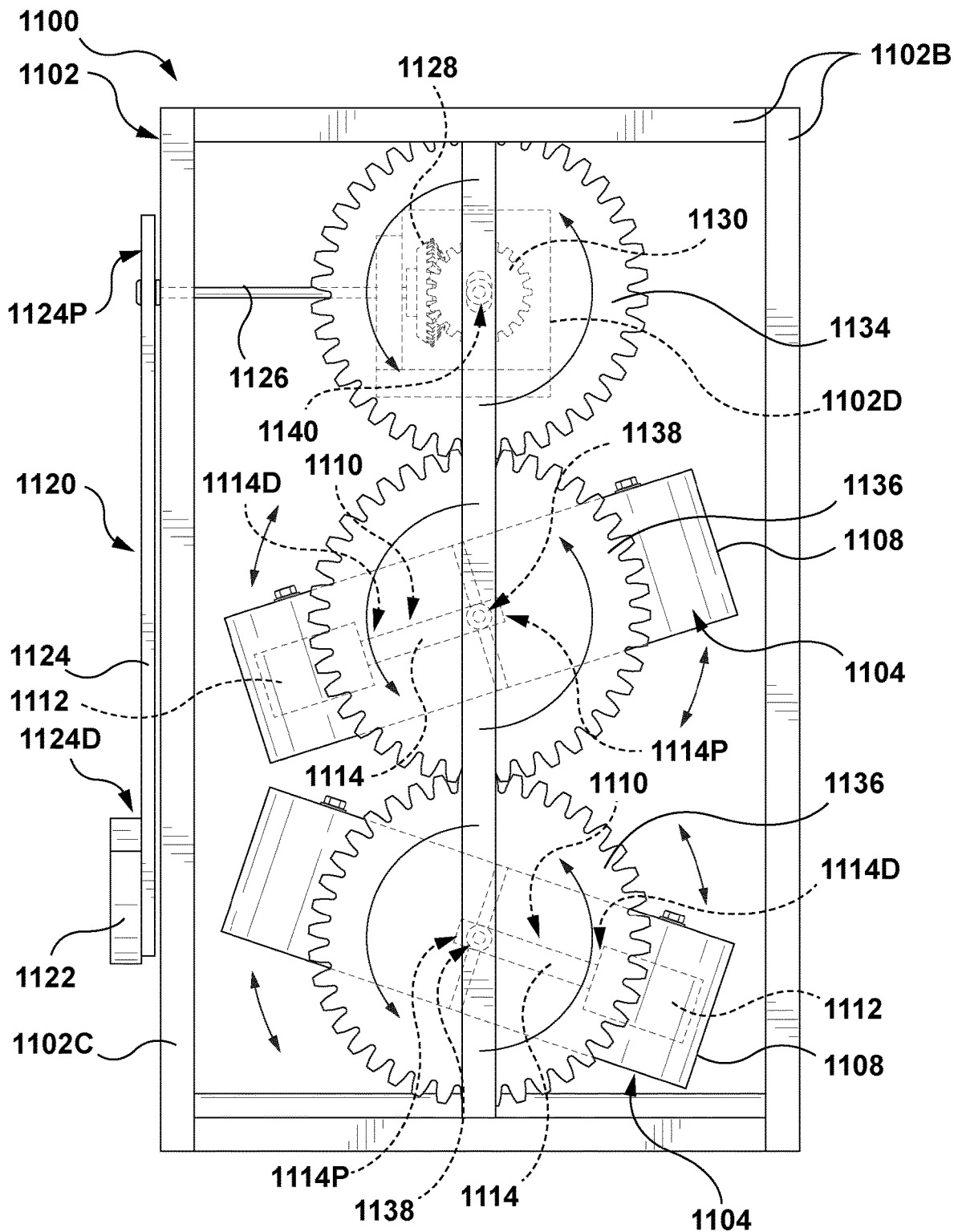
FIG. 19 is a first side elevation view of the energy capture device of FIG. 11 showing a reciprocal range of motion of rotor assemblies thereof.
Figure 20:
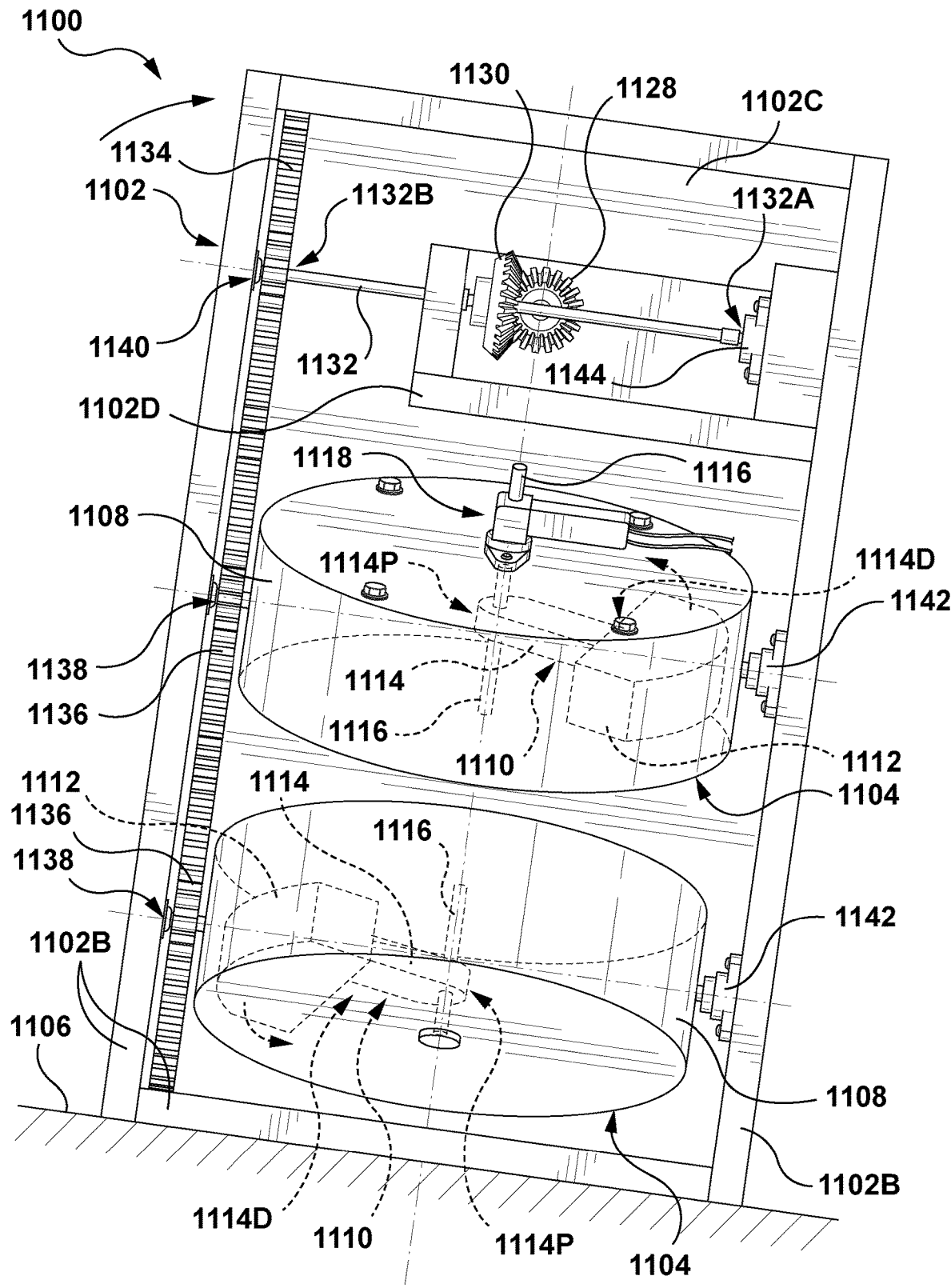
FIG. 20 is a front elevation view of the energy capture device of FIG. 11 showing motion of rotor assemblies thereof during oscillation.
Figure 21:
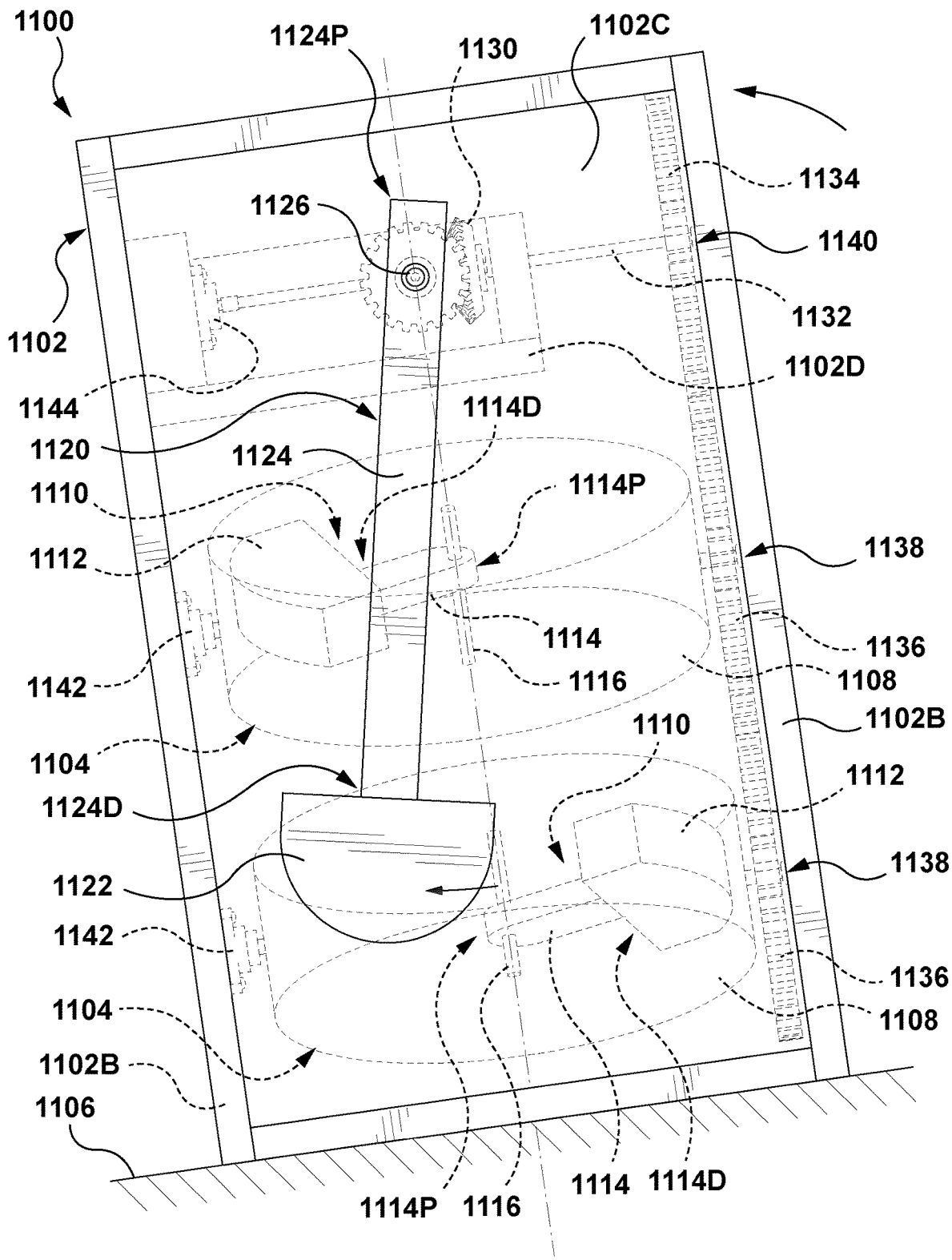
FIG. 21 is a rear elevation view of the energy capture device of FIG. 11 showing motion of rotor assemblies thereof during oscillation.

The illustrative energy capture device 1100 comprises a frame 1102 formed from a base 1102A, a plurality of structural members 1102B, a back plate 1102C and a transmission housing 1102D fixed to one of the structural members 1102B and projecting inwardly into the frame 1102 toward an upper end thereof. The illustrative energy capture device 1100 further comprises two rotor assemblies 1104. Each rotor assembly 1104 comprises a cradle 1108 and, as shown in FIGS. 11 and 17, further comprises a rotor 1110 that is rotatably carried by the cradle 1104 so that the rotor 1110 is rotatable about a rotation axis within the cradle 1104. In the illustrated embodiment, the rotor 1110 is generally hammer-shaped and comprises an unbalancing weight 1112 at the distal end 1114D of a rotor arm 1114 whose proximal end 1114P is fixedly coupled to a central shaft 1116 which rotates within the cradle 1108. The unbalancing weight 1112 will unbalance the rotation of the rotor 1110 within the cradle 1108.

An upper end of each shaft 1116 extends into an electrical power take-off comprising an electrical generator 1118 fixed to an upper cover of the respective cradle 1108. The upper end of each shaft 1116 is configured as a rotor, and is rotatable within the stator of the respective electrical generator 1118 to generate electrical current. This is merely one illustrative implementation. In other embodiments, for example, the cradle may carry stator components of an electrical generator and the rotor may carry rotor components of an electrical generator, whereby the rotor and the cradle combine so that the rotor assembly is an electrical generator. For example, one of the rotor and the cradle may carry electrical windings and the other of the rotor and the cradle may carry magnets, whereby the rotor and the cradle combine to form an electrical generator.

Each cradle 1108 is pivotably carried by the frame 1102 so as to pivotally reciprocate within a limited range of reciprocal motion within the frame 1102 about a respective cradle pivot axis intersecting and substantially perpendicular to the rotation axis for the cradle 1108. Each cradle 1108 is fixed to a respective cradle gear 1136; the cradle gears 1136 mesh with one another and are pivotably coupled to one of the structural members 1102B of the frame 1102 at pivot points 1138. The cradles are pivotably supported by bearings 1142 mounted on one of the structural members 1102B opposite the pivot points 1138. Thus, each cradle 1108 is pivotably carried by the frame 1102, and the intermeshed cradle gears 1136 cause the cradles 1108 to pivot in unison but in opposite directions. The limited range of reciprocal motion is shown in FIGS. 18 to 21.

A return actuator 1120 comprises a counterweight 1122 disposed at the distal end 1124D of a pendulum arm 1124 whose proximal end 1124P is fixed to a counterweight driveshaft 1126 that extends rotatably through the back plate 1102C of the frame 1102 and through the transmission housing 1102D and terminates with a pendulum bevel gear 1128 inside the transmission housing 1102D within the frame 1102. The pendulum bevel gear 1128 meshes with a rotor assembly return bevel gear 1130 inside the transmission housing 1102D. The rotor assembly return bevel gear 1130 is disposed on a rotor assembly return driveshaft 1132 that extends through the transmission housing 1102D; the first end 1132A is supported on a bearing 1144 carried by the transmission housing. The second end 1132B of the rotor assembly return driveshaft 1132 carries a coupling gear 1134. The coupling gear 1134 is pivotably coupled at a pivot point 1140 to the same structural member 1102B as the cradle gears 1136 and meshes with the uppermost cradle gear 1136 which in turn meshes with the lowermost cradle gear 1136.

The counterweight 1122 is pivotably carried by the frame 1102, by way of the pendulum arm 1124 and counterweight driveshaft 1126 so as to be pivotable about a counterweight pivot axis CW substantially perpendicular to each cradle pivot axis CP. When the pendulum arm 1124 pivots relative to the frame 1102, the counterweight driveshaft 1126 rotates, which rotates the pendulum bevel gear 1128. Since the pendulum bevel gear 1128 is meshed with the rotor assembly return bevel gear 1130, the rotor assembly return bevel gear 1130 also rotates, which rotates the rotor assembly return driveshaft 1132 and therefore the coupling gear 1134. Since the coupling gear 1134 is meshed with the uppermost cradle gear 1136, which is meshed with the lower cradle gear 1136, with each cradle gear 1136 fixed to the respective cradle 1108, rotation of the coupling gear 1134 will rotate the cradle gears 1136 and pivot the cradles 1108.

Thus, in the illustrated embodiment, the counterweight 1122 is mechanically coupled to the rotor assemblies 1104 through the pendulum arm 1124, counterweight driveshaft 1126, pendulum bevel gear 1128, rotor assembly return bevel gear 1130, rotor assembly return driveshaft 1132, coupling gear 1134 and the cradle gears 1136 fixed to the respective cradles 1018. Thus, pivotal motion of the counterweight 1122 relative to the frame 1102 pivots the cradles 1108 of the rotor assemblies 1104 about the cradle pivot axis CP and, as the frame 1102 oscillates, urges each cradle 1108 to pivot back and forth within its range of reciprocal motion. This is merely one illustrative mechanical coupling and is not intended to be limiting; other mechanical coupling arrangements are also contemplated. As noted above, while only a single pendulum arm 1124 is shown above, other embodiments may have two pendulum arms, for example on opposite sides of the frame.

Figure 22:
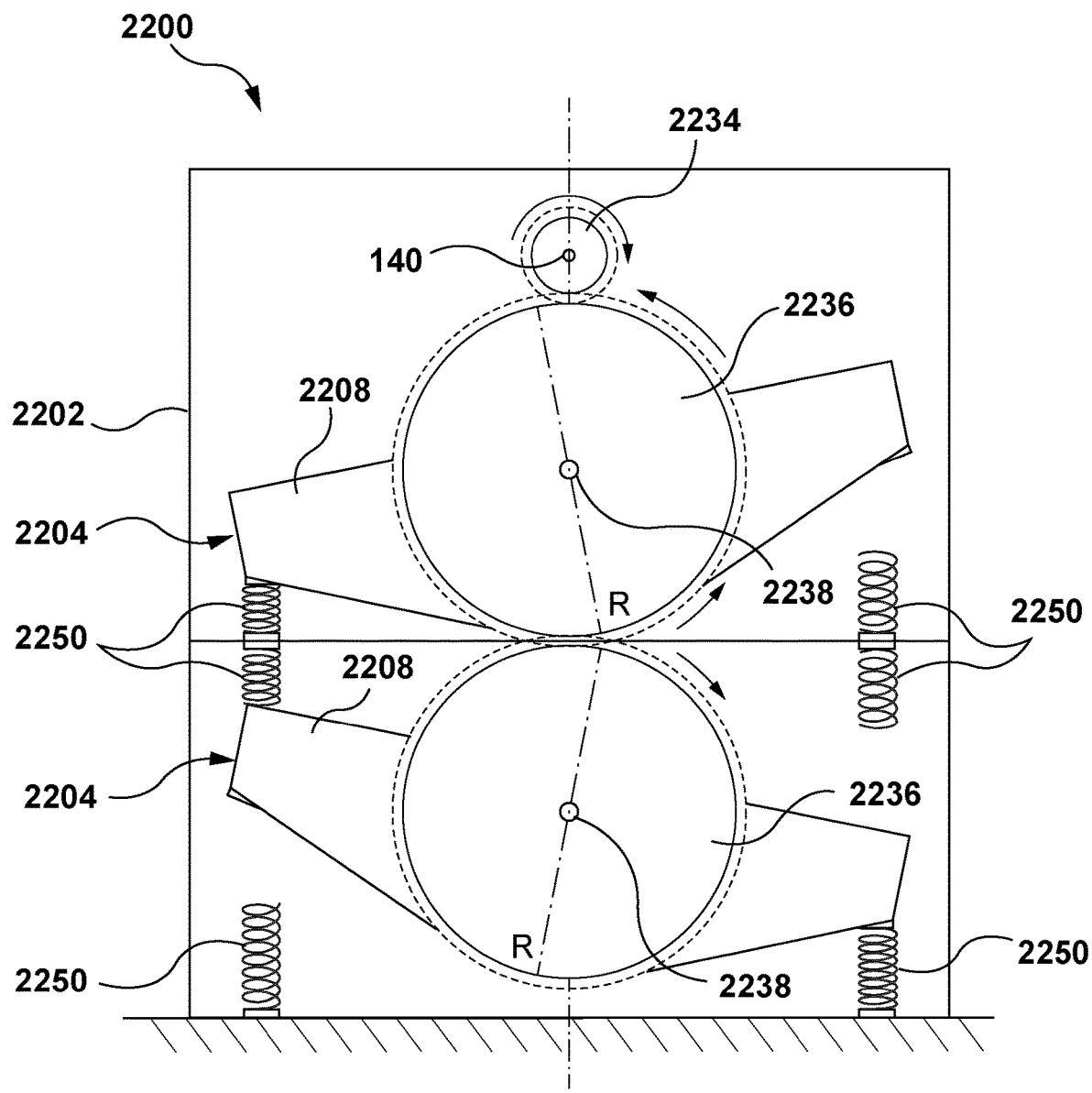
FIG. 22 is a simplified schematic side elevation view of a second illustrative energy capture device according to an aspect of the present disclosure.

Reference is now made to FIG. 22, which shows a schematic illustration of another embodiment of a device 2200 for capturing energy from an oscillating object, which is similar to the embodiments described above, with like reference numerals denoting like features except with the prefix "22", but in which the return actuator comprises a plurality of biasing members rather than a pendulum. In the illustrated embodiment, the biasing members take the form of compression springs 2250 acting between the frame 2202 and the cradle 2208 of each rotor assembly 2204. The compression springs 2250 are carried by the frame 2202 and are mechanically coupled to the cradles 2208 by physical contact as the cradles 2208 move toward the limit of their range of reciprocal motion, to urge the cradles 2208 to reverse within their range of reciprocal motion. The illustrated embodiment comprises two rotor assemblies 2204 and a plurality of biasing members (springs 2250); other embodiments may have only a single rotor assembly or more than two rotor assemblies. Also, while the illustrated embodiment shows the springs 2250 acting between the frame 2202 and the cradle 2208 of each rotor assembly 2204, other embodiments may have biasing members acting directly between the respective rotor assemblies.

Reference is now made to FIGS. 23A to 23H, which show a further embodiment of a device 2300 for capturing energy from an oscillating object. In the illustrated embodiment, the oscillating object may be a specialized boat 2406, as shown in FIGS. 24A to 24C. The boat 2406 may serve as, or may include structural elements that serve as, a frame 2302 for the device 2300; the frame 2302 is omitted from FIGS. 23A to 23H for clarity of illustration. Thus, in the illustrative embodiment shown in FIGS. 23A to 23H and FIGS. 24A to 24C, the boat 2406, and hence the frame 2302, will oscillate with wave motion when the boat 2406 floats on a body of water.

The device 2300 shown in FIGS. 23A to 23H and FIGS. 24A to 24C operates on similar principles to the devices 100, 1100, 2200 described above, but differs somewhat in its mechanical construction, as will be explained further below.

The device 2300 comprises two rotor assemblies 2304, which are arranged in horizontal registration with one another, in contrast to the rotor assemblies 104, 1104, 2204 described above which are in vertical registration with one another. Each rotor assembly 2304 comprises a respective cradle 2308 and further comprises a rotor 2310 that is rotatably carried by the cradle 2308 so that the rotor 2310 is rotatable about a rotation axis within the cradle 2308. In the illustrated embodiment, the rotor 2310 comprises an unbalancing weight 2312 which generally takes the form of a cylindrical sector (sector of a cylinder) configured so that the wider (arc) end is disposed toward the circumference or periphery of the rotor 2310 and the narrower end is disposed toward the center of the rotor 2310. The rotor 2310 is coupled to a central shaft 2316 so that the rotor 2310 can rotate within the cradle 2308. The central shaft defines the rotation axis. The rotor 2310 may be fixedly coupled to the central shaft 2316, with the central shaft 2316 being rotatable within the cradle 2308 to enable the rotor 2310 to rotate within the cradle 2308, or the rotor 2310 may be rotatably coupled to the central shaft 2316, with the central shaft 2316 being fixed to the cradle 2308. Optionally, the rotor 2310 may be rotatably coupled to the central shaft 2316, which may in turn be rotatable within the cradle 2308. Although not shown for simplicity of illustration, suitable bearing arrangements may be interposed between the rotor 2310 and the central shaft 2316 and/or between the central shaft 2316 and the cradle 2308. The unbalancing weight 2312 will unbalance rotation of the rotor 2310 within the cradle 2308. In some embodiments, the sector-shaped unbalancing weight 2312 may, together with additional components such as bearings and/or rotor components of an electrical generator, make up substantially the entirety of the rotor 2310. In other embodiments, the rotor 2310 may comprise a cylinder, for example a hollow cylinder, in which the unbalancing weight 2312 is disposed.

Each cradle 2308 is pivotably carried by the frame 2302 at bearing-supported pivot points 2338 so as to pivotally reciprocate within a limited range of reciprocal motion within the frame 2302 about a cradle pivot axis 23CP intersecting and substantially perpendicular to the rotation axis for the respective cradle 2308. Whereas the devices 100, 1100, 2200 described above had cradle pivot axes that were distinct from and parallel to one another, in the device 2300 shown in FIGS. 23A to 23H and FIGS. 24A to 24C the two cradles 2308 share a single common cradle pivot axis 23CP. Thus, as used herein, the term "at least substantially parallel", when used in reference to two axes of rotation for a component such as a cradle, includes axes that are distinct and substantially parallel, as well as cases where the components share a common axis of rotation, as in the device 2300 presently described. The cradles 2308 are coupled to one another by a return actuator 2320 carried by the frame 2302 so that each cradle 2308 will reverse within its range of reciprocal motion so as to pivot in unison but in opposite directions. The illustrated embodiment of the return actuator 2320 (which is merely one of many possible embodiments) will now be described.

In the device 2300 shown in FIGS. 23A to 23H and FIGS. 24A to 24C, the return actuator 2320 comprises two opposed substantially equal counterweights 2322 that are slidably received in respective counterweight housings 2362, a plurality of cables 2364 which mechanically couple the counterweights 2322 to the rotor assemblies 2304, in particular the cradles 2308, and a plurality of idler pulleys 2366 carried by the frame 2302 to guide the cables 2364. The term "cable" is used herein in its broadest sense, and includes braided rope of metallic and/or non-metallic fibre, chains, as well as other similar structures for transferring force by tension.

The counterweight housings 2362 are fixedly carried by the frame 2302, and hence the counterweights 2322 that are slidably received therein are slidable relative to the frame 2302. In the illustrated embodiment, the counterweights 2322 are substantially cylindrical and the counterweight housings 2362 are hollow cylinders, and both the counterweights 2322 and the counterweight housings 2362 have their axes parallel to the common cradle pivot axis 23CP such that the counterweights 2322 are slidably carried by the frame 2302 so as to be slidable relative to the frame 2302, substantially parallel to the common cradle pivot axis 23CP. Dampers, which in the illustrated embodiment take the form of coil springs 2368, are provided at each end of each of the counterweight housings 2362. Other types of dampers are also contemplated, and similarly the both the counterweights 2322 and the counterweight housings 2362 may have suitable shapes other than cylindrical. Bearings or other friction-reducing elements may also be provided.

The counterweights 2322 are mechanically coupled to the rotor assemblies 2304 by the cables 2364 such that the sliding motion of the counterweights 2322 relative to the frame 2302 pivots the cradles 2308 about the cradle pivot axis 23CP in opposite directions. More particularly, the cables 2364 comprise a first coupling 2370 extending between the two rotor assemblies 2304 on a first side of the common cradle pivot axis 23CP and a second coupling 2372 extending between the two rotor assemblies 2304 on a second side of the common cradle pivot axis 23CP opposite the first side thereof. In the illustrated embodiment, the terminal positions of the cables 2364 of the first coupling 2370 and the second coupling 2372 are coupled to the undersides of the cradles 2308 at diametrically opposed positions on a diameter of the respective cradle 2308 that is perpendicular to the common cradle pivot axis 23CP. Thus, the cables 2364 depend from the undersides of the cradles 2308, and idler pulleys 2366 redirect the cables 2364 of each of the first coupling 2370 and the second coupling 2372 to a substantially horizontal path that passes through respective ones of the counterweight housings 2362. A first one of the counterweights 2322 is fixed to the cable(s) 2364 of the first coupling 2370 and a second one of the counterweights 2322 is fixed to the cable(s) 2364 of the second coupling 2372, such that sliding movement of the counterweights 2322 within their respective counterweight housings 2362 will apply tension at one of the terminal positions of the cable(s) 2364. In one embodiment, the first coupling 2370 and the second coupling 2372 may each be made up of two cables, each having one end coupled to the respective counterweight 2322 and the other end coupled to the underside of one of the cradles 2308. In another embodiment, the first coupling 2370 and the second coupling 2372 may each be made up of a single cable that passes through a longitudinal bore in the respective counterweight 2322 and is fixed to the respective counterweight 2322. Other configurations are also contemplated.

Of note, the second coupling 2372 comprises a cable reverser circuit 2374 in which four idler pulleys 2366 form the cable(s) 2364 of the second coupling 2372 into a loop 2376 that includes the second counterweight 2322; this loop 2376 reverses the direction of the tension applied by movement of the second counterweight 2322 to the cable(s) 2364 of the second coupling 2372. Accordingly, when the counterweights 2322 move in same direction, the terminal positions of the cable(s) 2364 of the first coupling 2370 and the second coupling 2372 that are coupled to the undersides of the cradles 2308 move in opposite directions, such that sliding movement of the counterweights 2322 acts through the first coupling 2370 and the second coupling 2372 to pivot the cradles 2308 in opposite directions.

Operation of the illustrative device 2300 will now be described, with reference to FIGS. 23A to 23H.

Figure 23A:
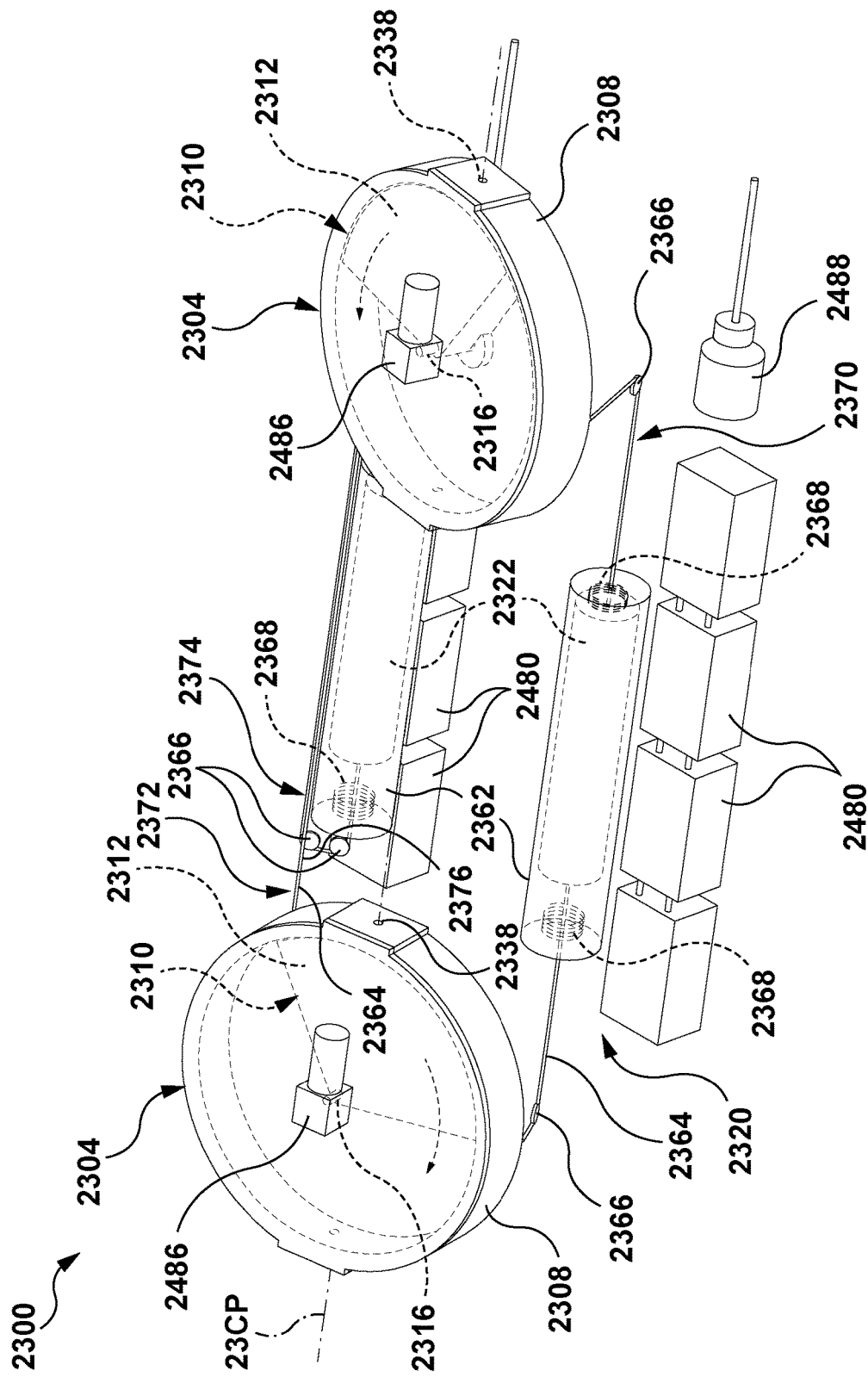
FIG. 23A is a simplified top perspective view of a third illustrative energy capture device according to an aspect of the present disclosure, shown in a first stage of oscillation.
Figure 24A:
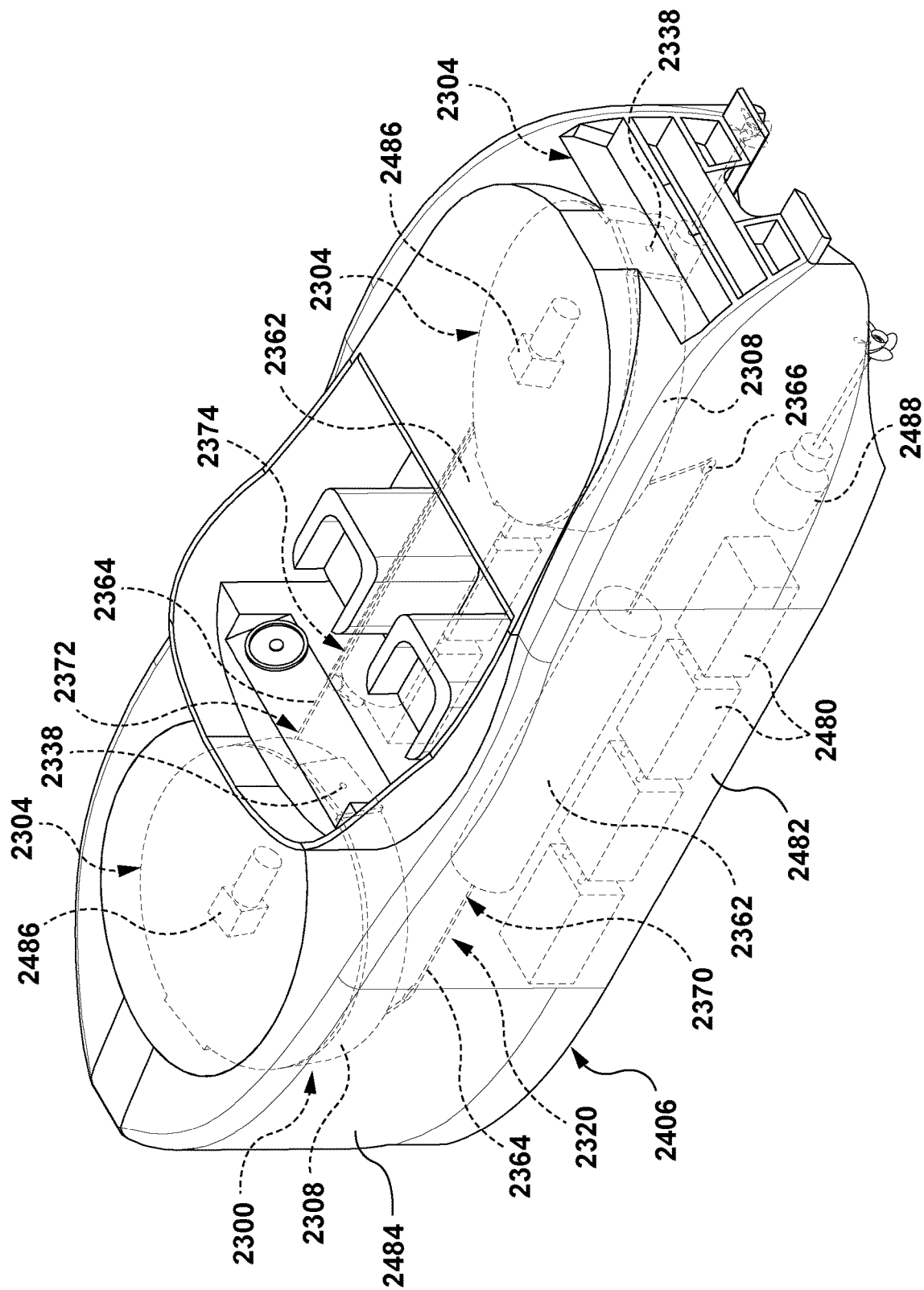
FIG. 24A is a top rear perspective view of an illustrative boat incorporating the energy capture device of FIG. 23A.
Figure 24B:
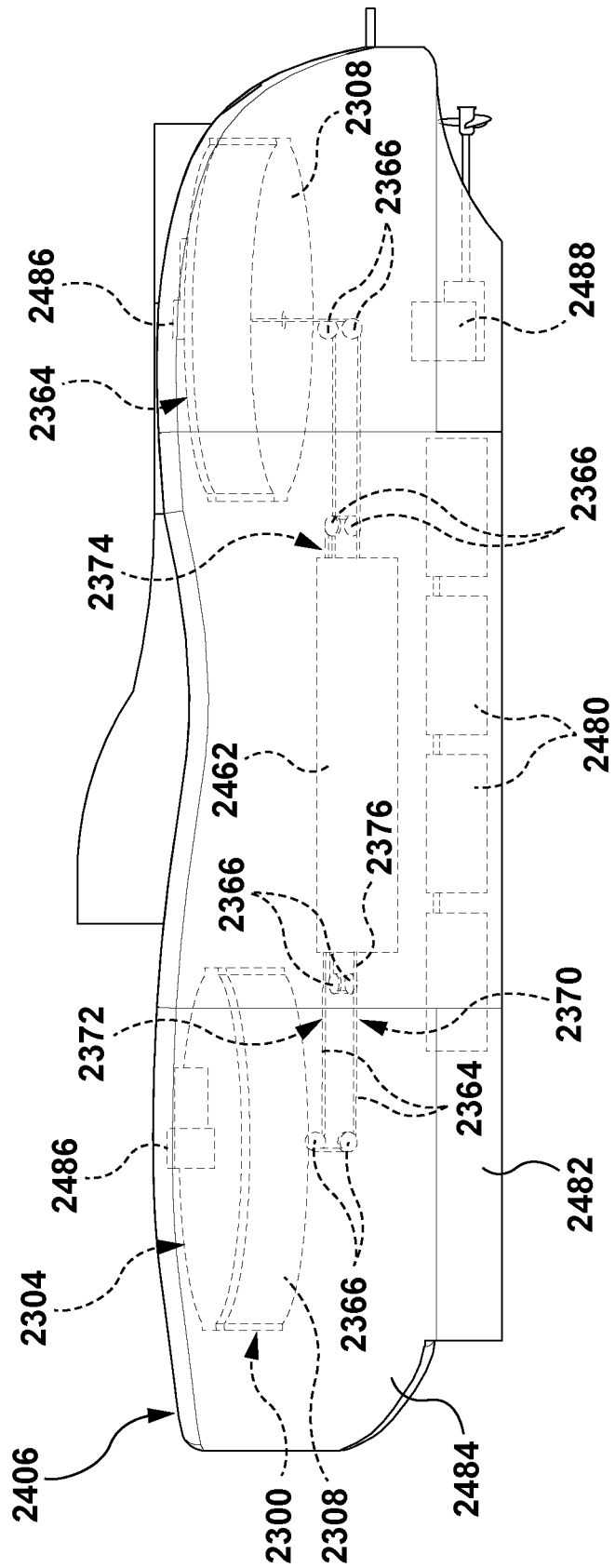
FIG. 24B is a side elevation view of the boat of FIG. 24A.
Figure 24C:
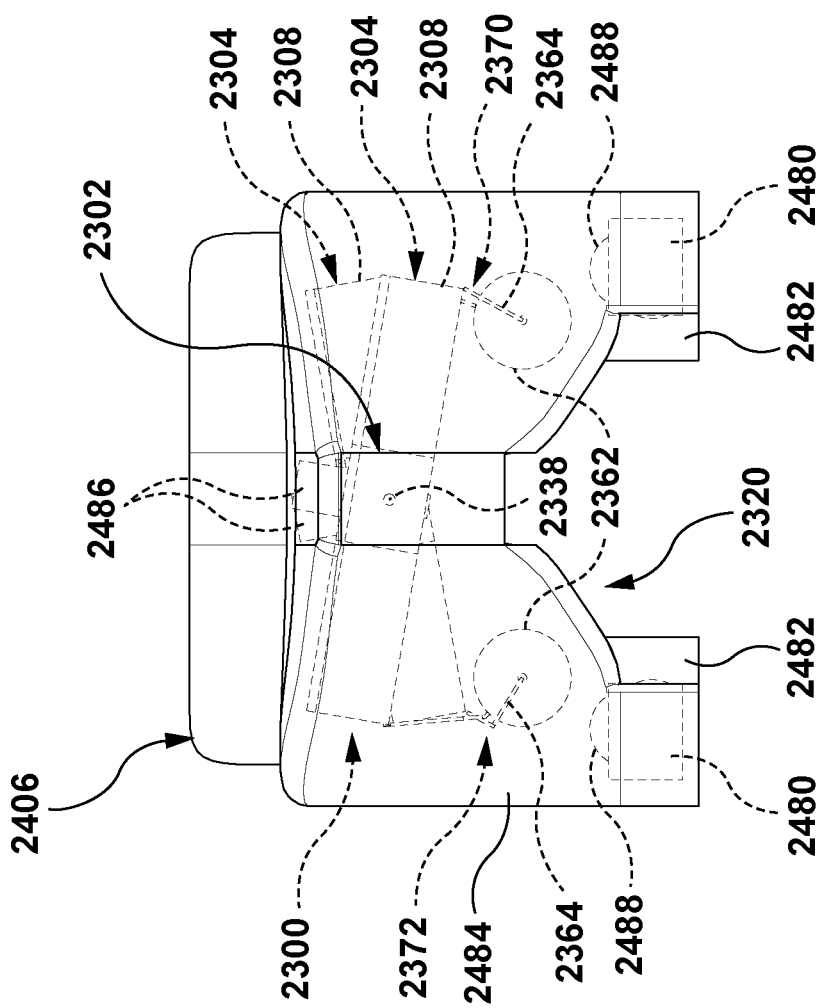
FIG. 24C is a front elevation view of the boat of FIG. 24A.

FIG. 23A shows the device 2300 inclined, relative to gravity, toward the right side of the drawing page. Thus, gravity urges the two counterweights 2322 to rest, under gravity, at the lower ends (the ends on the right side of the drawing page in FIG. 23A) of the respective counterweight housings 2362, with the springs 2368 compressed, causing the cables 2364 to orient the two cradles 2308 at the extremes of their respective reciprocal ranges of motion. As can be seen, the cradles 2308 are oriented in opposite directions, with the cradle 2308 on the left pivoted toward the viewer and the cradle 2308 on the right pivoted away from the viewer. Thus, both cradles 2308 are inclined relative to gravity, and as gravity acts on the unbalancing weight 2312 in each rotor 2310, the rotor 2310 in the cradle 2308 on the left rotates clockwise under gravity while the rotor 2310 in the cradle 2308 on the right rotates counter-clockwise under gravity.

Figure 23B:
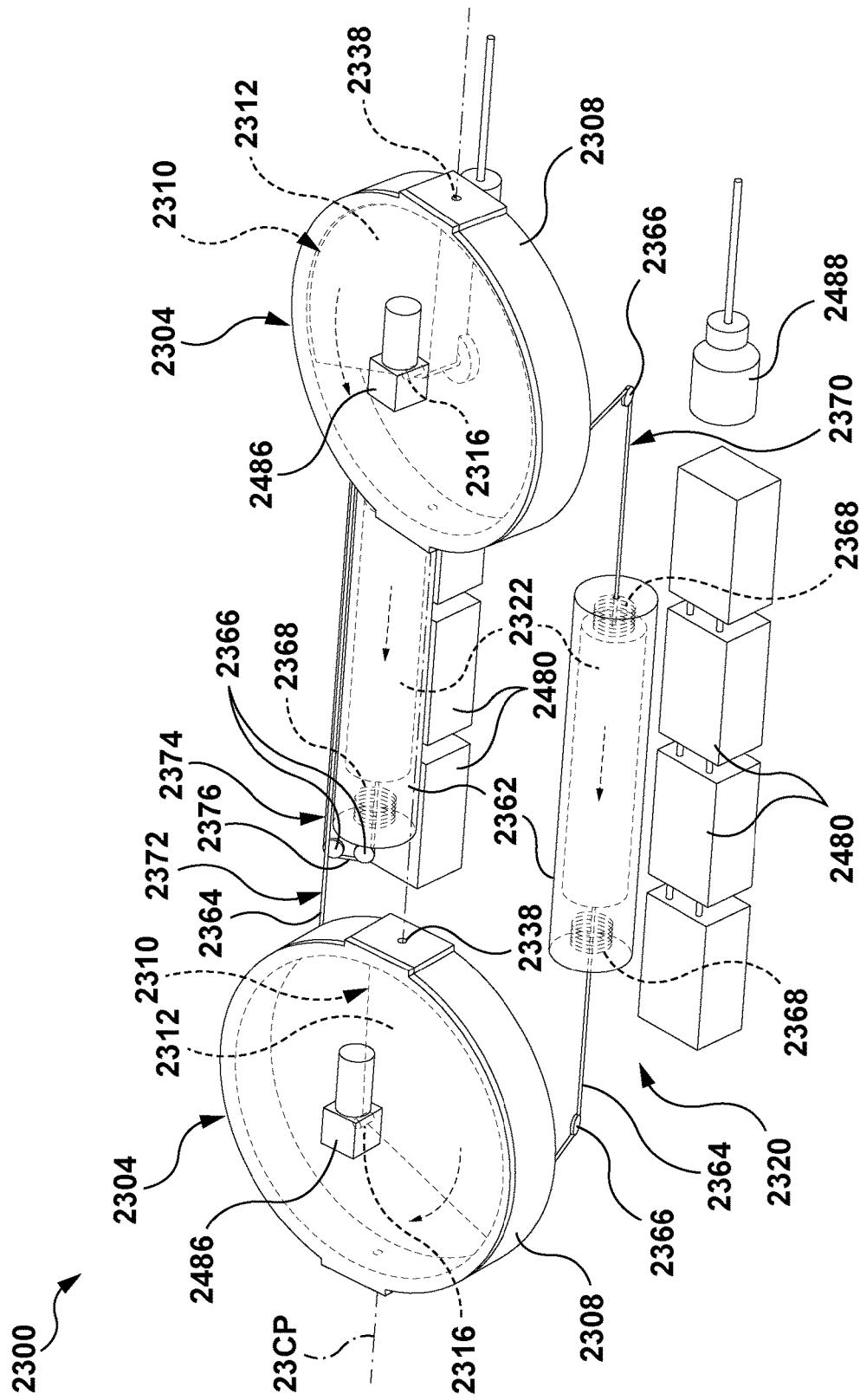
FIG. 23B is a simplified top perspective view of the energy capture device of FIG. 23A, shown in a second stage of oscillation.

FIG. 23B shows the device 2300 beginning to oscillate toward the left side of the drawing page, whereby gravity, with assistance from the coil springs 2368, urges the two counterweights 2322 to begin moving from the ends of the respective counterweight housings 2362 on the right side of the drawing page containing FIG. 23A toward the opposite ends (left side of the drawing page) of the respective counterweight housings 2362. This movement of the counterweights 2322 applies tension to the cables 2364, which in turn moves the two cradles 2308 from the extremes of their respective reciprocal ranges of motion. The cradles 2308 move to a position partway between the extreme and the midpoint of their respective reciprocal ranges of motion, and remain inclined relative to gravity such that the rotor 2310 in the cradle 2308 on the left continues to rotate clockwise while the rotor 2310 in the cradle 2308 on the right continues to rotate counter-clockwise as gravity continues to act on the unbalancing weight 2312 in each rotor 2310.

Figure 23C:
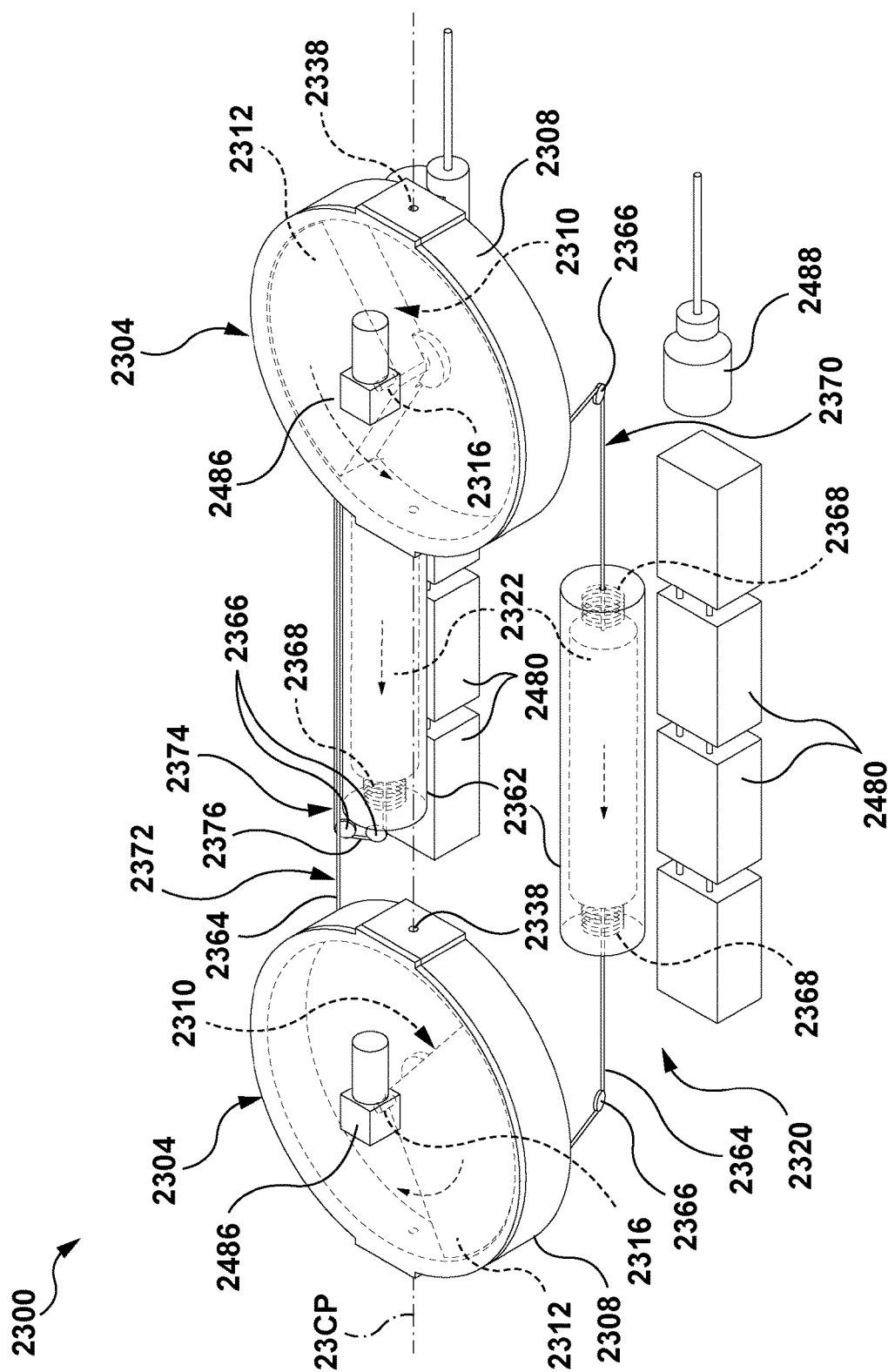
FIG. 23C is a simplified top perspective view of the energy capture device of FIG. 23A, shown in a third stage of oscillation.

In FIG. 23C, as the device 2300 continues to oscillate toward the left side of the drawing page, gravity continues to act on the two counterweights 2322, which have now moved to approximately the middle of the respective counterweight housings 2362. This continues to apply tension to the cables 2364, moving the two cradles 2308 to approximately the midpoint of their respective reciprocal ranges of motion, where they are approximately parallel to one another. The cradles 2308 remain inclined relative to gravity and, as gravity continues to act on the unbalancing weight 2312 in each rotor 2310, the rotor 2310 in the cradle 2308 on the left continues to rotate clockwise while the rotor 2310 in the cradle 2308 on the right continues to rotate counter-clockwise.

Figure 23D:
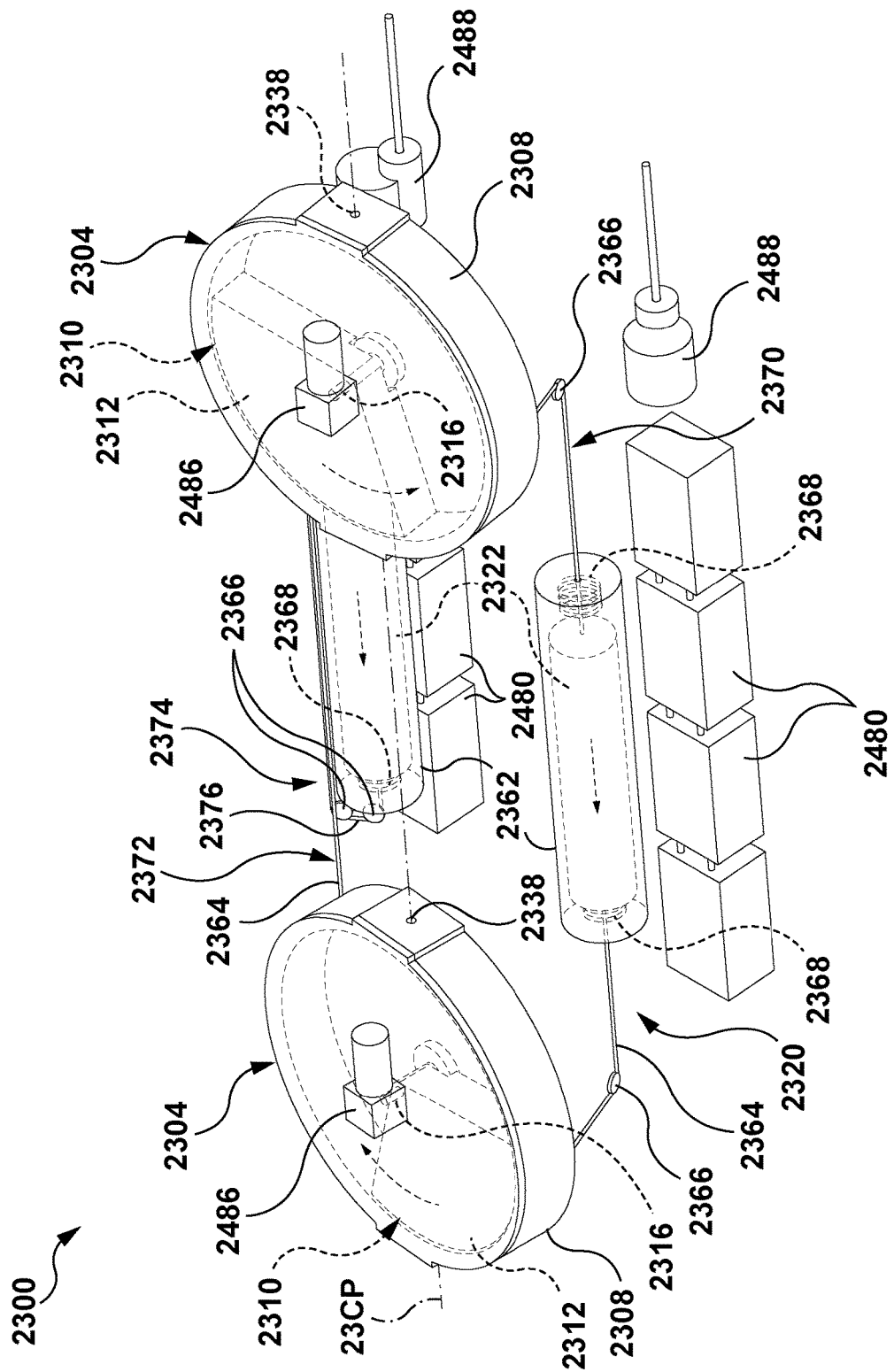
FIG. 23D is a simplified top perspective view of the energy capture device of FIG. 23A, shown in a fourth stage of oscillation.

FIG. 23D shows the device 2300 continuing to oscillate toward the left side of the drawing page. Under continued action of gravity, the two counterweights 2322 move past the middle of the respective counterweight housings 2362 toward the ends of the respective counterweight housings 2362 on the left side of the drawing page, applying tension to the cables 2364, which in turn moves the two cradles 2308 past the midpoint of their respective reciprocal ranges of motion, so that each cradle 2308 is inclined in approximately the opposite direction to that shown in FIG. 23B. The cradles 2308 are still inclined relative to gravity, and therefore the rotor 2310 in the cradle 2308 on the left continues to rotate clockwise while the rotor 2310 in the cradle 2308 on the right continues to rotate counter-clockwise as gravity continues to act on the unbalancing weight 2312 in each rotor 2310.

Figure 23E:
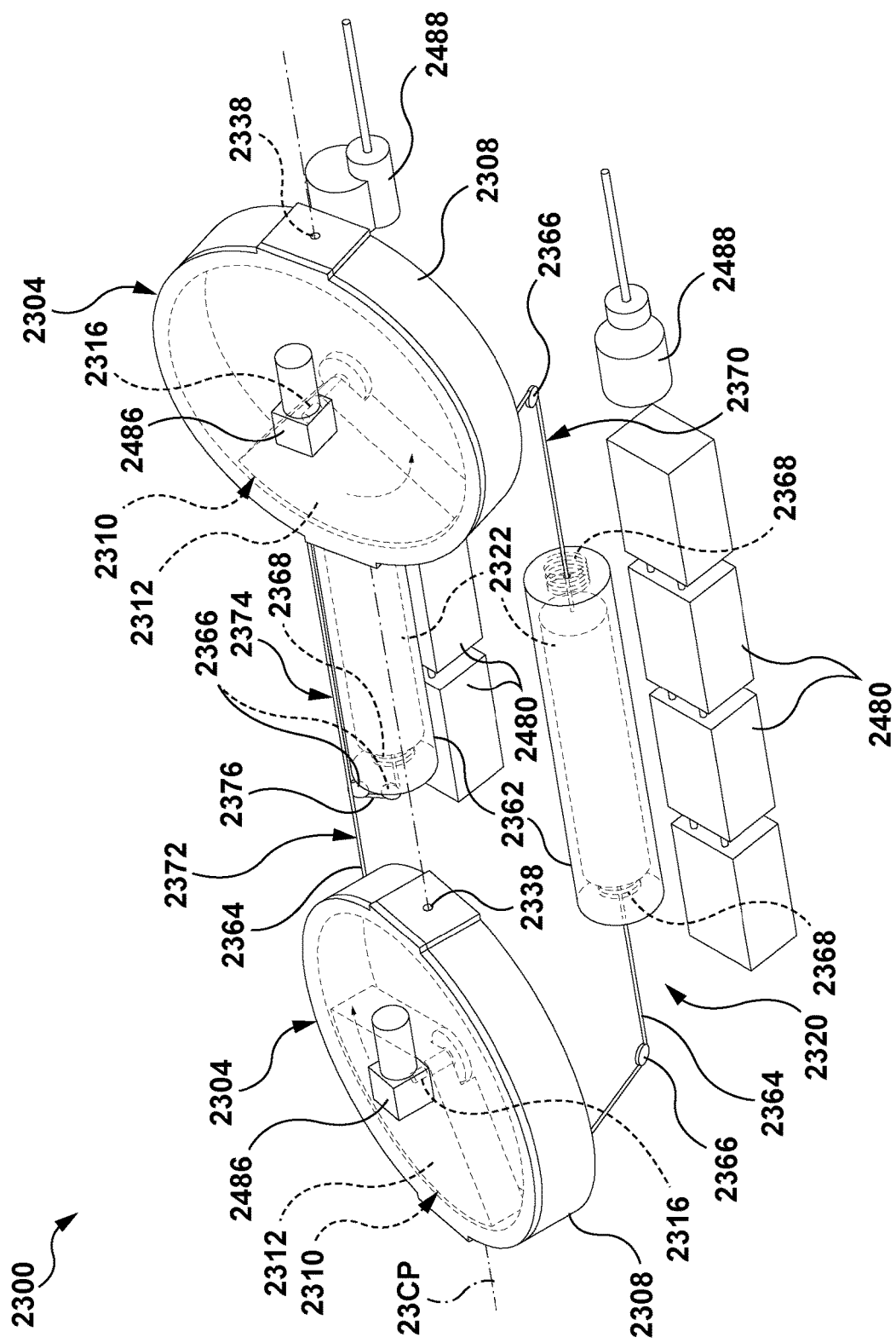
FIG. 23E is a simplified top perspective view of the energy capture device of FIG. 23A, shown in a fifth stage of oscillation.

In FIG. 23E, the device 2300 has completed its oscillation toward the left side of the drawing page. The two counterweights 2322 rest, under gravity, at the lower ends (now the ends on the left side of the drawing page) of the respective counterweight housings 2362; the coil springs 2368 are compressed and cushion any impact. With the counterweights 2322 in this position, the tension applied to the cables 2364 orients the two cradles 2308 at the opposite extremes of their respective reciprocal ranges of motion, that is, opposite to the position shown in FIG. 23A. The cradles 2308 remain inclined relative to gravity, which continues to act on the unbalancing weight 2312 in each rotor 2310, and the rotor 2310 in the cradle 2308 on the left continues to rotate clockwise while the rotor 2310 in the cradle 2308 on the right continues to rotate counter-clockwise.

Figure 23F:
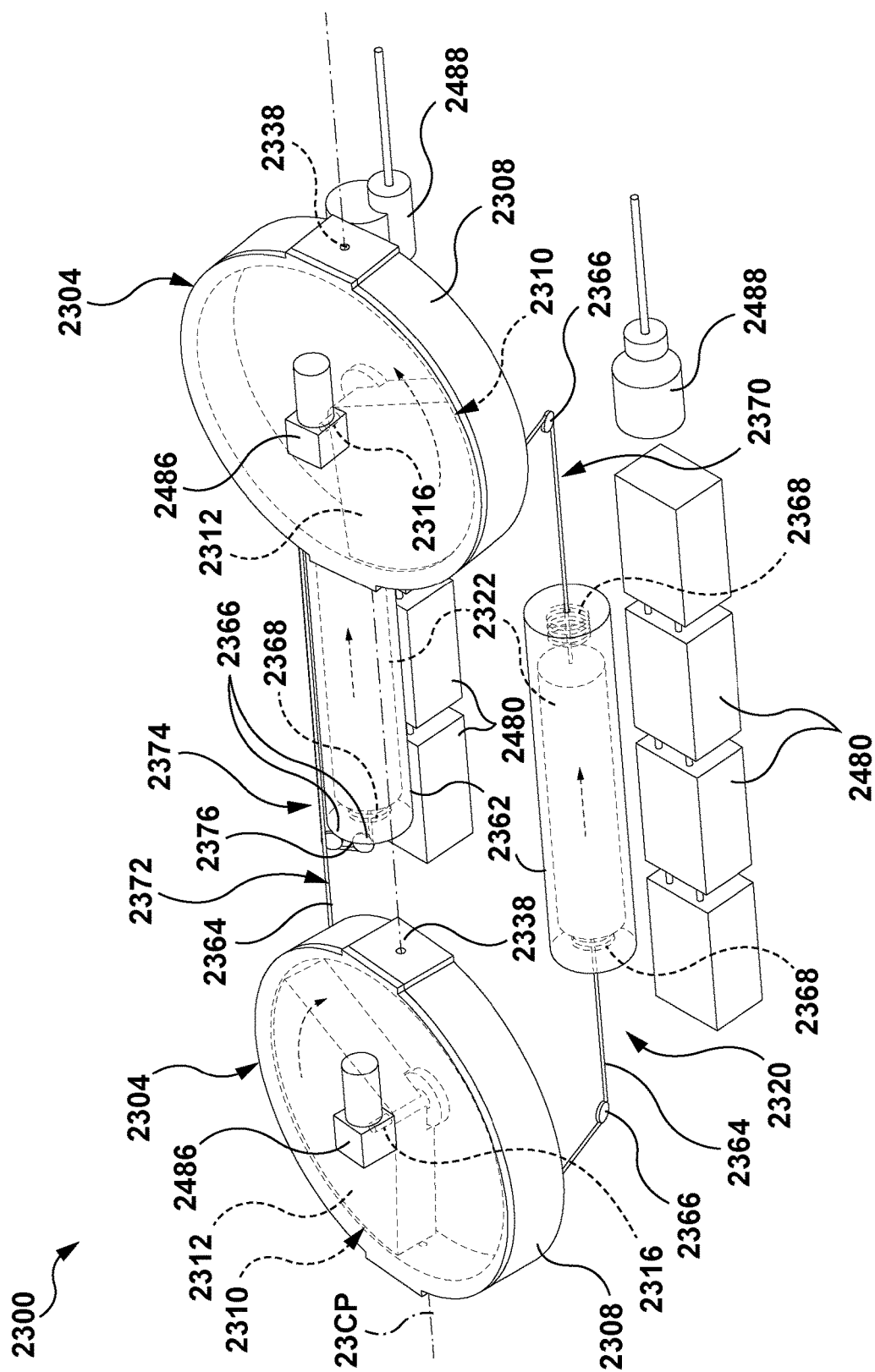
FIG. 23F is a simplified top perspective view of the energy capture device of FIG. 23A, shown in a sixth stage of oscillation.

FIG. 23F shows the device 2300 beginning to oscillate back toward the right side of the drawing page. Gravity, with assistance from the coil springs 2368, urges the two counterweights 2322 to begin moving from the ends of the respective counterweight housings 2362 on the left side of the drawing page back toward the opposite ends (right side of the drawing page) of the respective counterweight housings 2362. As the counterweights 2322 move, they apply tension to the cables 2364, which move the two cradles 2308 from the extremes of their respective reciprocal ranges of motion to a position that is partway between the extreme and the midpoint of their respective reciprocal ranges of motion, and the two cradles 2308 remain inclined relative to gravity. As such, the rotor 2310 in the cradle 2308 on the left continues to rotate clockwise while the rotor 2310 in the cradle 2308 on the right continues to rotate counter-clockwise under the ongoing influence of gravity on the unbalancing weight 2312 in each rotor 2310.

Figure 23G:
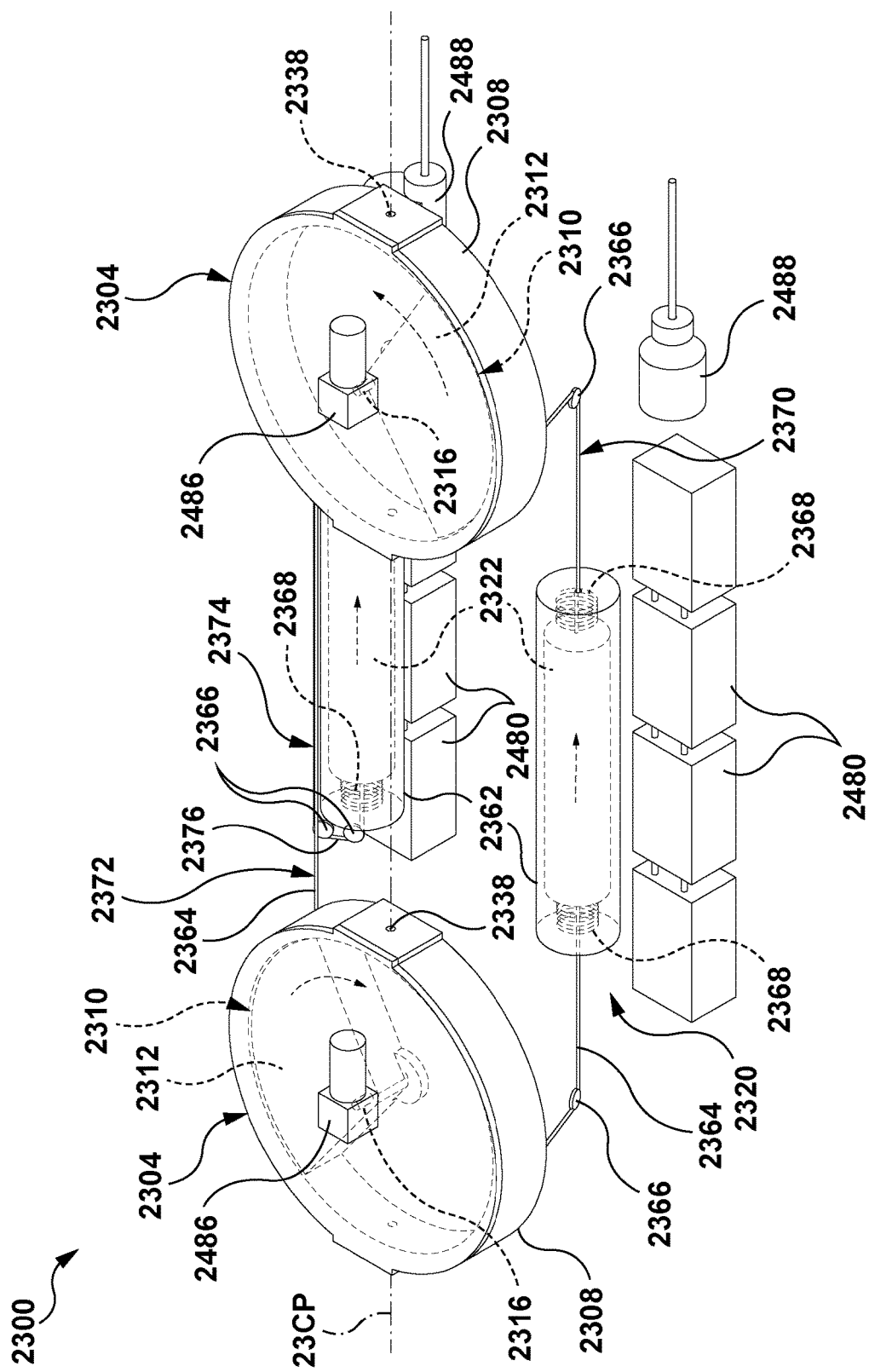
FIG. 23G is a simplified top perspective view of the energy capture device of FIG. 23A, shown in a seventh stage of oscillation.

In FIG. 23G, as the device 2300 continues to oscillate back toward the right side of the drawing page, gravity continues to act on the two counterweights 2322. The counterweights 2322 have now moved to approximately the middle of the respective counterweight housings 2362; this movement continues to apply tension to the cables 2364. The tension in the cables 2364 moves the two cradles 2308 to approximately the midpoint of their respective reciprocal ranges of motion, approximately parallel to one another. The cradles 2308 continue to be inclined relative to gravity. As gravity continues to act on the unbalancing weight 2312 in each rotor 2310, the rotor 2310 in the cradle 2308 on the left continues to rotate clockwise while the rotor 2310 in the cradle 2308 on the right continues to rotate counter-clockwise.

Figure 23H:
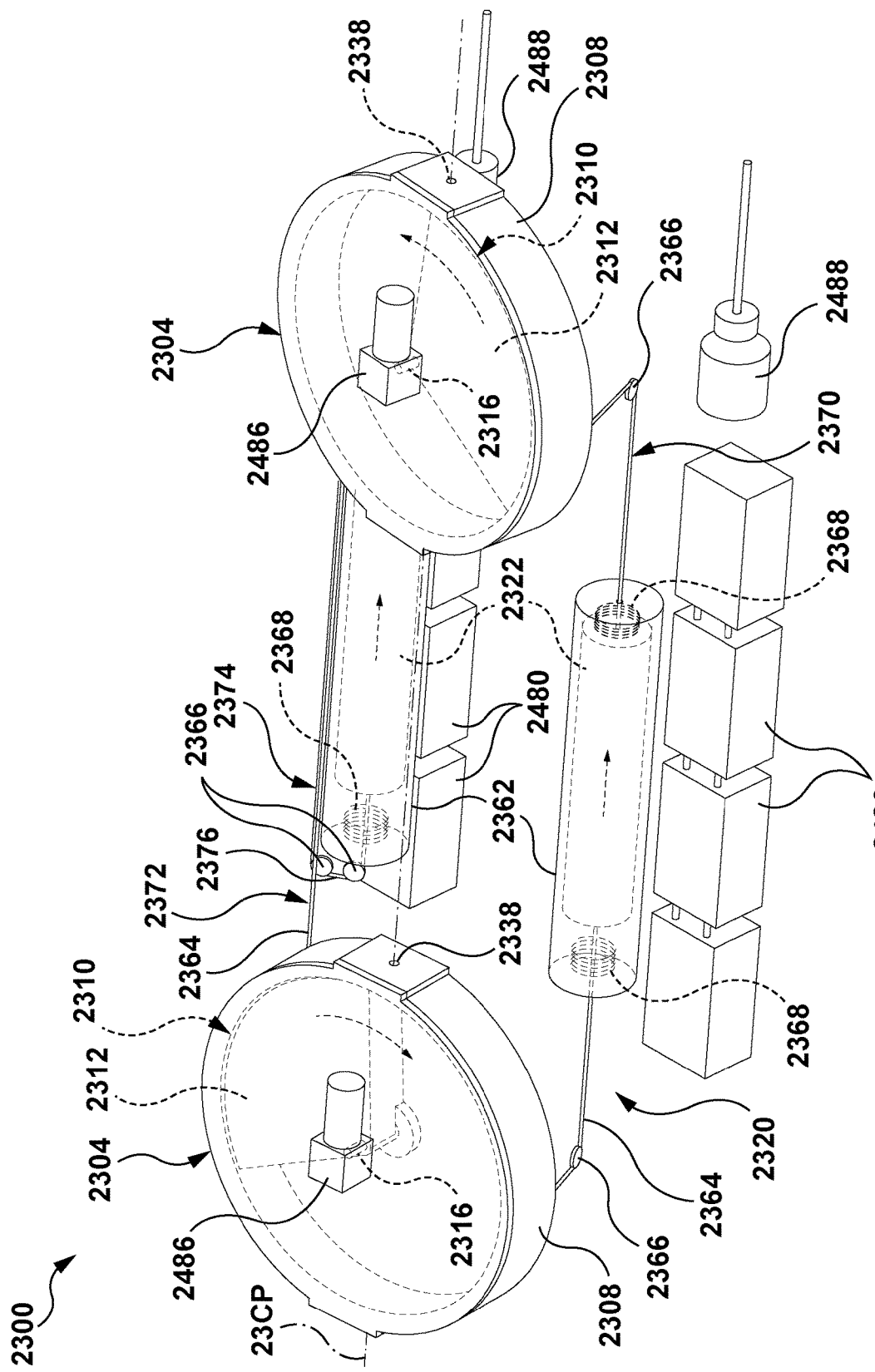
FIG. 23H is a simplified top perspective view of the energy capture device of FIG. 23A, shown in an eighth stage of oscillation.

FIG. 23H shows the device 2300 continuing to oscillate back toward the right side of the drawing page. Gravity continues to act on the counterweights 2322, which move past the middle of the respective counterweight housings 2362 toward the ends of the respective counterweight housings 2362 on the right side of the drawing page, applying tension to the cables 2364. This tension in turn moves the two cradles 2308 past the midpoint of their respective reciprocal ranges of motion, so that each cradle 2308 is inclined in approximately the opposite direction to that shown in FIG. 23E. Compression of the coil springs 2368 assists to cushion any impact. The cradles 2308 remain inclined relative to gravity, so that the rotor 2310 in the cradle 2308 on the left continues to rotate clockwise while the rotor 2310 in the cradle 2308 on the right continues to rotate counter-clockwise as gravity continues to act on the unbalancing weight 2312 in each rotor 2310.

The device 2300 then returns to the configuration shown in FIG. 23A, with each of the rotors 2310 having completed one full revolution, and the oscillation cycle can repeat.

Thus, FIGS. 23A to 23H show another implementation of a method for capturing energy from an oscillating object, in which an unbalanced rotor is oscillated on or within the oscillating object to rotate the rotor while reciprocally pivoting the rotor about a counter-oscillation axis that is substantially perpendicular to both a rotation axis of the rotor and the oscillation axis for the oscillating object. Reciprocally pivoting the rotor about the counter-oscillation axis urges the rotor to rotate continuously instead of reciprocally, and energy from rotation of the rotor can be captured.

Figure 25A:
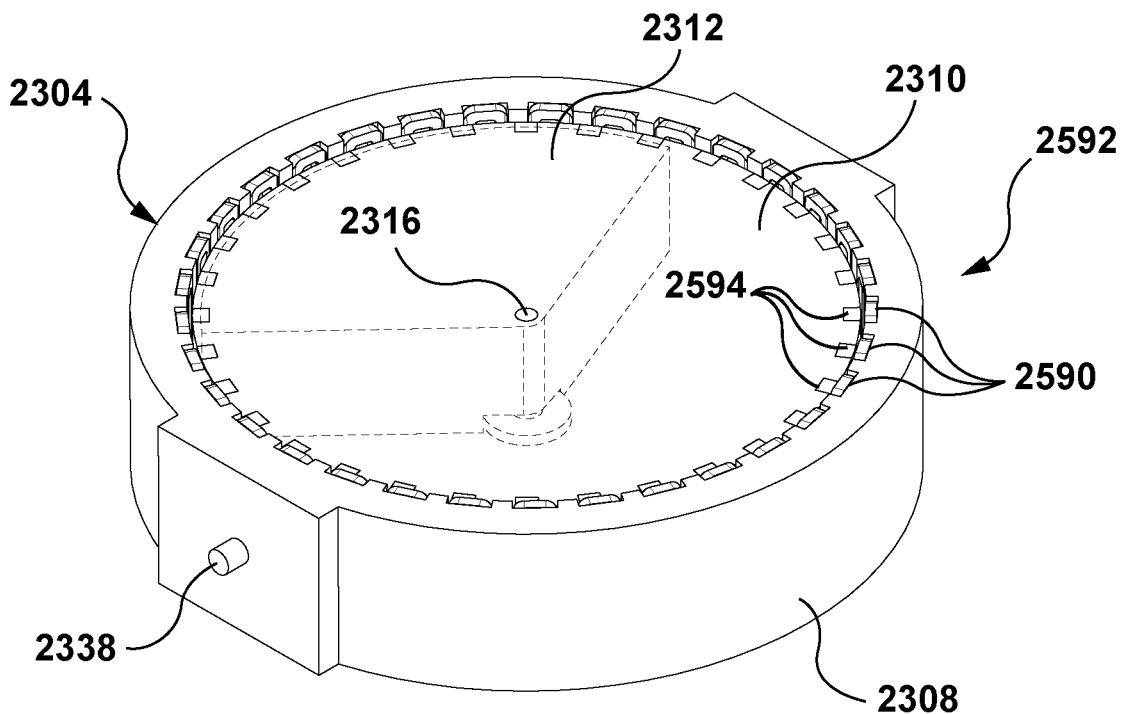
FIG. 25A is a top perspective view of a rotor assembly of the energy capture device of FIG. 23A where a rotor and a cradle thereof combine so that the rotor assembly is an electrical generator.
Figure 25B:
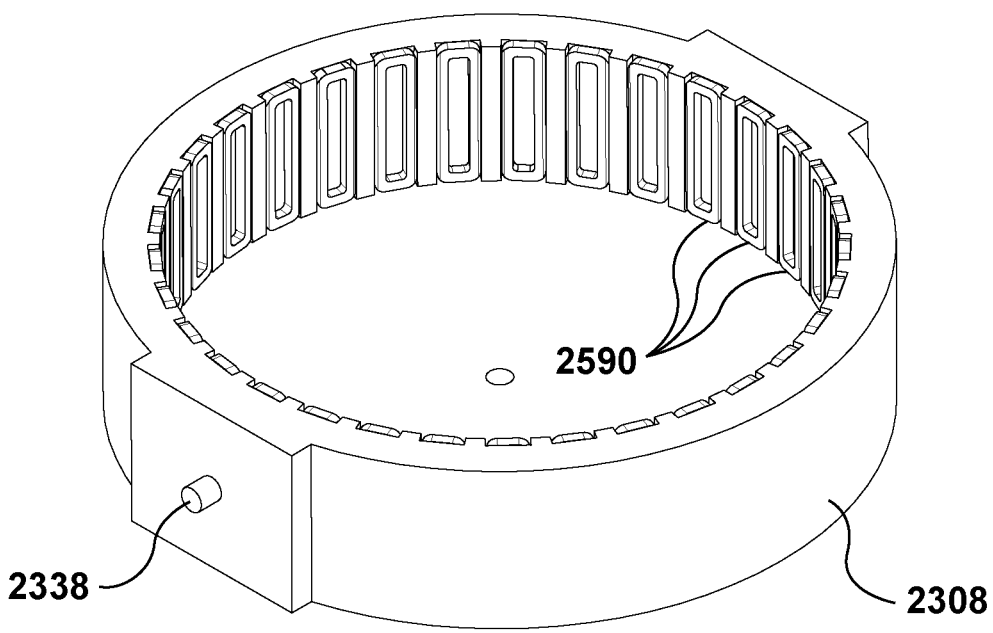
FIG. 25B is a top perspective view of the cradle of the rotor assembly of FIG. 25A with the rotor thereof removed.

Energy can be captured from rotation of the rotors 2310 in a number of ways. In the illustrated embodiment shown in FIGS. 23A through 24C, the energy is captured electrically. As best seen in FIG. 24C, the illustrative boat 2406 is a catamaran-style vessel, and arrays of electrical batteries 2480 are disposed in the keel portions 2482 of the hull 2484, where they may also provide ballast. The rotor assemblies 2304 may be electrical generators which may be electrically coupled to the batteries 2480 by way of electrical power take-offs 2486 to charge the batteries 2480, which may in turn power electrical motors 2488 of the boat 2406 (wiring connections are not shown in the drawings for simplicity of illustration). FIGS. 25A and 25B show an arrangement of the rotor assembly 2304 where the cradle 2308 carries stator components 2590 of an electrical generator 2592 and the rotor 2310 carries rotor components 2594 of the electrical generator 2592 whereby the rotor and the cradle combine so that the rotor assembly 2304 is the electrical generator. Thus, in one embodiment, the device 2300 may capture energy from wave oscillation to charge the batteries 2480 while the boat 2406 is moored. In the embodiment shown in FIGS. 25A and 25B, the rotor 2310 comprises a hollow cylinder in which the unbalancing weight 2312 is disposed.

Figure 26A:
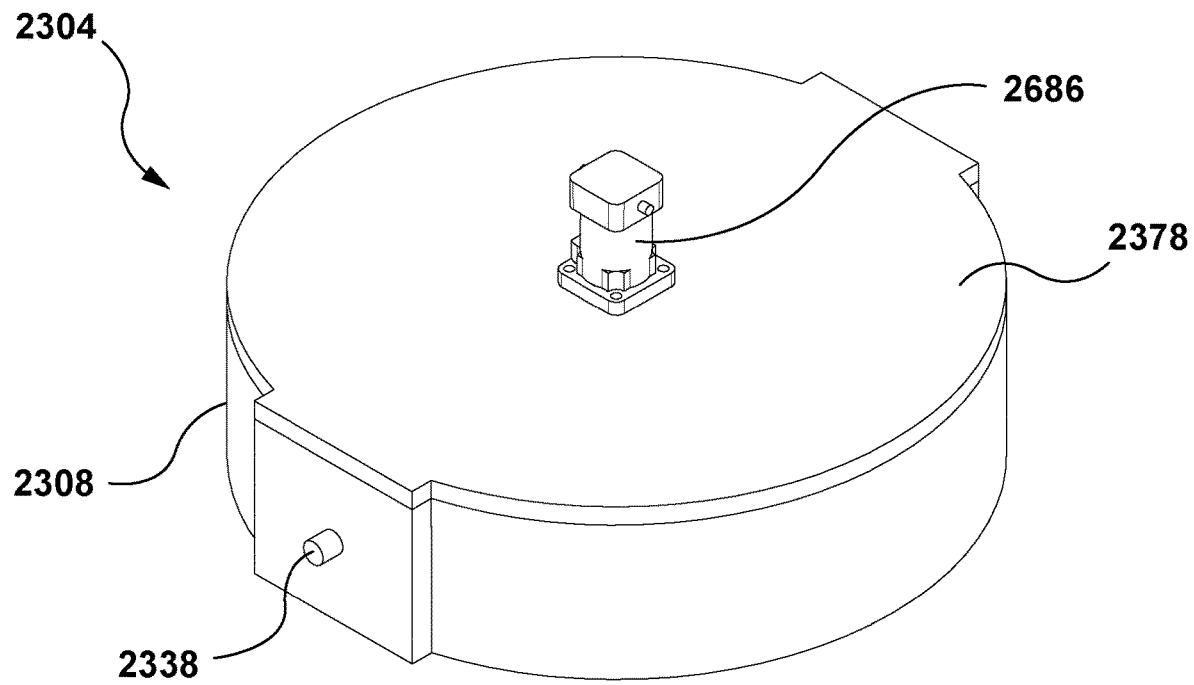
FIG. 26A is a top perspective view of an alternate embodiment of a rotor assembly of the energy capture device of FIG. 23A in which the power take-off for the rotor assembly is a mechanical power take-off.
Figure 26B:
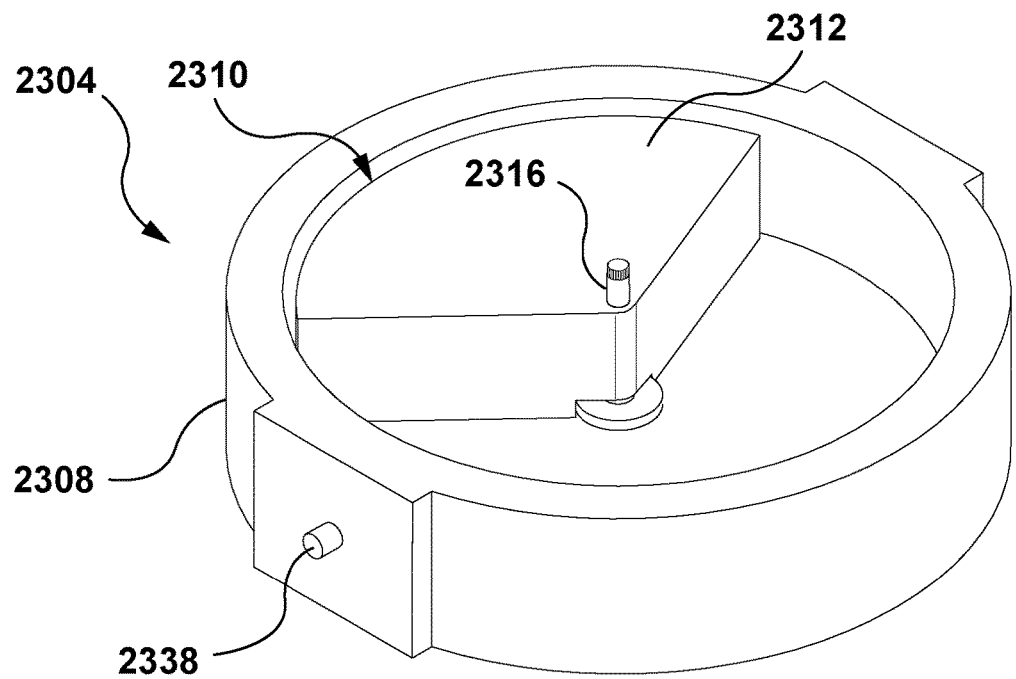
FIG. 26B is a top perspective view of the cradle of the rotor assembly of FIG. 26A with a cover thereof removed.
Figure 26C:
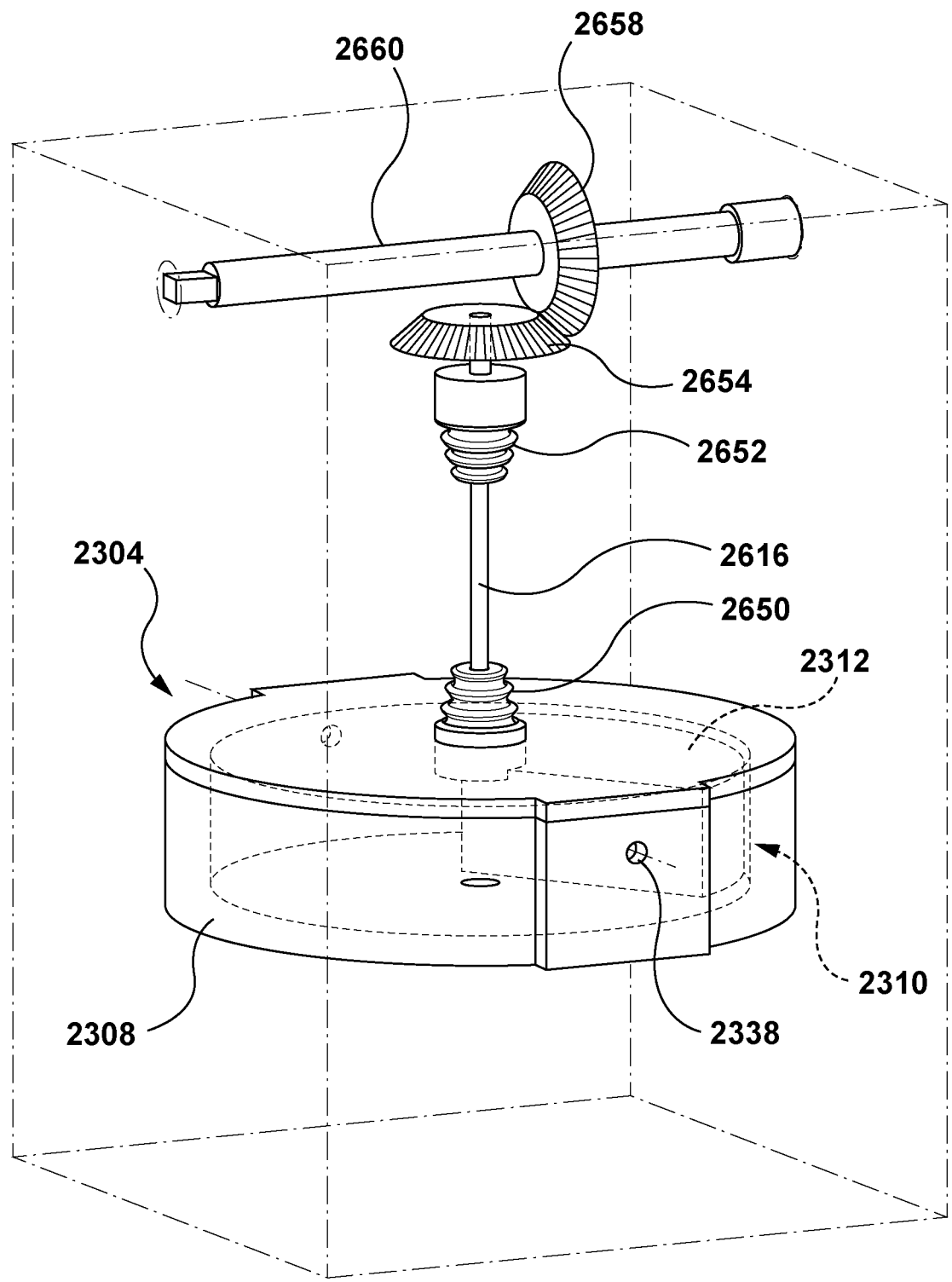
FIG. 26C is a top perspective view of another alternate embodiment of a rotor assembly of the energy capture device of FIG. 23A in which the power take-off for the rotor assembly is a mechanical power take-off.

FIGS. 26A through 26C show alternate arrangements in which the power take-off for the rotor assembly 2304 is a mechanical power take-off. In FIGS. 26A and 26B, the central shaft 2316 is rotated by the rotor 2310 and coupled to a swash plate pump 2686 although other forms of mechanical power take-off are contemplated. In this embodiment, as shown in FIG. 26B with a cover 2378 of the rotor assembly 2304 removed to expose the rotor 2310, the sector-shaped unbalancing weight 2312 makes up substantially the entirety of the rotor 2310. FIG. 26C shows another arrangement in which a driveshaft 2616 is rotated by each rotor 2310. One end of the driveshaft 2616 is coupled to the rotor 2310 by a first constant velocity (CV) joint 2650 and the opposite end of the driveshaft 2616 is coupled by a second CV joint 2652 to a beveled drive gear 2654. The beveled drive gear 2654 meshes with a beveled driven gear 2658 fixed to a driven shaft 2660, which can be used to apply rotational force, either directly or through further gearing, to a mechanical device. Other elements of the system are omitted for simplicity of illustration.

Figure 27:
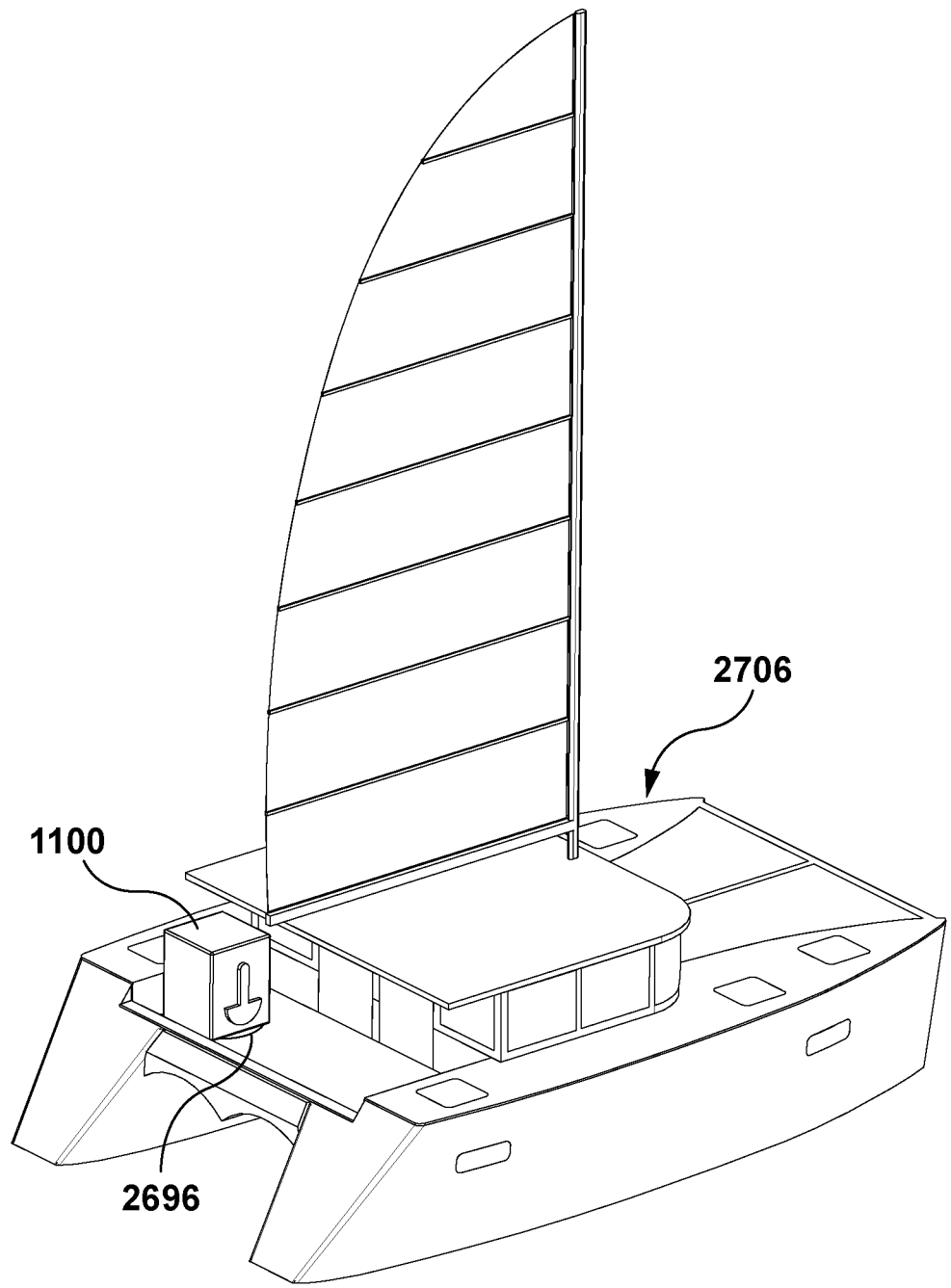
FIG. 27 shows the energy capture device of FIG. 11 mounted on a turntable on a deck of a vessel.

FIG. 27 shows how a device 1100 of the type shown in FIGS. 11 through 21 can be mounted on a turntable 2696 on the deck of a vessel 2706 to capture energy from oscillation of the vessel 2706.

Figure 28:
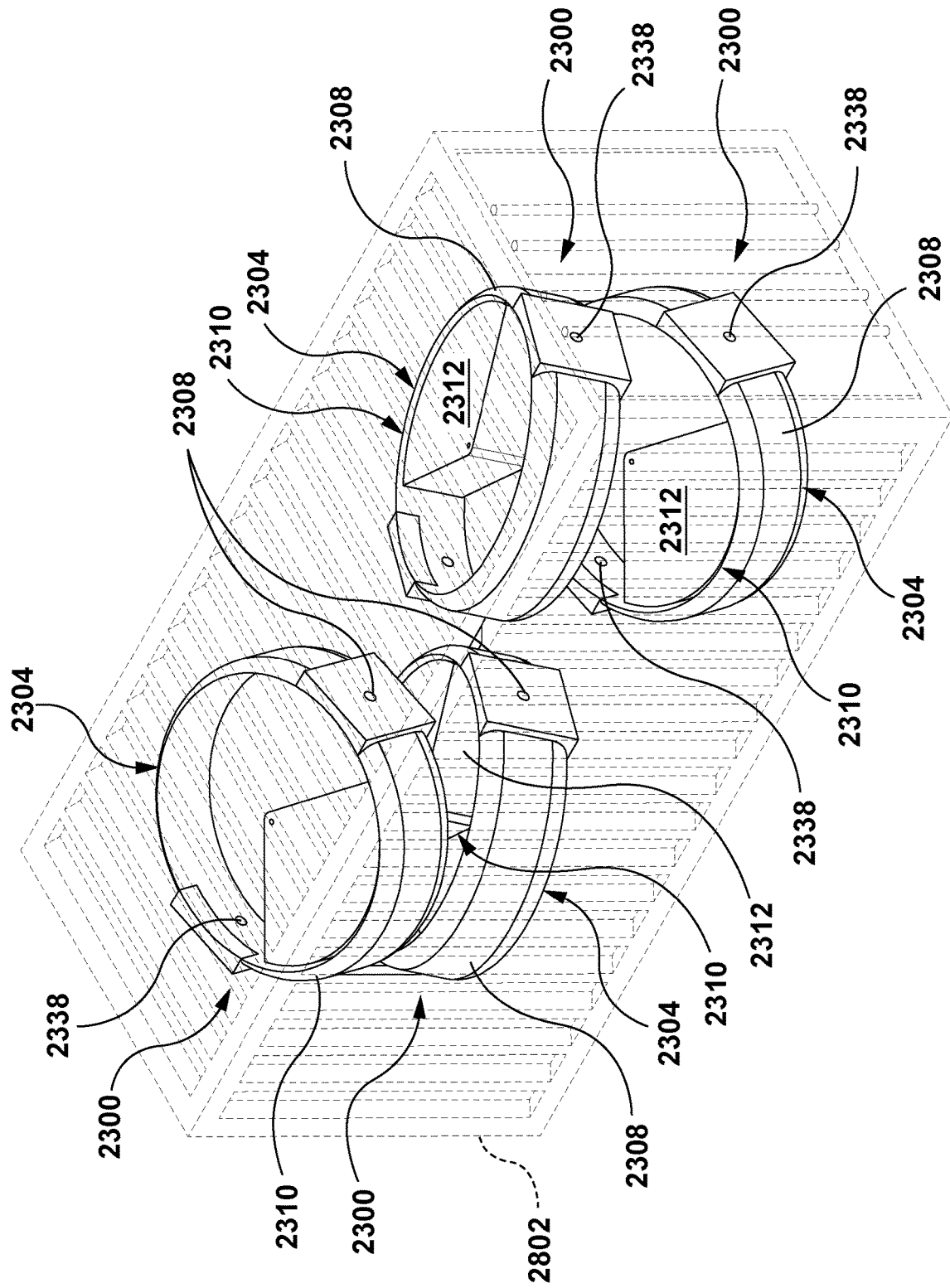
FIG. 28 shows an embodiment of the energy capture device of FIG. 23A disposed within an ISO container.

FIG. 28 shows an arrangement in which two instances of an embodiment of the device 2300 shown in FIGS. 23A to 23H are disposed within an ISO container 2802 which forms part of (or supports) the frame. In this embodiment, the sector-shaped unbalancing weight 2312 makes up substantially the entirety of the rotor 2310. In FIG. 28 only the rotor assemblies 2304 (cradles 2308 with rotors 2310 exposed) are shown for clarity of illustration. The arrangement shown in FIG. 28 allows for modular deployment of energy capture devices on conventional cargo ships.

Figure 29:
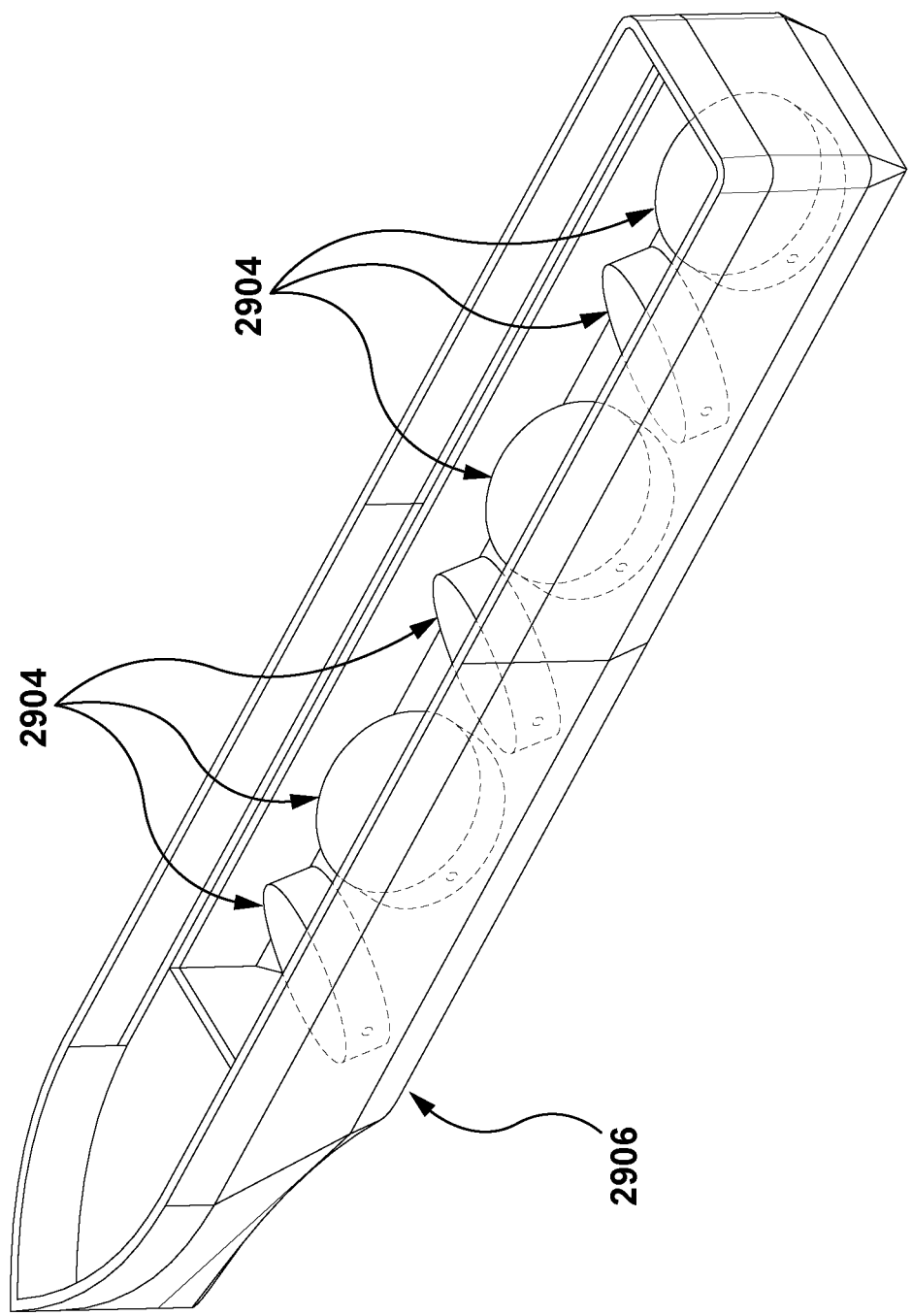
FIG. 29 shows an embodiment in which a plurality of rotor assemblies similar to the rotor assembly of FIG. 25A are disposed within a special-purpose power generation vessel.

FIG. 29 shows an embodiment in which a plurality of rotor assemblies 2904 similar to those shown in FIGS. 23A to 23H are disposed within a special-purpose power generation vessel 2906. Again, only the rotor assemblies 2904 are shown; return actuator(s) and power take-off(s) may be present but are omitted for simplicity of illustration. The special purpose power generation vessel 2906 may, for example, be steered to be suitably oriented relative to wave oscillation, and may, for example, transmit electrical power to shore, for example by way of cables.

It is to be noted that the present disclosure does not purport to describe a so-called "perpetual motion machine". The energy capture devices described herein form part of an open system, and do not generate energy independently. Rather, the devices and methods described herein capture energy from an external source, in particular the oscillation (e.g. from waves) of an object on or within which the device is disposed.

Energy capture by the devices described herein may be combined with energy captured from other sources, such as solar energy and/or wind energy.

Certain illustrative embodiments have been described by way of example. It will be apparent to persons skilled in the art that a number of variations and modifications can be made without departing from the scope of the invention as defined in the claims.

What is claimed is:

1. A device for capturing energy from an oscillating object carrying the device, the device comprising:
    a frame;
    at least one rotor assembly, wherein each of the at least one rotor assembly comprises:
        a cradle;
        a rotor rotatably carried by the cradle so as to be rotatable about a rotation axis relative to the cradle;
        the rotor comprising an unbalancing weight to unbalance rotation of the rotor relative to the cradle;
    for each of the at least one rotor assembly, the respective cradle being pivotably carried by the frame so as to pivotally reciprocate within a limited range of reciprocal motion within the frame about a respective cradle pivot axis that intersects and is substantially perpendicular to the respective rotation axis; and
    at least one power take-off coupled to the respective rotor;
    further comprising a return actuator carried by the frame and mechanically coupled to the respective cradle of each of the at least one rotor assembly to urge the respective cradle to reverse within a range of reciprocal motion of the respective cradle; wherein the return actuator comprises:
        at least one counterweight slidably carried by the frame so as to be slidable relative to the frame, substantially parallel to each cradle pivot axis;
        the at least one counterweight being mechanically coupled to the at least one rotor assembly such that sliding motion of the at least one counterweight relative to the frame pivots each respective cradle of the at least one rotor assembly about the respective cradle pivot axis.

2. The device of claim 1, wherein the at least one counterweight is mechanically coupled to the at least one rotor assembly by cables.

3. The device of claim 2, wherein:
    the at least one rotor assembly comprises two rotor assemblies whose respective pivot axes are at least substantially parallel;
    the at least one counterweight comprises two opposed substantially equal counterweights;
    the cables comprise:
        a first coupling extending between the two rotor assemblies wherein a first one of the counterweights is fixed to the cables of the first coupling; and
        a second coupling extending between the two rotor assemblies wherein a second one of the counterweights is fixed to the cables of the second coupling;
        wherein the second coupling comprises a cable reverser circuit that includes the second one of the counterweights;
        wherein sliding movement of the counterweights acts through the first coupling and the second coupling to pivot the cradles in opposite directions.

4. The device of claim 1, wherein the return actuator comprises at least one biasing member.

5. The device of claim 4, wherein the at least one biasing member acts between the frame and the cradle of each rotor assembly.

6. The device of claim 4, wherein:
    the at least one rotor assembly comprises a plurality of rotor assemblies; and
    the at least one biasing member comprises a plurality of biasing members acting between the respective rotor assemblies.

7. The device of claim 1, wherein the power take-off is a mechanical power take-off.

8. The device of claim 7, wherein the mechanical power take-off comprises a shaft rotated by the at least one rotor.

9. The device of claim 1, wherein the power take-off comprises an electrical power take-off.

10. The device of claim 9, wherein, for each rotor assembly:
    the cradle carries stator components of an electrical generator; and
    the rotor carries rotor components of the electrical generator;
    such that the rotor and the cradle combine so that the rotor assembly is the electrical generator.

11. The device of claim 1, wherein the frame is carried on a turntable.

* * * * *